US011713983B2

(12) United States Patent
Cook

(10) Patent No.: US 11,713,983 B2
(45) Date of Patent: *Aug. 1, 2023

(54) SENSING WINDING CONFIGURATION FOR INDUCTIVE POSITION ENCODER

(71) Applicant: Mitutoyo Corporation, Kanagawa-ken (JP)

(72) Inventor: Ted Staton Cook, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 114 days.

This patent is subject to a terminal disclaimer.

(21) Appl. No.: 17/364,529

(22) Filed: Jun. 30, 2021

(65) Prior Publication Data

US 2023/0003554 A1   Jan. 5, 2023

(51) Int. Cl.
    *G01D 5/20*    (2006.01)
    *G01B 3/20*    (2006.01)
    *G01B 3/18*    (2006.01)

(52) U.S. Cl.
    CPC .......... *G01D 5/2046* (2013.01); *G01B 3/205* (2013.01); *G01B 3/18* (2013.01)

(58) Field of Classification Search
    CPC ......... G01B 3/18; G01B 3/205; G01D 5/2046
    See application file for complete search history.

(56) References Cited

U.S. PATENT DOCUMENTS

| 5,576,537 A | 11/1996 | Holzapfel et al. |
| 5,841,274 A | 11/1998 | Masreliez et al. |
| 5,886,519 A | 3/1999 | Masreliez et al. |
| 5,894,678 A | 4/1999 | Masreliez et al. |
| 5,901,458 A | 5/1999 | Andermo et al. |

(Continued)

FOREIGN PATENT DOCUMENTS

| CN | 1272620 A | 11/2000 |
| CN | 1441226 A | 9/2003 |

(Continued)

OTHER PUBLICATIONS

Cook, "Transmitter and Receiver Configuration for Inductive Position Encoder," U.S. Appl. No. 16/826,842, filed Mar. 23, 2020, 77 pages.

*Primary Examiner* — Alesa Allgood
(74) *Attorney, Agent, or Firm* — Seed IP Law Group LLP

(57) ABSTRACT

An inductive position encoder includes a scale, a detector and a signal processor. The scale includes a periodic pattern of signal modulating elements (SME) arranged along a measuring axis (MA) with a spatial wavelength W1. The detector comprises sensing elements and a field generating coil that generates a changing magnetic flux. The sensing elements comprise conductive loops that provide detector signals responsive to a local effect on the changing magnetic flux provided by adjacent SME's. Some or all of the conductive loops are configured according to an intra-loop shift relationship wherein equal "shifted proportions" of a loop are shifted in opposite directions by W1/4K. K is an odd integer. The intra-loop shift relationship can be used to suppress Kth spatial harmonic components in the detector signals, while also overcoming longstanding detrimental layout problems. It combines easily with "loop width" spatial filtering techniques that filter other spatial harmonic signal components.

22 Claims, 19 Drawing Sheets

(56) References Cited

U.S. PATENT DOCUMENTS

| | | |
|---|---|---|
| 5,936,399 A | 8/1999 | Andermo et al. |
| 5,973,494 A | 10/1999 | Masreliez et al. |
| 5,998,990 A | 12/1999 | Andermo et al. |
| 6,002,250 A | 12/1999 | Masreliez et al. |
| 6,011,389 A | 1/2000 | Masreliez et al. |
| 6,049,204 A | 4/2000 | Andermo et al. |
| 6,054,851 A | 4/2000 | Masreliez et al. |
| 6,124,708 A | 9/2000 | Dames |
| 6,157,188 A | 12/2000 | Steinke |
| 6,259,249 B1 | 7/2001 | Miyata |
| 6,329,813 B1 | 12/2001 | Andermo |
| RE37,490 E | 1/2002 | Andermo et al. |
| 6,335,618 B1 | 1/2002 | Nahum |
| 6,400,138 B1 | 6/2002 | Andermo |
| 6,522,128 B1 | 2/2003 | Ely et al. |
| 6,522,129 B2 | 2/2003 | Miyata et al. |
| 6,531,866 B2 | 3/2003 | Miyata et al. |
| 6,545,461 B1 | 4/2003 | Miyata |
| 6,573,707 B2 | 6/2003 | Kiriyama et al. |
| 6,628,115 B2 | 9/2003 | Sasaki et al. |
| 6,646,433 B2 | 11/2003 | Milvich |
| 6,646,434 B2 | 11/2003 | Miyata et al. |
| 6,714,004 B2 | 3/2004 | Jagiella |
| 6,720,760 B2 | 4/2004 | Milvich |
| 7,015,687 B2 | 3/2006 | Meyer |
| 7,196,510 B2 | 3/2007 | Kawatoko |
| 7,239,130 B1 | 7/2007 | Milvich |
| 7,530,177 B1 | 5/2009 | Meichle et al. |
| 7,652,469 B2 | 1/2010 | Meyer |
| 7,705,585 B2 | 4/2010 | Howard |
| 7,906,958 B2 | 3/2011 | Nakayama et al. |
| 8,222,891 B2 | 7/2012 | Steinke et al. |
| 8,309,906 B2 | 11/2012 | Kapner et al. |
| 8,847,583 B2 | 9/2014 | Sasaki et al. |
| 8,928,311 B2 | 1/2015 | Sasaki |
| 9,228,823 B2 | 1/2016 | Fontanet et al. |
| 9,267,819 B2 | 2/2016 | Cook |
| 9,383,184 B2 | 7/2016 | Tiemann et al. |
| 9,435,663 B2 | 9/2016 | Cook |
| D774,928 S | 12/2016 | Matsumiya et al. |
| 9,612,136 B1 | 4/2017 | Cook |
| 9,618,366 B2 | 4/2017 | Nahum |
| 9,678,701 B2 | 6/2017 | Cook |
| 9,778,072 B1 | 10/2017 | Nahum |
| 9,833,802 B2 | 12/2017 | Kalistaja et al. |
| 9,835,473 B2 | 12/2017 | Nahum |
| 9,958,294 B2 | 5/2018 | Cook |
| 10,422,666 B2 | 9/2019 | Cook |
| 10,520,335 B2 | 12/2019 | Cook |
| 10,551,217 B2 | 2/2020 | Cook |
| 10,591,316 B2 | 3/2020 | Cook |
| 10,612,943 B2 | 4/2020 | Cook |
| 10,775,199 B2 | 9/2020 | Cook |
| 11,067,414 B1 | 7/2021 | Cook |
| 11,320,387 B2 | 5/2022 | Wunsch et al. |
| 2001/0003422 A1 | 6/2001 | Andermo et al. |
| 2001/0020846 A1 | 9/2001 | Miyata |
| 2002/0030484 A1 | 3/2002 | Kiriyama et al. |
| 2002/0030485 A1 | 3/2002 | Gleixner |
| 2003/0090264 A1 | 5/2003 | Milvich |
| 2003/0128028 A1 | 7/2003 | Jordil |
| 2003/0160608 A1 | 8/2003 | Milvich |
| 2006/0103376 A1 | 5/2006 | Ma |
| 2009/0119940 A1 | 5/2009 | Meichle et al. |
| 2011/0254541 A1 | 10/2011 | Sasaki |
| 2012/0007591 A1 | 1/2012 | Howard et al. |
| 2014/0184202 A1 | 7/2014 | Horiguchi et al. |
| 2015/0375246 A1 | 12/2015 | Kalistaja et al. |
| 2016/0054154 A1 | 2/2016 | Cook |
| 2016/0146636 A1 | 5/2016 | Nahum |
| 2017/0089738 A1 | 3/2017 | Cook |
| 2017/0268905 A1 | 9/2017 | Nahum |
| 2017/0268906 A1 | 9/2017 | Nahum |
| 2018/0003524 A1 | 1/2018 | Cook |
| 2018/0058883 A1 | 3/2018 | Cook |
| 2018/0087928 A1 | 3/2018 | Jones |
| 2018/0113004 A1 | 4/2018 | Cook |
| 2018/0180452 A1 | 6/2018 | Cook |
| 2018/0195880 A1 | 7/2018 | Cook |
| 2018/0274947 A1 | 9/2018 | Maniouloux et al. |
| 2019/0120660 A1 | 4/2019 | Hitchman et al. |
| 2019/0301895 A1 | 10/2019 | Cook |
| 2020/0003581 A1* | 1/2020 | Cook ............... G01D 5/202 |
| 2020/0003583 A1 | 1/2020 | Cook |
| 2020/0300670 A1 | 9/2020 | Cook |
| 2022/0205815 A1* | 6/2022 | Cook ............... G01D 5/2053 |

FOREIGN PATENT DOCUMENTS

| | | |
|---|---|---|
| CN | 105415882 A | 3/2016 |
| EP | 1 014 041 A1 | 6/2000 |
| JP | 2018-004628 A | 1/2018 |
| JP | 2018-031777 A | 3/2018 |
| JP | 2018-105854 A | 7/2018 |

* cited by examiner

SENSING WINDING CONFIGURATION FOR INDUCTIVE POSITION ENCODER

BACKGROUND

Technical Field

This disclosure relates to measurement instruments and, more particularly, to inductive position encoders that may be utilized in precision measurement instruments.

Description of the Related Art

Various encoder configurations may include various types of optical, capacitive, magnetic, inductive, movement and/or position transducers. These transducers use various geometric configurations of a transmitter and a receiver in a read head to measure movement between the read head and a scale. U.S. Pat. No. 6,011,389 (the '389 patent), U.S. Pat. No. 7,239,130 (the '130 patent), and U.S. Pat. No. 6,124,708 (the 708 patent) describe induced current position transducers usable in high accuracy applications; U.S. Pat. No. 5,973,494 (the '494 patent) and U.S. Pat. No. 6,002,250 (the '250 patent) describe incremental position inductive calipers and linear scales, including signal generating and processing circuits; and U.S. Pat. No. 5,886,519 (the '519 patent), U.S. Pat. No. 5,841,274 (the '274 patent), and U.S. Pat. No. 5,894,678 (the '678 patent) describe absolute position inductive calipers and electronic tape measures using an induced current transducer. U.S. Pat. No. 10,520,335 (the '335 patent), U.S. Pat. No. 10,612,943 (the '943 patent) and U.S. Pat. No. 10,775,199 (the '199 patent) disclose winding configuration refinements that are useful for enhancing the accuracy, robustness, and ease of alignment of inductive position encoders. All of the foregoing are hereby incorporated herein by reference in their entireties. As described in these patents and applications, an induced current transducer may be manufactured using printed circuit board technology and is largely immune to contamination. However, such systems may be limited in their ability to provide certain combinations of features desired by users, such as combinations of compact size, high resolution, accuracy, low cost, robustness to contamination, robustness to misalignments, etc. Configurations of encoders that provide improved combinations of such features would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An electronic position encoder is provided that is usable to measure a relative position between two elements along a measuring axis direction. In various implementations, the electronic position encoder includes a scale, a detector portion and a signal processing configuration.

The scale extends along the measuring axis direction and includes a periodic scale pattern comprising at least a first type of signal modulating elements. The periodic scale pattern has a spatial wavelength W1. The signal modulating elements of the first type comprise similar conductive plates or similar conductive loops that are located along the measuring axis direction corresponding to the spatial wavelength W1. The detector portion is configured to be mounted proximate to the periodic scale pattern and to move along the measuring axis direction relative to the periodic scale pattern. In various implementations, the detector portion includes a field generating coil and at least one respective set of sensing elements corresponding to a respective nominal spatial phase (e.g., two respective sets differing by 90 degrees of spatial phase to provide quadrature signals, or three respective sets differing by 120 degrees of spatial phase to provide three phase signals). The field generating coil is fixed on a substrate and surrounds an interior area that is aligned with an effective region of the periodic scale pattern of signal modulating elements during operation. As used herein, the term "surrounds" may mean completely surrounds, or partially surrounds, in various implementations. The only constraint is that the field generating coil is configured to generate a changing magnetic flux in the interior area in response to a coil drive signal, in a manner that supports operation according to the principles disclosed and claimed herein. Each respective set of sensing elements is arranged along the measuring axis direction and fixed on the substrate. The members of the set of sensing elements comprise conductive loops or conductive loop portions that define a sensing element effective area EffASEN corresponding to that portion of their sensing element that is aligned with or overlaps the interior area surrounded by the field generating coil.

Each respective set of sensing elements is configured to provide detector signals which respond to a local effect on the changing magnetic flux that is provided by adjacent signal modulating elements of the scale pattern, and which corresponds to its respective nominal spatial phase. The signal processing configuration is operably connected to the detector portion to provide the coil drive signal and to determine the relative position between the detector portion and the scale pattern based on detector signals input from the detector portion.

In various implementations of a first type according to principles disclosed herein (e.g., as shown in FIGS. 9-13), at least one respective set of sensing elements corresponding to a respective nominal spatial phase comprises the combined features A1, B1 and C1, and further combines at least one of the features D1 or E1, defined as follows:

A1) A number of positive polarity loops corresponding to a first winding direction or polarity, and the same number of negative polarity loops corresponding to a second winding direction or polarity opposite to the first;

B1) Each of the positive and negative polarity loops have a total sensing element effective area EffASEN that is aligned with or overlaps one or more interior areas and is defined to have an effective y-axis dimension EffYSEN along a y-axis direction that is the sum of the dimensions of the one or more interior areas perpendicular to the measuring axis direction, and at least a majority of the positive and negative polarity loops are configured to provide a sensing element average dimension DSENavg=(EffASEN/EffYSEN) along the measuring axis direction that is within the range $0.33*W1 +/- 15\%$;

C1) The positive polarity loops are configured with their sensing element effective areas arranged in a positive polarity loop prescribed relationship (or positive loop prescribed relationship, for short) relative to the respective nominal spatial phase of the respective set of sensing elements, and the negative polarity loops are configured with their sensing element effective areas arranged in a negative polarity loop prescribed relationship (or negative loop prescribed relationship, for short) relative to the respective nominal spatial phase of the respective set of sensing elements. The positive loop prescribed relationship comprises a configuration wherein a shifted proportion up to half of a total sensing element effective area of the number of positive polarity loops is shifted along the measuring axis direction in a first direction by an amount (W1)/4K in relationship to the respective nominal spatial phase, and a nominally the same shifted proportion of the total sensing element effective area of the number of positive polarity loops is shifted along the measuring axis direction in a direction opposite to the first direction by an amount (W1)/4K in relationship to the respective nominal spatial phase, such that the two shifted proportions of the total sensing element effective area of the positive polarity loops area are shifted by (W1)/2K relative to one another, wherein K is one of 3, 5, 7 or 9. The negative loop prescribed relationship comprises a configuration wherein a shifted proportion up to half of a total sensing element effective area of the number of negative polarity loops is shifted along the measuring axis direction in a first direction by an amount (W1)/4K in relationship to the respective nominal spatial phase, and nominally the same shifted proportion of the total sensing element effective area of the number of negative polarity loops is shifted along the measuring axis direction in a direction opposite to the first direction by an amount (W1)/4K in relationship to the respective nominal spatial phase, such that the first two shifted proportions of the total sensing element effective area of the negative polarity loops area are shifted by (W1)/2K relative to one another;

D1) Each of the positive and negative polarity loops comprise a sensing element effective area EffASEN that has a maximum dimension DSENmax along the measuring axis direction that is at most 0.45*W1; and E1) The respective set of sensing elements corresponding to a respective nominal spatial phase (SETSENPh0) is configured in a two-portion configuration comprising: a first separated portion comprising the same number of positive polarity loops and negative polarity loops; and a second separated portion that is nominally aligned along the measuring axis direction with the first portion, and that comprises the same number of positive polarity loops and negative polarity loops as the first separated portion; wherein the first and second separated portions are separated by a gap located along the measuring axis direction between the first portion and the second portion, wherein the gap is at least as wide along the measuring axis direction as one of the positive or negative polarity loops and no positive polarity loop effective area or negative polarity loop effective area of that respective set of sensing elements is located in the gap;

whereby the respective set of sensing elements corresponding to the respective nominal spatial phase (SETSENPh0) is configured in a practical configuration that provides a spatially filtered detector signal or signals usable to reduce or suppress both a potential unwanted 3rd spatial harmonic detector signal component and a potential unwanted Kth spatial harmonic detector signal component, that may otherwise contribute to error in the determined relative position between the detector portion and the scale pattern.

As a result of implementing the features A1, B1, C1, along with at least one of the features D1 and/or E1 as outlined above, the respective set of sensing elements corresponding to the respective nominal spatial phase is thereby configured to provide a spatially filtered detector signal or signals usable to reduce or suppress both a potential unwanted $3^{rd}$ spatial harmonic signal component and a potential unwanted Kth spatial harmonic signal component that may otherwise contribute to error in the determined relative position between the detector portion and the scale pattern. Furthermore, the configuration provides the spatial filtering outlined above, while also providing a novel "layout friendly" loop arrangement to solve longstanding detrimental layout problems, as described in greater detail below. In some implementations of the first type, it may be particularly advantageous when K=5. In certain implementations of the first type, it may be advantageous when at least a majority of the positive and negative polarity loops are configured to provide a sensing element average dimension DSENavg that is at least 0.29*W1 and at most 0.31*W1, as described in greater detail below with respect to various figures.

In various implementations of the first type, each respective positive or negative polarity loop included in a respective set of sensing elements that comprises the features A1, B1, C1 and at least one of the features D1 and/or E1, may be configured to provide a respective sensing element effective area EffASEN that does not overlap a sensing element effective area EffASEN of any other respective positive or negative polarity loop included in that respective set of sensing elements. This may facilitate a layout with lower fabrication costs and/or may allow elimination of detrimental loop shape irregularities arising from layout problems arising in prior art methods for providing spatial filtering and/or misalignment error reduction features. There is no configuration in the prior art that provides a comparable combination of spatial filtering performance, robustness against misalignment, and relatively ideal loop shapes throughout a set of sensing elements along with an economical fabrication layout.

In some implementations of the first type, at least a first respective set of sensing elements corresponding to a respective nominal spatial phase comprises the features A1, B1, C1 and D1, and does not comprise the feature E1. In some such implementations the first respective set of sensing elements may comprise: a first adjacent portion comprising the same number of positive polarity loops and negative polarity loops; and a second adjacent portion that is nominally aligned along the measuring axis direction with the first adjacent portion, and that comprises the same number of positive polarity loops and negative polarity loops as the first adjacent portion. The first and second adjacent portions may be located closer to one another along the measuring axis direction than a width of one of the positive or negative polarity loops (which is why they are called "adjacent" portions herein), and the respective loops of the first and second adjacent portions that are closest to one another may have opposite loop polarities. In some such implementations, the electronic position encoder may comprise at least a second respective set of sensing elements corresponding to a respective nominal spatial phase that is 90 degrees different than the nominal spatial phase of the first respective set of sensing elements, wherein: the second respective set of sensing elements comprises the features A1, B1, C1, D1 and E1; the second respective set of sensing elements is configured such that the respective loops of its first and second separated portions that are closest to one another have the same loop polarities; the first respective set of sensing elements has a first area centroid of its total sensing element effective area located along the measuring axis between its first and second adjacent portions; the second respective set of sensing elements has a second area centroid of its total sensing element effective area located along the measuring axis between its first and second separated portions; and the first and second respective sets of sensing elements are arranged with their respective first and second area centroids aligned at the same location along the measuring axis direction. Such implementations having aligned centroids may offer certain advantages with respect to rejecting certain errors due "pitch" misalignment between the detector portion and the scale pattern, while at the same time facilitating economical layout and fabrication, as described in greater detail below with respect to various figures. In some such implementations, each respective positive or negative polarity loop included in one of the first or second respective set of sensing elements is configured to provide a respective sensing element effective area EffASEN that does not overlap a sensing element effective area EffASEN of any other respective positive or negative polarity loop included in that same one of the first or second respective set of sensing elements.

In various implementations that include two adjacent portions, or two separated portions as outlined above, the electronic position encoder may be configured according to one of M1 or M2, wherein: M1) the first adjacent (or separated) portion is configured to output a first detector signal and the second adjacent (or separated) portion is configured to output a second detector signal, and the signal processor is configured to determine the relative position between the detector portion and the scale pattern based at least partly on a combination of the first and second signals; or M2) the first adjacent (or separated) portion is connected in series with the second adjacent (or separated) portion to form a combined signal and the series connection is configured such that the respective signal contributions of the first and second portions are additive in the combined signal; and the signal processor is configured to determine the relative position between the detector portion and the scale pattern based at least partly on the combined signal. In the case of adjacent portions connected in series, the first and second adjacent portions may be interpreted as parts of a continuous uninterrupted set of sensing elements, in some implementations.

In some implementations of the first type, at least a first respective set of sensing elements corresponding to a respective nominal spatial phase comprises the features A1, B1, C1, and the feature E1. In some such implementations, the first respective set of sensing elements may be configured such that the respective loops of its first and second separated portions that are closest to one another have the same loop polarity. Some such implementations may comprise at least a second respective set of sensing elements corresponding to a respective nominal spatial phase that is 90 degrees different than the nominal spatial phase of the first respective set of sensing elements, wherein: the second respective set of sensing elements comprises the features A1, B1, C1 and E1; the second respective set of sensing elements is configured such that the respective loops of its first and second separated portions that are closest to one another have opposite loop polarities; the first respective set of sensing elements has a first area centroid of its total sensing element effective area located along the measuring axis between its first and second separated portions; the second respective set of sensing elements has a second area centroid of its total sensing element effective area located along the measuring axis between its first and second separated portions; and the first and second respective sets of sensing elements are arranged with their respective first and second area centroids aligned at the same location along the measuring axis direction. In some such implementations, each respective positive or negative polarity loop included in one of the first or second respective set of sensing elements is configured to provide a respective sensing element effective area EffASEN that does not overlap a sensing element effective area EffASEN of any other respective positive or negative polarity loop included in that same one of the first or second respective set of sensing elements. In some such implementations, both first and second respective sets of sensing elements comprise both of the features D1 and E1.

In some implementations of the first type, at least a first respective set of sensing elements corresponding to a respective nominal spatial phase comprises the features A1, B1, C1, and at least the feature D1, and is configured according to the feature C1 wherein it is configured with a number of pairs of adjacent positive polarity loop and negative polarity loop sensing element effective areas shifted along the measuring axis direction in the first direction by the amount (W1)/4K, and the same number of pairs of adjacent positive polarity loop and negative polarity loop sensing element effective areas shifted along the measuring axis in the direction opposite to the first direction by the amount (W1)/4K. Such a configuration wherein positive and negative polarity sensing loops are shifted "in pairs" may provide improved accuracy and/or robustness against misalignment (in comparison to shifting positive polarity loops in a first direction and negative polarity loops in the opposite direction, for example). In some such implementations, it may be advantageous if two respective pairs of adjacent loops that are at opposite ends of the first respective set of sensing elements have positive polarity loop and negative polarity loop sensing element effective areas that are shifted along the measuring axis in the same direction in those two respective pairs (e.g., as outlined with reference to FIG. 12).

The various implementations of the first type outlined above may be configured for operation with a "single track" scale having a single scale pattern track (e.g., as outlined below with reference to FIGS. 9, 10, 11, and 12), or for operation with a "two track" scale having two scale pattern tracks (e.g., as outlined below with reference to FIG. 13). In various "two track" implementations the scale pattern comprises signal modulating elements arranged in first and second tracks that extend along the measuring axis direction, and the field generating coil is configured to surround a first interior area portion that is aligned with the first track, and a second interior area that is aligned with the second track. In such implementations, a respective set of sensing elements may comprise the features A1, B1, C1, and at least one of the features D1 and/or E1, and comprises conductive loops that each extend transverse to the measuring axis direction across the first and second interior area portions to define first and second sensing element effective area portions corresponding to those portions of the sensing element that are aligned with or overlap the first and second interior area portions, respectively, whereby a detector signal contribution arising in each conductive loop combines the respective detector signal contributions from its first and second sensing element effective area portions.

In some such two track implementations, it may be advantageous to use a configuration as follows: the scale pattern may comprise signal modulating elements or signal modulating element portions periodically arranged in the first track according to the wavelength W1, and signal modulating elements or signal modulating element portions periodically arranged in the second track according to the wavelength W1, wherein the periodic arrangements in the first and second tracks are offset relative to one another by (W1)/2. The field generating coil is configured to generate a first polarity of changing magnetic flux in the first interior area portion, and an opposite second polarity of changing magnetic flux in in the second interior area portion.

Of course, the various advantageous features outlined above may be used in any encoder for a plurality of respective sets of sensing elements corresponding to a plurality of respective spatial phases (e.g., to provide quadrature signals, or 3-phase signals, as outlined above). For example, in some such implementations, the plurality of respective sets of sensing elements corresponding to a plurality of respective spatial phases may each comprise at least the features A1, B1, C1, and at least one of the plurality of respective sets of sensing elements may further comprise at least the feature E1. Such implementations may thereby be configured to provide a plurality of spatially filtered detector signals usable to reduce or suppress potential unwanted $3^{rd}$ spatial harmonic detector signal components and potential unwanted Kth spatial harmonic detector signal components that may otherwise contribute to error in the determined relative position between the detector portion and the scale pattern. In some such implementations, each of the plurality of respective sets of sensing elements has an area centroid of its total sensing element effective area located within its span along the measuring axis and the plurality of respective sets of sensing elements may be configured with their respective area centroids located at nominally the same location along the measuring axis direction. Such configurations may provide robust rejection of certain misalignment errors, as described in greater detail below. In some such implementations, each respective positive or negative polarity loop included in any one of the plurality of respective set of sensing elements is configured to provide a respective sensing element effective area EffASEN that does not overlap a sensing element effective area EffASEN of any other respective positive or negative polarity loop included in that same one of the plurality of respective set of sensing elements.

In various implementations of a second type according to principles disclosed herein (e.g., as shown in FIGS. 14-17), at least one respective set of sensing elements corresponding to a respective nominal spatial phase comprises features A2 and B2, defined as follows:

A2) a number of positive polarity loops corresponding to a first winding direction or polarity, and the same number of negative polarity loops corresponding to a second winding direction or polarity opposite to the first; and B2) at least a majority of the positive polarity loops and at least a majority of the negative polarity loops are configured with their sensing element effective areas arranged in a prescribed intra-loop shift relationship relative to the respective nominal spatial phase of the respective set of sensing elements, wherein the intra-loop shift relationship comprises a configuration wherein within each such loop an intra-loop shifted proportion of up to half of their sensing element effective area is shifted along the measuring axis direction in a first direction by an amount (W1)/4K in relationship to the respective nominal spatial phase, and nominally the same intra-loop shifted proportion of their sensing element effective area is shifted along the measuring axis direction in a direction opposite to the first direction by an amount (W1)/4K in relationship to the respective nominal spatial phase, whereby the two intra-loop shifted proportions are shifted by (W1)/2K relative to one another, wherein K is one of 3, 5, 7 or 9.

As a result of implementing the features (A2 and B2) as outlined above, the respective set of sensing elements corresponding to the respective nominal spatial phase is thereby configured in a practical configuration that provides spatially filtered detector signal or signals usable to reduce or suppress a potential unwanted Kth spatial harmonic detector signal component that may otherwise contribute to error in the determined relative position between the detector portion and the scale pattern.

In some implementations of the second type, in the positive and negative polarity loops that are configured with their sensing element effective areas arranged in the prescribed intra-loop shift relationship, the intra-loop shifted proportion may be nominally half of their sensing element effective area. In some implementations of the second type, it may be particularly advantageous when all the positive polarity loops and negative polarity loops are configured with their sensing element effective areas arranged in the prescribed intra-loop shift relationship.

In some implementations of the second type, at least a first respective set of sensing elements is configured according to the features A2 and B2 wherein it comprises at least a first pair of positive and negative polarity loops which are configured to have nominally congruent shapes for their sensing element effective areas, and at least a second pair of positive and negative polarity loops which are configured to have nominally congruent shapes for their sensing element effective areas, wherein the congruent shapes of the first and second pairs are nominally mirror images of one another, and the first and second pair of positive and negative polarity loops are located adjacent to one another. Such a configuration comprising "mirror imaged pairs" may provide improved accuracy and/or robustness against certain misalignments in some implementations. In some such implementations, it may be advantageous if the first respective set of sensing elements is further configured to comprise at least a first end pair of positive and negative polarity loops which are configured to have nominally congruent shapes for their sensing element effective areas within the first end pair, and at least a second end pair of positive and negative polarity loops which are configured to have nominally congruent shapes for their sensing element effective areas within the second end pair, and the congruent shapes of the first and second end pairs are also nominally congruent between the first and second end pair. It will be understood that the first and second end pairs are located at first and second ends of the first respective set of sensing elements.

In some implementations of the second type, each sensing element included in a respective set of sensing elements configured to comprise the features A2 and B2, may have a total sensing element effective area EffASEN that is aligned with or overlaps one or more interior areas may be defined to have an effective y-axis dimension EffYSEN along a y-axis direction that is the sum of the dimensions of the one or more interior areas perpendicular to the measuring axis direction. It may be advantageous in various implementations if at least a majority of such sensing elements are configured to provide a sensing element average dimension DSENavg=(EffASEN/EffYSEN) along the measuring axis direction that is within the range 0.33*W1+/−15%, as described in greater detail below with respect to various figures. In various such implementations, K may be 5, 7 or 9. In such implementations, the respective set of sensing elements configured to comprise the features A2 and B2 is thereby configured to provide a spatially filtered detector signal or signals usable to reduce a potential unwanted $3^{rd}$ spatial harmonic detector signal component and a potential unwanted Kth spatial harmonic detector signal component that may otherwise contribute to error in the determined relative position between the detector portion and the scale pattern. In some such implementations it may be particularly advantageous when K=5. In some such implementations, each respective positive or negative polarity loop included in the respective set of sensing elements that is configured to comprise the features A2 and B2 may be configured to provide a respective sensing element effective area EffA-SEN that does not overlap a sensing element effective area EffASEN of any other respective positive or negative polarity loop included in that respective set of sensing elements.

In some implementations of the second type, at least a first respective set of sensing elements corresponding to a respective nominal spatial phase is configured according to the features A2 and B2 wherein it comprises a two-portion configuration comprising: a first separated portion comprising the same number of positive polarity loops and negative polarity loops; and a second separated portion that is nominally aligned along the measuring axis direction with the first portion and that comprises the same number of positive polarity loops and negative polarity loops as the first separated portion; wherein the first and second separated portions are separated by a gap located along the measuring axis direction between the first portion and the second portion, and the gap is at least as wide along the measuring axis direction as one of the positive or negative polarity loops and no positive polarity loop effective area or negative polarity loop effective area of that respective set of sensing elements is located in the gap. In some such implementations, the first respective set of sensing elements is configured such that the respective loops of its first and second separated portions that are closest to one another have the same loop polarity. In some such implementations, the electronic position encoder further comprises at least a second respective set of sensing elements corresponding to a respective nominal spatial phase that is 90 degrees different than the nominal spatial phase of the first respective set of sensing elements, and the second respective set of sensing elements is configured according to the features A2 and B2, wherein it is configured in a two-portion configuration. That two portion configuration may comprise either two "adjacent portions" in some implementations, or two "separated portions" in other implementations. The following description describes both cases, by referring to the alternative characteristics related to "separated portions" in parentheses. That two portion configuration may comprise: a first adjacent (separated) portion comprising the same number of positive polarity loops and negative polarity loops; and a second adjacent (separated) portion that is nominally aligned along the measuring axis direction with the first adjacent (separated) portion, and that comprises the same number of positive polarity loops and negative polarity loops as the first adjacent (separated) portion. The first and second adjacent (separated) portions are located closer to one another (farther from one another) along the measuring axis direction than a width of one of the positive or negative polarity loops, and the respective loops of the first and second adjacent (separated) portions that are closest to one another have opposite loop polarities. The first respective set of sensing elements has a first area centroid of its total sensing element effective area located along the measuring axis between its first and second separated portions, and the second respective set of sensing elements has a second area centroid of its total sensing element effective area located along the measuring axis between its first and second adjacent (separated) portions. In some such implementations, the first and second respective sets of sensing elements may be arranged with their respective first and second area centroids aligned at the same location along the measuring axis direction. Such implementations having aligned centroids may offer certain advantages with respect to rejecting certain errors due to "pitch" misalignment between the detector portion and the scale pattern, while at the same time facilitating economical layout and fabrication, as described in greater detail below with respect to various figures. In some such implementations, each respective positive or negative polarity loop included in one of the first or second respective set of sensing elements is configured to provide a respective sensing element effective area EffASEN that does not overlap a sensing element effective area EffASEN of any other respective positive or negative polarity loop included in that same one of the first or second respective set of sensing elements.

In various implementations of the second type that include two adjacent portions, or two separated portions as outlined above, the electronic position encoder may be configured according to one of M1 or M2, wherein: M1) the first adjacent (or separated) portion is configured to output a first detector signal and the second adjacent (or separated) portion is configured to output a second detector signal, and the signal processor is configured to determine the relative position between the detector portion and the scale pattern based at least partly on a combination of the first and second signals; or M2) the first adjacent (or separated) portion is connected in series with the second adjacent (or separated) portion to form a combined signal and the series connection is configured such that the respective signal contributions of the first and second portions are additive in the combined signal; and the signal processor is configured to determine the relative position between the detector portion and the scale pattern based at least partly on the combined signal. In the case of adjacent portions connected in series, the first and second adjacent portions may be interpreted as parts of a continuous uninterrupted set of sensing elements, in some implementations.

The various implementations of the second type outlined above may be configured for operation with a "single track" scale having a single scale pattern track (e.g., as outlined below with reference to FIGS. 14, 15 and 16), or for operation with a "two track" scale having two scale pattern tracks (e.g., as outlined below with reference to FIG. 17). In various "two track" implementations of the second type the scale pattern comprises signal modulating elements arranged in first and second tracks that extend along the measuring axis direction, and the field generating coil is configured to surround a first interior area portion that is aligned with the first track, and a second interior area that is aligned with the second track. In such implementations, a respective set of sensing elements may comprise the features A2 and B2 and may comprise conductive loops that each extend transverse to the measuring axis direction across the first and second interior area portions to define first and second sensing element effective area portions corresponding to those portions of the sensing element that are aligned with or overlap the first and second interior area portions, respectively, wherein a detector signal contribution arising in each conductive loop combines the respective detector signal contributions from its first and second sensing element effective area portions.

In some such two track implementations of the second type, it may be advantageous to use a configuration as follows: the scale pattern may comprise signal modulating elements or signal modulating element portions periodically arranged in the first track according to the wavelength W1, and signal modulating elements or signal modulating element portions periodically arranged in the second track according to the wavelength W1, wherein the periodic arrangements in the first and second tracks are offset relative to one another by (W1)/2. The field generating coil is configured to generate a first polarity of changing magnetic flux in the first interior area portion, and an opposite second polarity of changing magnetic flux in in the second interior area portion.

As noted above and described in greater detail below with respect to various figures, many different implementations of the second type may be configured such that each conductive loop or conductive loop portion included in a respective set of sensing elements that comprises the features A2 and B2 may comprise a respective sensing element effective area EffASEN that does not overlap any other respective sensing element effective area EffASEN of any other conductive loop or conductive loop portion included in that same respective set of sensing elements. This may be particularly advantageous in some implementations of the second type for facilitating economical layout and fabrication, while at the same time providing relatively ideal combinations of spatially filtered detector signals and suppression of misalignment errors, as outlined above and described in greater detail below. There is no configuration in the prior art that provides a comparable combination of features and performance advantages.

Of course, any of the implementations of the second type outlined above may be used in any encoder for a plurality of respective sets of sensing elements corresponding to a plurality of respective spatial phases (e.g., to provide quadrature signals, or 3-phase signals), as outlined above. In such implementations each of the plurality of respective sets of sensing elements corresponding to the plurality of respective spatial phases is configured to comprise the features A2) and B2), and is thereby configured to provide spatially filtered detector signals usable to reduce or suppress a potential unwanted Kth spatial harmonic detector signal component that may otherwise contribute to error in the determined relative position between the detector portion and the scale pattern. In some such implementations, each of the plurality of respective sets of sensing elements has an area centroid of its total sensing element effective area located within its span along the measuring axis, and the plurality of respective sets of sensing elements are configured with their respective area centroids aligned at the same location along the measuring axis direction. This may be advantageous for reducing certain misalignment errors that may otherwise arise, as outlined previously and described in greater detail below. As indicated above, in some such implementations each conductive loop or conductive loop portion included in a respective set of sensing elements that comprises the features A2 and B2 may comprise a respective sensing element effective area EffASEN that does not overlap any other respective sensing element effective area EffASEN of any other conductive loop or conductive loop portion included in that same respective set of sensing elements. In some such implementations, each sensing element included in the plurality of respective sets of sensing elements has a total sensing element effective area EffASEN that is aligned with or overlaps one or more interior areas and is defined to have an effective y-axis dimension EffY-SEN along a y-axis direction that is the sum of the dimensions of the one or more interior areas perpendicular to the measuring axis direction, and at least a majority of the sensing elements included in the plurality of respective sets of sensing elements are configured to provide a sensing element average dimension DSENavg=(EffASEN/EffY-SEN) along the measuring axis direction that is within the range 0.33*W1+/−15%, whereby the electronic position encoder is thereby configured to provide a plurality of spatially filtered detector signals usable to reduce or suppress potential unwanted $3^{rd}$ spatial harmonic detector signal components and potential unwanted Kth spatial harmonic detector signal components that may otherwise contribute to error in the determined relative position between the detector portion and the scale pattern.

DETAILED DESCRIPTION

Figure 1:
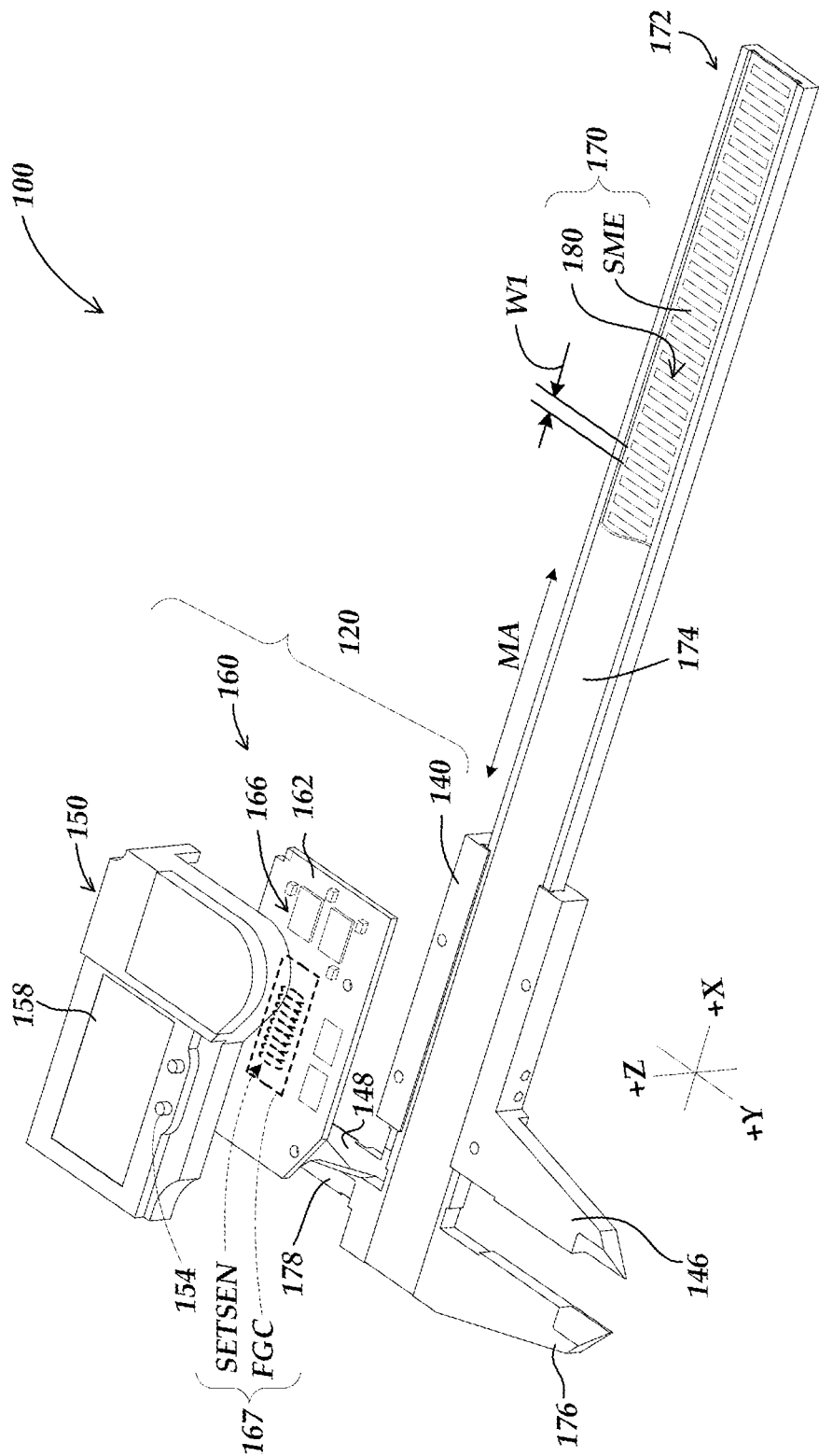
FIG. 1 is an exploded isometric view diagram of a hand tool type caliper utilizing an inductive electronic position encoder including a detector portion and a scale.

FIG. 1 is an exploded isometric view diagram of a hand tool type caliper 100 including a scale member 172 and slider assembly 120. The scale member 172 may comprise a spar of roughly rectangular cross-section including a scale 170 positioned in a groove therein. The slider assembly 120 may include a base 140, an electronic assembly 160, and a cover 150, described in greater detail below. The electronic assembly 160 may include a detector portion 167 and a signal processing configuration 166 arranged on a substrate 162. A resilient seal (not shown) may be compressed between the cover 150 and the substrate 162 to exclude contamination from the circuitry and connections. The scale 170, the detector portion 167 and the signal processing configuration 166 work cooperatively to provide an inductive electronic position encoder that is usable to measure a relative position between two elements (e.g., between the scale member 172 and slider assembly 120) along a measuring axis direction MA.

In various implementations, the scale 170 extends along the measuring axis direction MA (e.g., corresponding to an x-axis direction) and includes a signal modulating scale pattern 180, comprising signal modulating elements SME fabricated on a scale substrate (e.g., using known printed circuit fabrication methods). In various implementations illustrated herein, the signal modulating scale pattern 180 may alternatively be referred to as a periodic scale pattern 180, which is shown to have a spatial wavelength W1 in FIG. 1. In the illustrated implementation, a known type of cover layer 174 (e.g., 100 μm thick) covers the scale 170 (as shown by a cut away portion in FIG. 1).

In various implementations, the mechanical structure and operation of the caliper 100 may be similar to that of certain prior electronic calipers, such as that of commonly assigned U.S. Pat. No. 5,901,458; and/or 6,400,138, and/or RE37490, each of which is hereby incorporated herein by reference in their entirety. Jaws 176 and 178 near a first end of the scale member 172 and movable jaws 146 and 148 on the slider assembly 120 are used to measure dimensions of objects in a known manner. The measured dimension may be displayed on a digital display 158, which is mounted within the cover 150 of the electronic assembly 160. The cover 150 may also include an on/off switch 154 and other optional control buttons if desired, which actuate circuits or elements included in the electronic assembly 160. The base 140 of the slider assembly 120 may include various known elements that are configured to guide it along a mating edge of the scale member 172 to ensure proper alignment for measuring, while moving the slider assembly 120 relative to the scale 170.

As shown in FIG. 1, the detector portion 167 may include a field generating coil FGC and a set of sensing elements SETSEN arranged along the measuring axis direction MA. In one specific illustrative example, the detector portion 167 may be arranged parallel with and facing the scale 170, and a front face of the detector portion 167 that faces the scale 170 may be separated from the scale 170 (and/or the scale pattern 180) by a gap on the order of 0.5 mm along the Z axis direction. The front face of the detector 167 (e.g., its constituent conductors) may be covered by an insulative coating. The structure and operation of the field generating coil FGC and the set of sensing elements SETSEN are described in greater detail below.

It will be appreciated that the caliper 100 shown in FIG. 1 is one of various applications that typically implement an electronic position encoder that has evolved over a number of years to provide a relatively optimized combination of compact size, low power operation (e.g., for long battery life), high resolution and high accuracy measurement, low cost, robustness to contamination, etc. For example, other applications that are perhaps even more challenging in terms of improving evolved accuracy, cost effective design and fabrication include medium and high accuracy digital "dial" indicators (e.g., providing accuracy on the order of 10 micrometers and 1 micrometer, respectively). Even small improvements in any of these factors in any of these applications are highly desirable, but difficult to achieve, especially in light of the design constraints imposed in order to achieve commercial success in the various applications. The principles disclosed and claimed herein provide improvements in a number of these factors for various applications.

Figure 2:
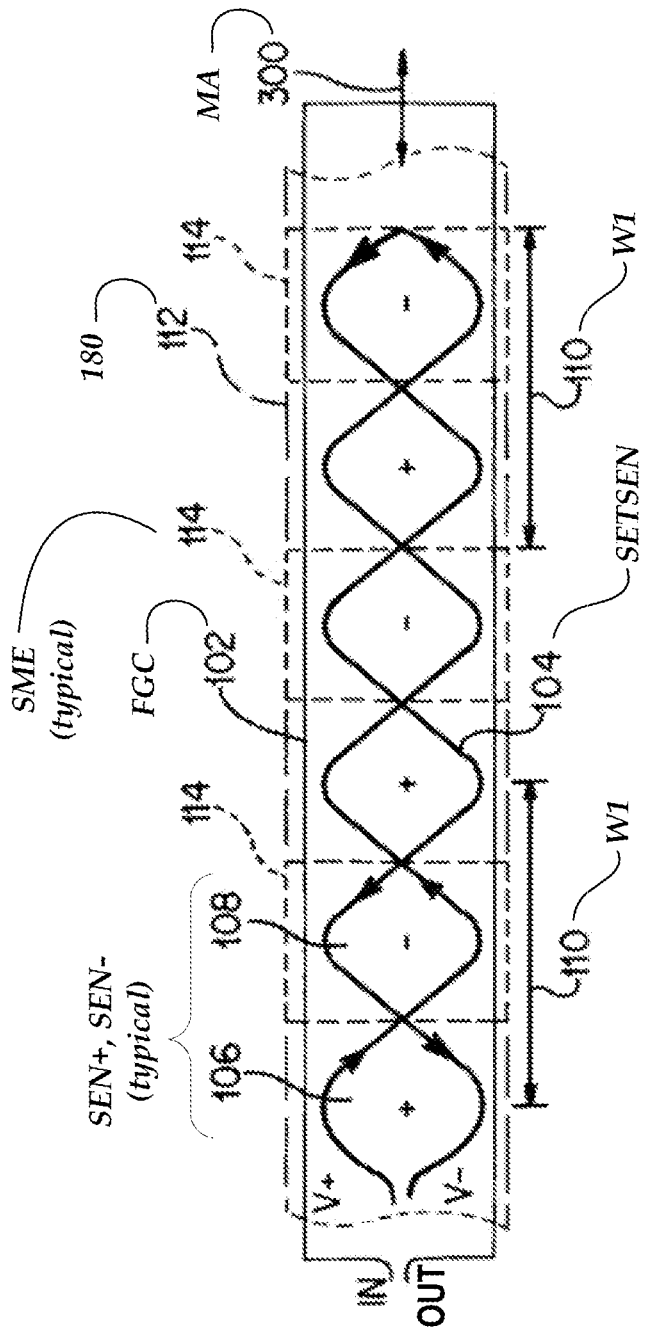
FIG. 2 is a plan view diagram schematically illustrating certain features of a representative prior art inductive electronic position encoder, presented as background information that is relevant to various principles disclosed herein.

FIG. 2 is a plan view diagram schematically illustrating certain features of a representative prior art inductive electronic position encoder shown in the previously incorporated '389 patent, presented as background information that is relevant to various principles disclosed elsewhere herein. FIG. 2 furthermore includes reference numeral annotations to show the comparable reference numerals or symbols used to designate comparable elements in other figures included here. In the following abbreviated description, which is based on the disclosure of the '389 patent, the comparable reference numbers in other figures of the present disclosure are shown in parentheses following the original reference numerals from the '389 patent. A full description related to the prior art FIG. 2 may be found in the '389 patent. Therefore, only an abbreviated description including teachings from the '389 patent that are relevant to the present disclosure is included here. As far as the inventor has been able to ascertain, the teachings outlined below with reference to FIG. 2 represent the conventional reasoning and conventional design practice known in the art and/or used in commercial inductive electronic position encoders.

As disclosed in the '389 patent, a transducer such as that shown in FIG. 2 includes at least two substantially coplanar paths of wire or windings. A transmitter winding 102 (FGC) forms a large planar loop. A receiver winding 104 (SETSEN), in substantially the same plane as the transmitter winding 102, is laid out in one direction as indicated by the arrows in a zig-zag or sinusoidal pattern and then in a reverse direction as indicated by the arrows so that the winding crosses over itself to form alternating loops 106 (SEN+) and 108 (SEN−) interposed between each other, as shown. As a result, each of the alternating loops 106 (SEN+) and 108 (SEN−) of the receiver winding 104 (SETSEN) have a different winding direction or polarity as compared to adjacent loops. By applying an alternating (changing) current to the transmitter winding 102 (FGC), the transmitter winding produces a time-varying magnetic field, extending through the loops 106 (SEN+) and 108 (SEN−) of the receiver winding 104 (SETSEN).

If a scale or scale pattern 112 (180) (a segment of which is outlined by edges indicating alternating long-dash lines and short-dash lines in FIG. 2), including a conductive object (e.g., a conductive plate 114 (SME), several of which are outlined using short-dash lines on the scale pattern 112 in FIG. 2) is moved close to the transducer, the varying magnetic field generated by the transmitter winding 102 (FGC) will induce eddy currents in the conductive object, which in turn sets up a magnetic field from the object that counteracts the varying transmitter magnetic field. As a result, the magnetic flux that the receiver winding 104 (SETSEN) receives is altered or disrupted, thereby causing the receiver winding to output a non-zero EMF signal (a voltage) at the output terminals V+ and V− of the receiver winding 104, which will change polarity as the conductive object moves between the positive polarity "+" loops 106 (SEN+) and negative polarity "−" loops 108 (SEN−).

In this prior art example, the distance between the location of two loops of the same polarity, (e.g., between the location of a loop 106 (SEN+) to the location of the next loop 106 (SEN+)) is defined as a pitch or wavelength 110 (W1) of the transducer. It may be seen that each loop 106 (SEN+) and/or 108 (SEN−) therefore has a length or maximum dimension 0.5*W1 along the measuring axis direction 300. If the conductive object described above (e.g., a conductive plate 114 (SME)) is proximate to the receiver winding 104 (SETSEN) and is continuously varied in position along a measuring axis 300 (MA), the AC amplitude of the signal output from the receiver winding (SETSEN) will vary continuously and periodically with the wavelength 110 (W1) due to the periodic polarity alternation of the loops 106 (SEN) and 108 (SEN) and local disruption of the transmitted magnetic field caused by the conductive object (e.g., a conductive plate 114 (SME)).

The '389 patent emphasizes that if the conductive object (e.g., a conductive plate 114 (SME)) is much smaller or larger than the loops 106 and/or 108 (SEN+, SEN−), then the amplitude of the signal output will be weak and high accuracy will be difficult to obtain. The signal output will have a large amplitude and, thus, be most sensitive to position of the conductive object (e.g., a conductive plate 114 (SME)) if it has a length equal to about half the wavelength 110 (W1) (i.e., when it is possible for the object to be positioned coincident with the loops 106 or 108 (SEN+ or SEN−) exactly). Consequently, the present disclosure (of the '389 patent) preferably employs conductive objects (e.g., conductive plates 114 (SME)) that have a length (along the x-axis direction) equal to one half the wavelength 110 (W1).

It will be appreciated that the transmitter winding 102 (FGC) and the receiver winding 104 (SETSEN) shown in FIG. 2 and described above are one example of a prior art implementation of elements that are designated as a detector portion herein (e.g., the detector portion 167 shown in FIG. 1). The scale or scale pattern 112 (180) is one example of a prior art implementation that is designated as a scale pattern herein (e.g., the scale pattern 180 shown in FIG. 1).

Figure 3:
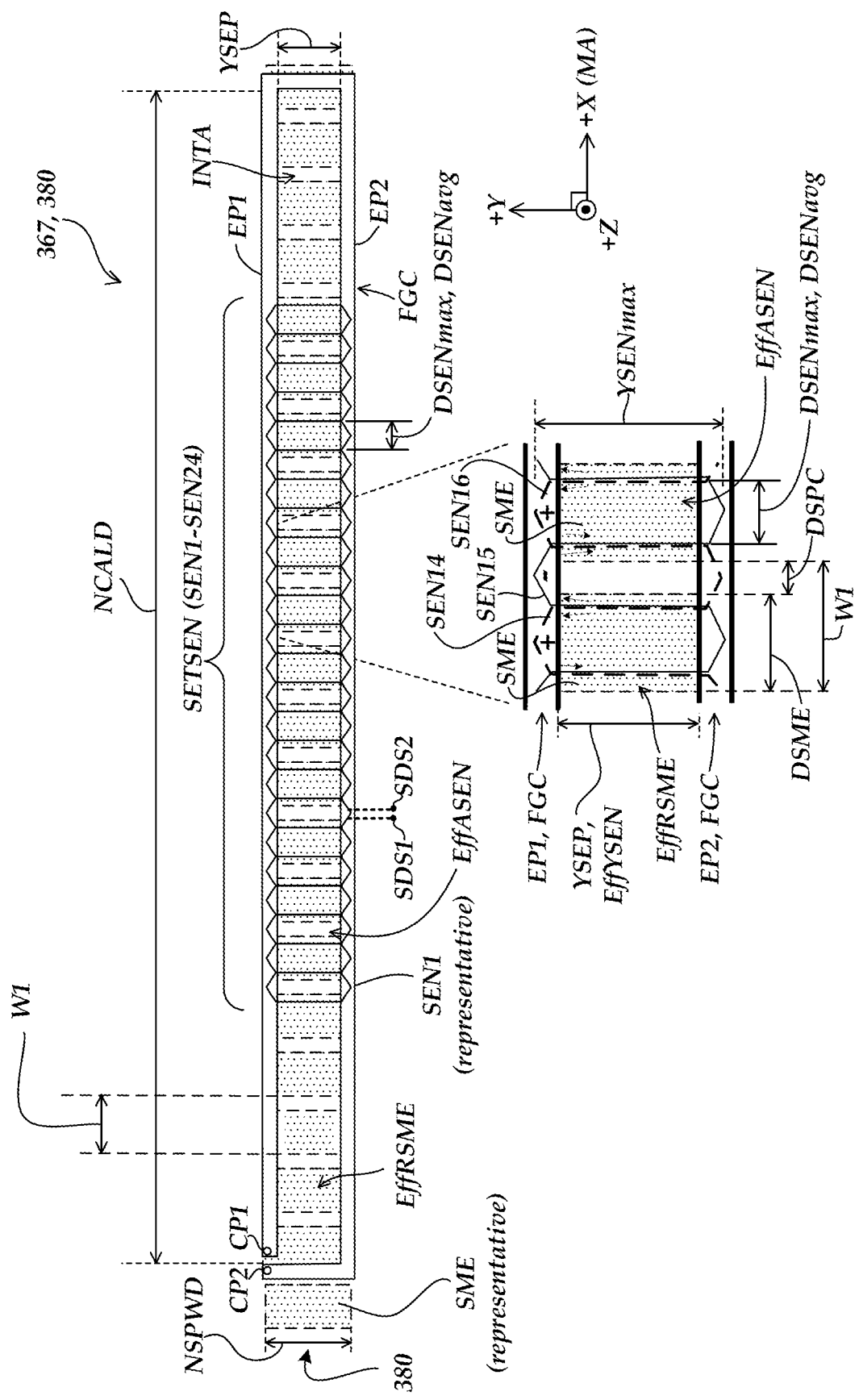
FIG. 3 is a plan view diagram of an implementation of a detector portion and scale pattern usable in an electronic position encoder such as that shown in FIG. 1, wherein signal modulating elements according to principles disclosed herein are shown in combination with "less desirable" previously known sensing elements, along with various dimensions that may characterize their features according to principles disclosed herein.

FIG. 3 is a plan view diagram of an implementation of a detector portion 367 and scale pattern 380 usable in an electronic position encoder such as that shown in FIG. 1, wherein signal modulating elements SME according to principles disclosed herein are shown in combination with previously known "less desirable" sensing elements SEN, for clarity of description. FIG. 3 also introduces various dimensions that may characterize features of the signal modulating elements SME and sensing elements SEN according to principles disclosed herein. More desirable sizes and shapes for the sensing elements SEN according to principles disclosed herein are described further below with reference to FIGS. 6, 7 and 8. Desirable alternative configurations and/or prescribed relationships for arranging the locations and/or shape of the sensing elements SEN according to principles disclosed herein are described further below with reference to FIGS. 9-13, and 14-17.

Various features of the detector portion 367 and scale pattern 380, are configured to fulfill various design principles disclosed and claimed herein, particularly with regard to the signal modulating elements SME. It will be appreciated that certain numbered components 3XX of FIG. 3 may correspond to and/or provide similar operations or functions as similarly numbered components 1XX of FIG. 1 and/or FIG. 2 (e.g., detector portion 367 provides similar operations or functions to detector portion 167), and may be similarly understood unless otherwise indicated.

FIG. 3 may be regarded as partly representational, partly schematic. An enlarged section of the detector portion 367 and scale pattern 380 is illustrated in the lower portion of FIG. 3. In FIG. 3, the various elements described below are represented by their shape or outline, and are shown superimposed on one another to emphasize certain geometric relationships. It will be understood that various elements may reside on different fabrication layers located at different planes along the z-axis direction, as needed to provide various operating gaps and/or insulating layers, as will be apparent to one of ordinary skill in the art based on the following description and the incorporated references. Throughout the figures of this disclosure, it will be appreciated that the illustrated x-axis, y-axis and/or z-axis dimensions of one or more elements may be exaggerated for clarity, but it will be understood that they are not intended to contradict the various dimensional design principles and relationships disclosed and claimed herein.

The illustrated portion of the scale pattern 380 includes a first type of signal modulating elements SME shown in dashed outline with a dotted fill. The periodic scale pattern 380 has a spatial wavelength W1. In this implementation, the signal modulating elements SME of the first type comprise similar conductive plates (e.g., as formed by regions fabricated on a printed circuit board, or as formed by raised regions extending from a conductive substrate). However, in other implementations they may comprise similar conductive loops (e.g., as formed by traces on a printed circuit board), as described in greater detail below. In either case, they are located along the measuring axis direction MA corresponding to the spatial wavelength W1. The scale pattern 380 is generally implemented on a scale (e.g., the scale 170 shown in FIG. 1). The y-direction extremes of most of the signal modulating elements SME are hidden below the first and second elongated portions EP1 and EP2 of the field generating coil FGC in the implementation illustrated in FIG. 3 (e.g., as described in the '335, '943, and '199 patents). It will be appreciated that the scale pattern 380 moves relative to the detector portion 367 during operation, as may be seen in FIG. 1.

In the example of FIG. 3, the scale pattern 380 has a nominal scale pattern width dimension NSPWD along the y-axis direction and comprises generally rectangular signal modulating elements SME that are arranged periodically along the measuring axis direction MA (e.g., corresponding to the x-axis direction). However, more generally, the scale pattern 380 may comprise various alternative spatially modulated patterns including alternative signal modulating element configurations, provided that the pattern has a spatial characteristic which changes as a function of position along the x-axis direction, so as to provide position dependent detector signals (also referred to as detector signal components, in some implementations) arising in the sensing elements SEN (e.g., SEN14) of the set of sensing elements SETSEN in the detector portion 367.

Figure 4:
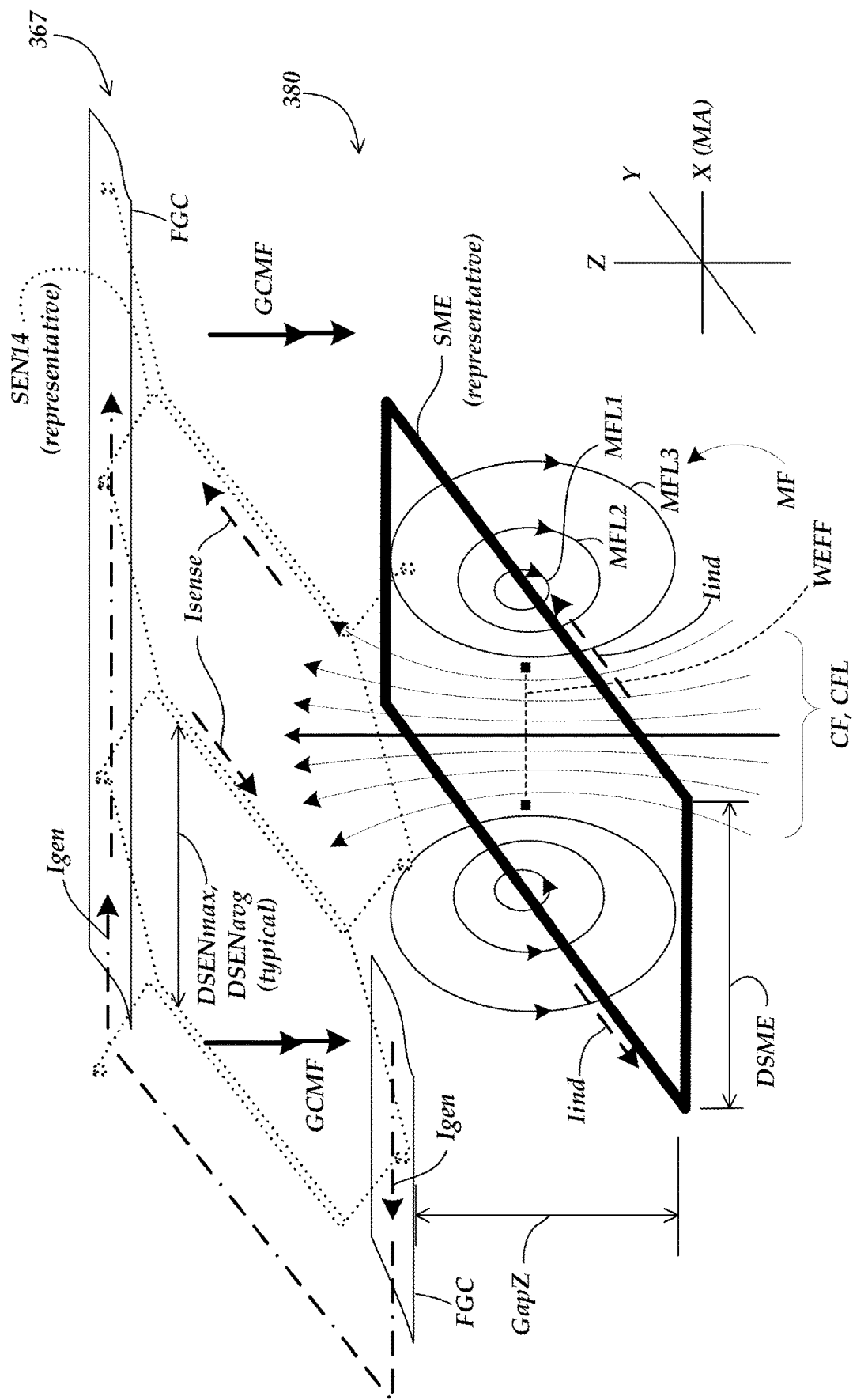
FIG. 4 is an enlarged isometric view of a portion of the detector portion and scale pattern shown in FIG. 3, including a qualitative representation of a magnetic flux and flux coupling characteristics that may be associated with the operation of a signal modulating element in such a position encoder.

In various implementations, the detector portion 367 is configured to be mounted proximate to the scale pattern 380, and to move along the measuring axis direction MA relative to the scale pattern 380. The detector portion includes a field generating coil FGC and a set of sensing elements SETSEN, which may take a variety of alternative configurations to be used in combination with a variety of corresponding signal processing schemes in various implementations, as will be understood by one skilled in the art. FIG. 3 shows a single representative set of sensing elements SEN1-SEN24, which in this implementation comprise sensing loop elements (alternatively referred to as sensing coil elements or sensing winding elements) which are connected in series. In this implementation, adjacent loop elements are connected by a configuration of conductors on various layers of PCB (e.g., connected by feedthroughs) according to known methods (e.g., as illustrated in FIG. 4) such that they have opposite winding polarities. That is, if a first loop responds to a changing magnetic field with a positive polarity detector signal contribution, then the adjacent loops respond with a negative polarity detector signal contribution. Loops having a positive polarity detector signal contribution may be designated SEN+ sensing elements herein, and loops having a negative polarity detector signal contribution may be designated SEN− sensing elements in various contexts herein. In this implementation, the sensing elements are connected in series such that their detector signals or signal contributions are summed, and a "summed" detector signal is output at the detector signal output connections SDS1 and SDS2 to a signal processing configuration (not shown).

Although FIG. 3 shows a single set of sensing elements to avoid visual confusion, it will be appreciated that in various implementations it is advantageous to configure the detector to provide one or more additional sets of sensing elements (e.g., similar to SETSEN) at a different spatial phase position (e.g., to provide quadrature signals), as will be understood by one of ordinary skill in the art. However, it should be appreciated that the configurations of sensing elements described herein are exemplary only, and not limiting. As one example, individual sensing element loops may output individual signals to a corresponding signal processing configuration in some implementations, for example as disclosed in U.S. Pat. No. 9,958,294, which is hereby incorporated by reference in its entirety. More generally, various known sensing element configurations may be used in combination with the principles disclosed and claimed herein, for use in combination with various known scale pattern and signal processing schemes, in various implementations.

The various members of the set of sensing elements SETSEN and the field generating coil FGC may be fixed on a substrate (e.g., substrate 162 of FIG. 1). The field generating coil FGC may be described as surrounding an interior area INTA having a nominal coil area length dimension NCALD along the x-axis direction and a nominal coil area width dimension of approximately YSEP along the y-axis direction. The interior area INTA is aligned with the periodic scale pattern 380 of signal modulating elements SME during operation, approximately as illustrated. In the illustrated implementation, the field generating coil FGC comprises a single turn surrounding the interior area INTA. However, it will be understood that in various other implementations, the field generating coil FGC may comprise a plurality of turns, and/or meander to operationally surround (e.g., operationally partially surround) the interior area INTA that is aligned with the scale pattern 380, as well as to operationally surround (e.g., operationally partially surround) other interior areas aligned with scale tracks that include other scale patterns, as disclosed in the incorporated references. In any case, in operation the field generating coil FGC generates a changing magnetic flux in the interior area INTA in response to a coil drive signal. In the illustrated implementation, the first and second connection portions CP1 and CP2 may be used to connect a coil drive signal from a signal processing configuration (e.g., the signal processing configuration 166 of FIG. 1) to the field generating coil FGC.

The set of sensing elements SETSEN (e.g., the sensing elements SEN1-SEN24) are arranged along the x-axis direction (e.g., corresponding to the measuring axis direction MA) and are fixed on the substrate (e.g., substrate 162 of FIG. 1). As shown in FIG. 3, the members of the set of sensing elements comprise conductive loops or conductive loop portions (e.g., SEN1-SEN24) that define a sensing element effective area EffASEN corresponding to that portion of their sensing element that is aligned with or overlaps the interior area INTA surrounded by the field generating coil FGC (that is, that portion of the sensing element that is aligned with or overlaps the dimension YSEP of INTA). In various implementations, the sensing element effective area EffASEN that is aligned with or overlaps the interior area INTA may be described as having an effective y-axis dimension EffYSEN along a y-axis direction that is perpendicular to the measuring axis direction, and a maximum dimension DSENmax along the measuring axis direction (the x-axis direction). In the particular implementation shown in FIG. 3, the effective y-axis dimension EffYSEN is equal to YSEP, because each of the sensing elements SEN has a maximum sensing element dimension YSENMAX along the y-axis direction that exceeds YSEP and its effective area EffASEN therefore extends over the entire dimension YSEP. The maximum dimension DSENmax along the measuring axis direction is nominally 0.5*W1. However, these characteristics are specific to this implementation and are not limiting, and may be optional (or undesirable) in various implementations, as described in greater detail below with reference to FIGS. 5B, 6, 7, and 8.

It is useful to further characterize the sensing element effective area EffASEN by its sensing element average dimension DSENavg=(EffASEN/EffYSEN) along the measuring axis direction. For the particular implementation shown in FIG. 3, DSENavg is the same as DSENmax because the element effective area EffASEN has parallel sides that are perpendicular to the x-axis direction. However, this need not be the case in all implementations, as described in greater detail below with reference to FIGS. 5B, 6, 7, and 8.

The members of the set of sensing elements SETSEN are configured to provide detector signals which respond to a local effect on the changing magnetic flux provided by an adjacent signal modulating elements SME of the scale pattern 380 (e.g., one or more signal modulating elements SME). A signal processing configuration (e.g., the signal processing configuration 166 of FIG. 1, etc.) may be configured to determine a position of the set of sensing elements SETSEN relative to the scale pattern 380 based on the detector signals input from the detector portion 367. In general, the field generating coil FGC and the set of sensing elements SETSEN, or the like, may operate according to known principles (e.g., for inductive encoders), such as those described in the incorporated references.

In various implementations, the field generating coil FGC and the sensing elements SEN are insulated from one another (e.g., as located in different layers of a printed circuit board, etc.). In one such implementation, the maximum sensing element y-axis dimension YSENmax of the sensing elements SEN is advantageously greater than the nominal coil area width dimension YSEP and extends beyond the interior edges of the elongated portions EP1 or EP2 by an amount defined as an overlap dimension. In addition, the field generating coil FGC may be advantageously configured such that the trace width of the elongated portions EP1 and EP2 along the y-axis direction is larger than the corresponding overlap dimension. In various implementations, the elongated portions EP1 and EP2 may be fabricated on a first layer of a printed circuit board, and the sensing elements SEN may comprise conductive loops fabricated in one or more layers of the printed circuit board that include a layer different than the first layer, at least in the vicinity of the overlap dimension. However, such implementations are exemplary only and not limiting, as described further below.

As previously indicated, in some implementations the field generating coil FGC may comprise a conductive trace or traces fabricated on the printed circuit board, and the members SEN of the set of sensing elements SETSEN may comprise magnetic flux sensing loops or loop portions formed by conductive traces fabricated on the printed circuit board. As described above with respect to FIG. 1, in various implementations the detector portion 367 may be included in various types of measurement instruments (e.g., calipers, micrometers, gauges, linear scales, etc.). For example, the detector portion 367 may be fixed to a slide member, and the scale pattern 380 may be fixed to a beam or spar member having a measuring axis that coincides with an x-axis direction. In such a configuration, the slide member may be movably mounted on the beam or spar member and movable along the measuring axis direction MA in a plane that extends along the x-axis direction and a y-axis direction, with a z-axis direction being orthogonal to the plane.

Regarding the enlarged section of the detector portion 367 and scale pattern 380 illustrated in the lower portion of FIG. 3, it shows three exemplary members SEN14, SEN15 and SEN16 of the set of sensing elements SETSEN and two exemplary signal modulating elements SME, bordered by portions of the field generating coil FGC. In this implementation, the sensing elements may be formed by traces fabricated on first and second layers of a circuit board with a layer of insulator therebetween. The "first layer" traces are shown as solid lines, and the "second layer" traces are shown as dashed lines. Small arrows show a direction of current flow induced in the traces by a changing magnetic field arising from the field generating coil FGC. It may be seen that the sensing element SEN14 may be characterized as a "SEN+" positive polarity loop due to its associated current direction, and the adjacent sensing element SEN15 may be characterized as "SEN−" negative polarity loop due to its associated "opposite polarity" current direction. The next adjacent sensing element SEN16 may again be characterized as a "SEN+" positive polarity loop, and so on.

DSME is the average dimension along the measuring axis direction MA of the "effective region" EffRSME of signal modulating elements SME (of the first type). The effective region EffRSME of a signal modulating element SME is defined here as that portion which is aligned with or overlaps the y-axis dimension of the interior area INTA. The effective region EffRSME produces the primary signal modulation effect in the sensing elements SEN. For the example shown in FIG. 3, it may be seen that this is the portion of the signal modulating element SME that coincides with the span of the dimension YSEP along the y-axis direction for the implementation shown in FIG. 3. In various implementations, the average dimension DSME of a signal modulating element SME may be taken as the area of the effective region EffRSME of a signal modulating element SME divided by the y-axis direction dimension of the effective region EffRSME. Additional examples of the dimension DSME for other configurations of signal modulating elements SME are shown in FIGS. 5A, 5B, 6, 7 and 8.

As previously outlined with reference to FIG. 2, it has been conventional for sensing elements, such as the sensing elements SEN, to have a maximum dimension DSENmax along the measuring axis direction that is 0.5*W1. Such a dimension may be advantageous in various implementations. Furthermore, as previously outlined with reference to FIG. 2, it has also been conventional for signal modulation elements such as the signal modulation elements SME to have an average width dimension DSME that is 0.5*W1. Contrary to the convention prior art design practice outlined immediately above, the inventor has discovered that certain performance characteristics may be improved when the signal modulation elements SME are configured to have an average width dimension DSME that is significantly larger than 0.5*W1, as illustrated in FIG. 3. For example, in various implementations it may be advantageous if DSME is at least 0.55*W1 and at most 0.8*W1. In some such implementations, it may be most advantageous if DMSE is at least 0.66*W1, or 0.7*W1, or more. Some reasons for this are described below with reference to FIG. 4.

In addition, the inventor has furthermore found that in order to mitigate certain errors that would otherwise appear, for the best accuracy in various applications it is most desirable to use them in combination with unconventional sensing elements SEN configured such that their sensing element average dimension DSENavg falls in a range that is significantly less than 0.5*W1. For example, in various implementations it may be desirable if the sensing element average dimension DSENavg is at least 0.285*W1 and at most 0.315*W1, This aspect of the disclosure is described in greater detail below with reference to FIGS. 6, 7 and 8. The unconventional combination of characteristics outlined above provides advantageous detector signal characteristics (e.g., providing better a signal to noise (S/N) ratio, and or reduced error components in the detector signals), in comparison to configurations according to prior art design principles.

FIG. 4 is an enlarged isometric view of a portion of the detector portion 367 and scale pattern 380 shown in FIG. 3, including a qualitative representation of a magnetic flux and flux coupling characteristics that may be associated with the operation of a signal modulating element SME in such a position encoder. FIG. 4 shows various considerations related to why signal modulation elements SME may be advantageously configured to have an average width dimension DSME that is at least 0.55*W1 and at most 0.8*W1 in various implementations.

FIG. 4 shows the response of a signal modulating element SME to a generated changing magnetic field GCMF provided by the field generating coil FGC as outlined previously. As shown in FIG. 4, an applied coil drive signal current Igen in the field generating coil FGC generates the changing magnetic field GCMF, which inductively couples to the signal modulating element SME. The signal modulating element SME is schematically illustrated as a conductive loop in FIG. 4. In response to the coupled changing magnetic field GCMF, an induced current Iind is produced in the signal modulating element SME, which generates an induced magnetic field represented by flux lines (the flux lines including arrow heads in FIG. 4). The illustrated flux lines represent a central magnetic flux CF represented by the central magnetic flux lines CFL, and a marginal magnetic flux MF represented by the closed marginal magnetic flux lines MFL1-MFL3, which are shown encircling the conductive loop of the signal modulating element SME.

Generally speaking, it will be understood that the members of the set of sensing elements SETSEN produce signals (or signal contributions) that are responsive to the induced changing magnetic flux that is represented as outlined above. In particular, the produced signals are responsive to the amount of magnetic flux that is effectively coupled through their interior loop area, to produce a signal contribution or signal component, which is represented as a current Isense in the sensing element SEN14 in FIG. 4. As shown in FIG. 4, in various implementations, the detector portion 367 and the scale pattern 380 may be approximately planar (e.g., they may include or be formed on approximately planar substrates) and the detector portion 367 may be configured to be mounted approximately parallel to the periodic scale pattern 380 with a nominal operating gap GapZ between their respective conductors. For example, in various implementations the nominal operating GapZ may be at least 0.075*W1, to facilitate practical assembly and alignment tolerances. In some such implementations, the nominal operating gap may be at least 0.15*W1. As shown in FIG. 4, the central magnetic flux CF will generally be effectively coupled through the sensing element SEN14 over a practical range of operating gaps. However, due to the operating gap at least some of the marginal magnetic flux MF may not be effectively coupled through the sensing element SEN14. For example, at a relatively larger dimension for the operating gap GapZ, as exaggerated in FIG. 4, none of the marginal magnetic flux lines MFL1-MFL3 are coupled through the sensing element SEN14, and do not contribute to the current Isense. As a result, for the configuration qualitatively illustrated in FIG. 4, the effective width Weff (represented by a dashed bar line in FIG. 4) of the signal modulating element SME that is sensed by the sensing element SEN14 corresponds only to the coupled central magnetic flux lines CFL. It may be seen in FIG. 4, that even as the operational gap GapZ is reduced, for example to couple the marginal magnetic flux line MFL3 through the sensing element SEN14, the effective width Weff would still be less than the average dimension DSME of the signal modulating element SME.

Thus, contrary to conventional prior art teachings outlined above with reference to FIG. 2, a signal modulating element SME advantageously has an average dimension DSME that is greater than the desired effective width Weff, in order to have an effective width Weff that produces the desired maximum signal variation and/or desired signal profile vs. displacement as it is moved past the sensing elements SEN along the measuring axis direction. For example, in some implementations it may be desirable for the dimension Weff to be approximately 0.5*W1, which according to the foregoing discussion means that when using a practical operational gap GapZ the average dimension DSME of a signal modulating element SME may desirably be at least 0.6*W1, or 0.66*W1, or 0.7*W1, or more in some such implementations.

It should be appreciated that when the signal modulating elements SME are conductive plates, rather than conductive loops as shown in FIG. 4, a distribution of "concentric" eddy currents may be produced in such conductive plates in response to the generated changing magnetic field GCMF. These eddy currents are operationally comparable to the induced current Iind shown in FIG. 4. However, if the conductive plate has an average dimension DSME that is the same as the conductive loop SME shown in FIG. 4, then due to their distributed "concentric" pattern of its eddy currents, their "equivalent current location" will be somewhere inside the edges of the conductive plate, resulting in an even smaller effective width Weff that than associated with a conductive loop of similar size. Consequently, in addition to using a relatively larger value of the average dimension DSME when using a relatively larger operating gap between the detector portion 367 and the scale pattern 380, it may be especially desirable for a conductive plate type signal modulating element SME to have an average dimension DSME that is toward the larger end of the desirable ranges outlined above. For example, the inventor has found average dimension DSME between 0.7*W1 and 0.8*W1 to be advantageous in some such implementations.

As a further consideration, regarding the desired signal profile vs. displacement it should be appreciated that the undesirable spatial harmonics included in the signal profile generally speaking depends on the shape of the signal modulating elements SME and their effective width Weff and the shape and width of the sensing elements SEN, as well as the operating gap between them. For example, in detector and scale configurations analogous to those outlined above, when the effective width Weff is approximately 0.5*W1, the even numbered spatial harmonics are largely eliminated from the detector signals. However, the odd spatial harmonics corresponding to 0.33*W1, and so on, may remain. It has been suggested in U.S. patent application Ser. No. 16/021,528, published as U.S. 2020/0003581, that configuring the signal modulating element SME to provide an effective width Weff of 0.66*W1 may tend to suppress the odd spatial harmonics corresponding to 0.33*W1. Alternatively, the inventor has recently learned that it has been suggested in the previously incorporated '708 patent that configuring the signal modulating elements with an actual width of ⅚*W1 (approximately 0.83*W1), with or without a slot of width ⅙*W1 in their middle may tend to suppress the odd spatial harmonics corresponding to 0.33*W1. It is noted that this fails to take into account the explanation of effective width Weff outlined above, and therefore not likely to operate as described in the '708 patent. In any case, these configurations have not provided the expected or desired level of spatial filtering, in practice. Due to the high accuracies already achieved by previously known state-of-the-art inductive position encoders, these configurations have not provided spatial filtering at the expected or predicted level, and have not desirably improved upon or advanced the state of the art in this regard.

Figure 5A:
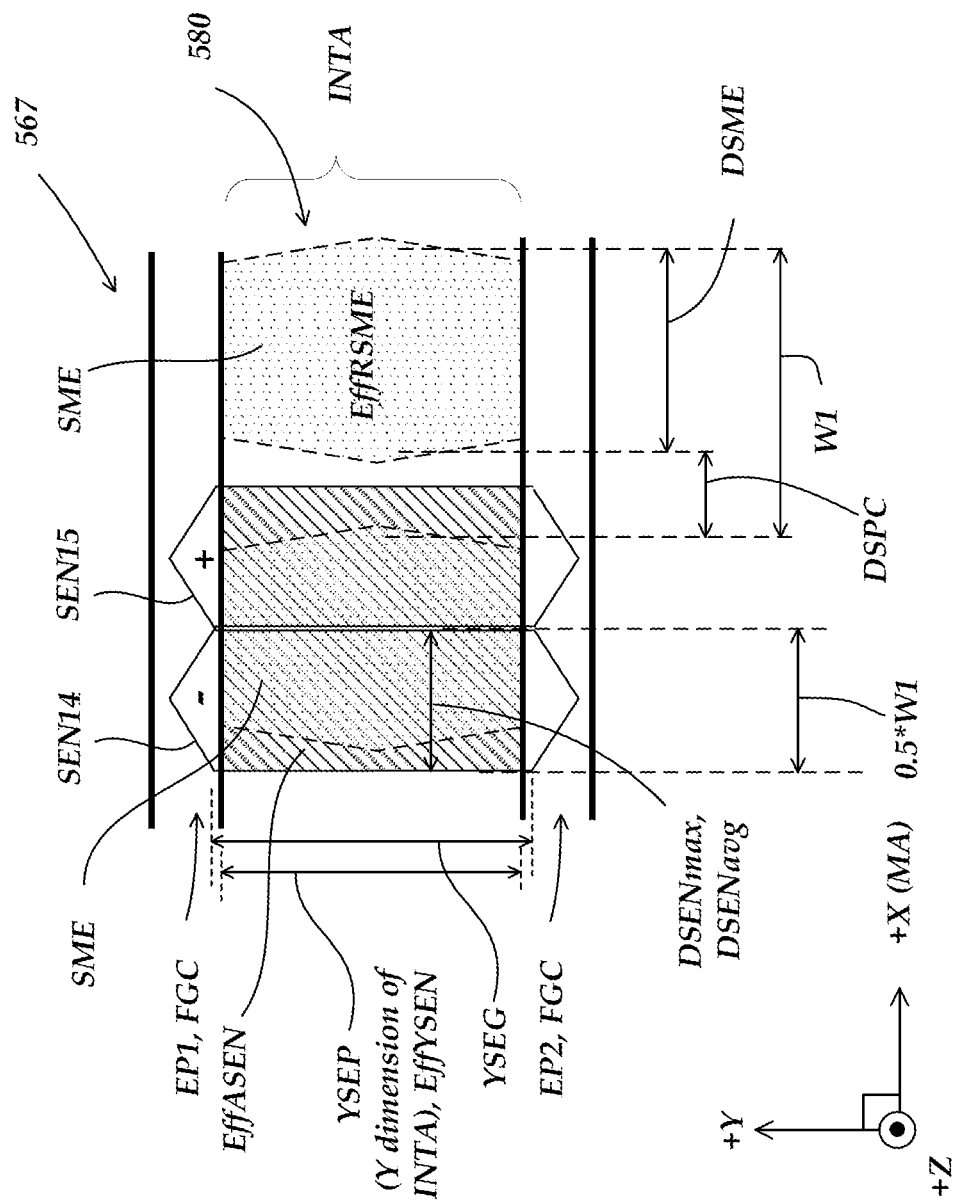
FIGS. 5A and 5B are plan view diagrams schematically illustrating certain aspects of respective signal modulating element and sensing element implementations analogous to those shown in FIG. 3, including additional examples of certain exemplary dimensions that may characterize their features according to principles disclosed herein.
Figure 5B:
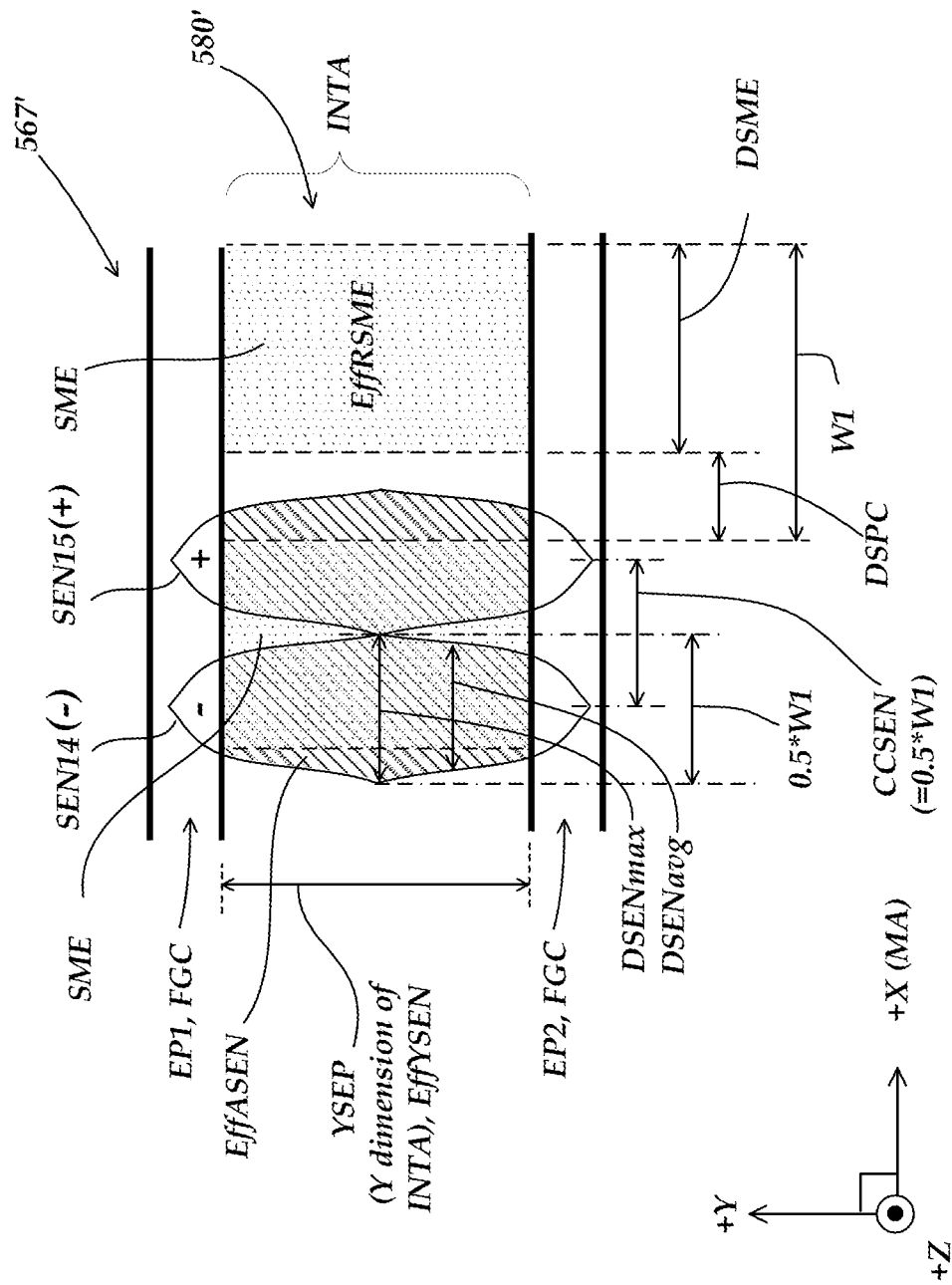

As disclosed herein, the inventor has discovered certain configurations of the sensing elements SEN that may be used in combination with configurations of the signal modulating element SME outlined above to remedy the spatial filtering shortcomings outlined above. Various desirable configurations for the shape of the sensing elements SEN are described in detail below with reference to FIGS. 6, 7, and 8, and various desirable configurations according to prescribed relationships for the location and/or shape of the sensing elements SEN are described in detail below with reference to FIGS. 9-13, and 14-17. However, prior to that, the definition or interpretation of certain dimensions and terms used in that description are clarified with reference to examples shown in FIGS. 5A and 5B. FIGS. 5A and 5B are plan view diagrams schematically illustrating certain aspects of respective signal modulating element and sensing element implementations analogous to those shown in FIG. 3, including additional examples of certain exemplary dimensions that may characterize their features according to principles disclosed herein.

FIGS. 5A and 5B are plan view diagrams schematically illustrating respective inductive electronic position encoder implementations, illustrating further examples of the dimensions and terms DSENmax, DSENavg, DSME, EffRSME, EffASEN, and EffYSEN previously outlined with reference to FIG. 3. The dimension YSEG is also introduced and explained. It will be appreciated that certain numbered components 5XX of FIGS. 5A and 5B may correspond to and/or provide similar operations or functions as similarly numbered components 3XX of FIG. 3, and may be similarly understood unless otherwise indicated.

Figure 7:
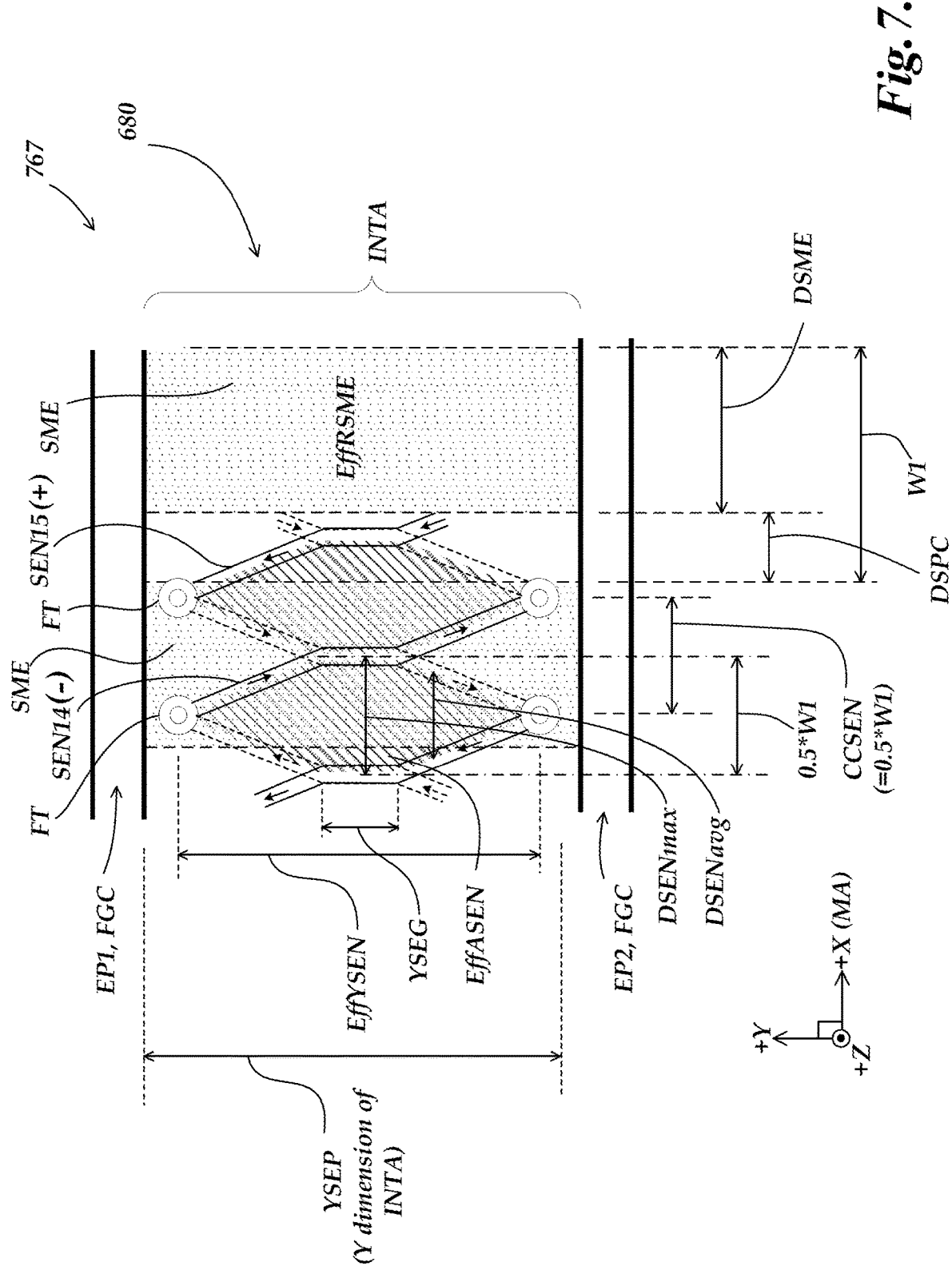

FIGS. 5A and 5B show the spatial wavelength W1 and the previously outlined dimensions and terms as applied to a non-straight boundary profile for the signal modulating elements SME in FIG. 5A, and for a non-straight boundary profile for a sensing element in FIG. 5B. The previously outlined effective region EffRSME of the signal modulating elements SME is indicated by a dotted fill within the region or area of the signal modulating elements SME that falls within its boundaries shown in dashed outline and that is aligned with or overlaps the interior area INTA. DSME is the average dimension along the measuring axis direction MA of the effective region EffRSME of a signal modulating element SME. In various implementations, the average dimension DSME may be taken as the area of the effective region EffRSME of a signal modulating element SME divided by the y-axis direction dimension of that effective region EffRSME. For convenience and consistency of definition, for conductive plate type signal modulating elements SME the relevant dimensions may correspond to the edge of the SME, and for conductive loop type signal modulating elements SME the relevant dimensions may correspond to the conductors midline. For the implementations shown in FIGS. 5A and 5B, the y-axis direction dimension of that effective region EffRSME is the same as the dimension YSEP, because the dimension YSEP of the interior area INTA of the field generating coil FGC is smaller than, and included within, the y-axis dimension of the signal modulating elements SME. However, this need not be the case in all implementations (e.g., as shown in FIG. 7), and the previous definition of the effective region EffRSME is more general, including cases where the y-axis direction dimension of that effective region EffRSME is less than the dimension YSEP.

The previously outlined effective area EffASEN of the sensing elements SEN is indicated by slanted line fill within the area of a sensing element SEN that falls within its boundaries shown in solid outline and that is aligned with or overlaps the interior area INTA. As previously outlined, DSENmax is the maximum sensing element width dimension along the x-axis or measuring axis direction MA for the effective area EffASEN of the sensing element SEN. DSENavg is the average sensing element width dimension, defined as DSENavg=EffASEN/EffYSEN. As previously outlined, EffYSEN is the y-axis dimension of the sensing element effective area EffASEN. In the particular implementations shown in FIGS. 5A and 5B, the effective y-axis dimension EffYSEN is equal to YSEP, because each of the sensing elements SEN has a maximum sensing element dimension along the y-axis direction that exceeds YSEP and its effective area EffASEN therefore extends over the entire dimension YSEP. For the particular implementation shown in FIG. 5A, the effective area EffASEN has parallel sides that are perpendicular to the x-axis direction and have a dimension YSEG that spans YSEP, therefore DSENavg is the same as DSENmax. YSEG is defined for convenience as the y-direction of dimension of segments of the conductors that define sensing elements SEN that are located at the maximum dimension DSENmax apart from one another and that extend straight along the y-axis direction. For the particular implementation shown in FIG. 5B, the effective area EffASEN has a configuration that has the dimension DSENmax at its middle along the y-axis direction, but its sides taper or curve in such that it becomes narrower toward the top and bottom of its effective area EffASEN. Therefore, DSENavg is somewhat less than DSENmax, as shown. For convenience and consistency of definition, when determining DSENavg=EffASEN/EffYSEN a sensing element SEN the relevant dimensions may correspond to the midline of its defining conductors. In the implementations shown in FIGS. 5A and 5B, DSENmax is nominally 0.5*W1. However, this value is not limiting (e.g., as shown below in FIG. 8). The dimensions DSENavg of the configurations of sensing elements SEN shown in FIGS. 5A and 5B are not preferred according to principles outlined below with reference to FIGS. 6, 7 and 8, and are presented only to clarify the definition or determination of DSENavg. The dimension CCSEN shown in FIG. 5B is the center-to-center spacing of the sensing elements SEN along the x-axis direction. In various embodiments, it may be advantageous if CCSEN is 0.5*W1, regardless of the shape or dimension DSENavg of the sensing elements SEN.

FIGS. 5A and 5B also illustrate a dimension DSPC, which is equal to W1 minus DSME. Described a first way, the dimension DSPC may be described as corresponding to "non-signal modulating space" between the signal modulating elements SME of the first type. However, more generally described a second way that applies to various other implementations of a periodic scale pattern, the dimension DSPC may be described as corresponding to signal modulating elements of a second type are located between the signal modulating elements SME of the first type along the measuring axis direction. The signal modulating elements of the second type are configured to have relatively less effect on the changing magnetic flux in comparison to the signal modulating elements SME of the first type. For example, in some implementations, the signal modulating elements of the second type comprise regions of non-conductive material. In some such implementations, the signal modulating elements of the second type comprise regions of a non-conductive scale substrate, wherein the first type of signal modulating elements SME comprise conductors fabricated and/or fixed on the non-conductive scale substrate. As another example, in some implementations, the signal modulating elements of the second type may comprise "more deeply recessed" regions of a conductive material used to form the scale pattern and the signal modulating elements SME of the first type may comprise "unrecessed" regions of the conductive material.

Returning now to the discussion of filtering the $3^{rd}$ spatial harmonic error component (which is periodic at 0.33*W1) from the sensing element signals, as previously noted, the inventor has discovered certain configurations of the sensing elements SEN that may be used in combination with configurations of the signal modulating element SME outlined above to remedy the spatial filtering shortcomings outlined above. It has been known in the prior art to attempt to filter the $3^{rd}$ spatial harmonic error component from the sensing element signals by various means. One approach has been to configure the sensing elements in a sinusoidal shape which theoretically includes only the fundamental spatial frequency corresponding to W1. However, due to various practical considerations and/or fabrication limitations and/or assembly or gap variations, this has not completely suppressed the $3^{rd}$ spatial harmonic error component. Another approach has been to arrange sets of sensing elements SETSEN at spatial phases that are 0.33*W1 apart from one another and process the resulting signals to remove the $3^{rd}$ spatial harmonic error component. This approach is relatively effective, but in many applications it is desirable for practical reasons to provide quadrature signals (that is, at spatial phases that are 0.25*W1 apart) from the sets of sensing elements SETSEN, which may make it difficult or impractical to arrange sets of sensing elements SETSEN at spatial phases that are 0.33*W1 apart (e.g., due to layout constraints or interferences).

To solve the problems and deficiencies inherent in the approached outlined above, the inventor has discovered that configurations of the sensing elements SEN that provide a sensing element average dimension DSENavg in a particularly advantageous range may be used in combination with configurations of the signal modulating element SME outlined above to substantially filter and/or suppress the $3^{rd}$ spatial harmonic error component. Surprisingly, for some detector portion and/or sensing element configurations in some encoders, the particularly advantageous range does not include 0.33*W1, which might otherwise be expected based on obvious theoretical considerations. For example, as disclosed herein, it is particularly advantageous for some detector portion and/or sensing element configurations when sensing elements SEN are configured to provide a sensing element average dimension DSENavg that is at least 0.285*W1 and at most 0.315*W1 is used in combination with signal modulating elements SME that have an average dimension DSME that is at least 0.55*W1 and at most 0.8*W1, for a practical range of wavelengths W1 and operating gaps. Various desirable configurations for such sensing elements SEN are described in detail below with reference to FIGS. 6, 7, and 8.

Figure 6:
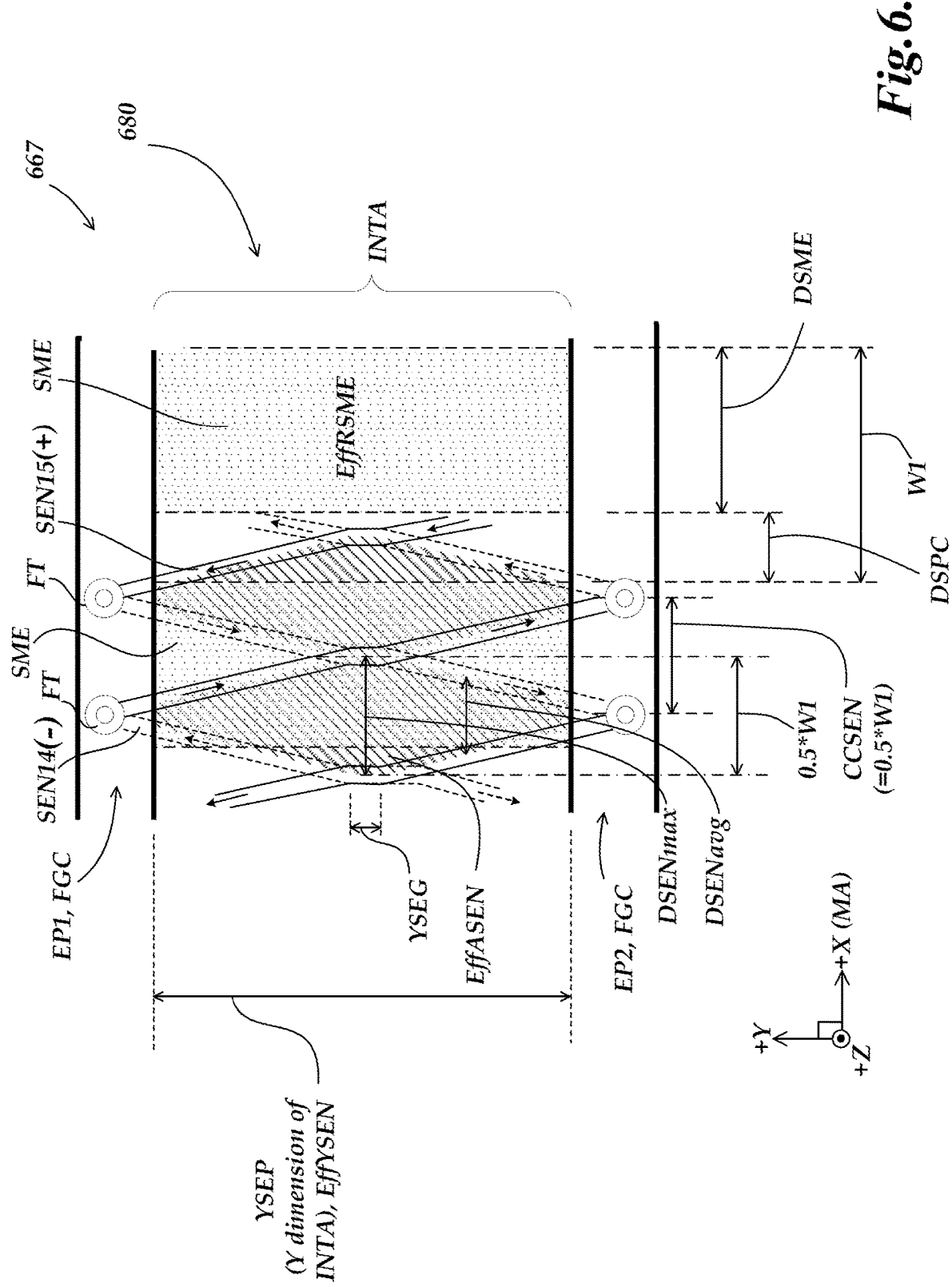
FIGS. 6, 7 and 8 are plan view diagrams illustrating various implementations of sensing elements and scale patterns compatible with sensing element configuration principles disclosed herein with reference to FIGS. 9-12, and suitable for use in a detector portion and scale pattern in an electronic position encoder such as that shown in FIG. 1, along with examples of various dimensions that may characterize their features.
Figure 8:
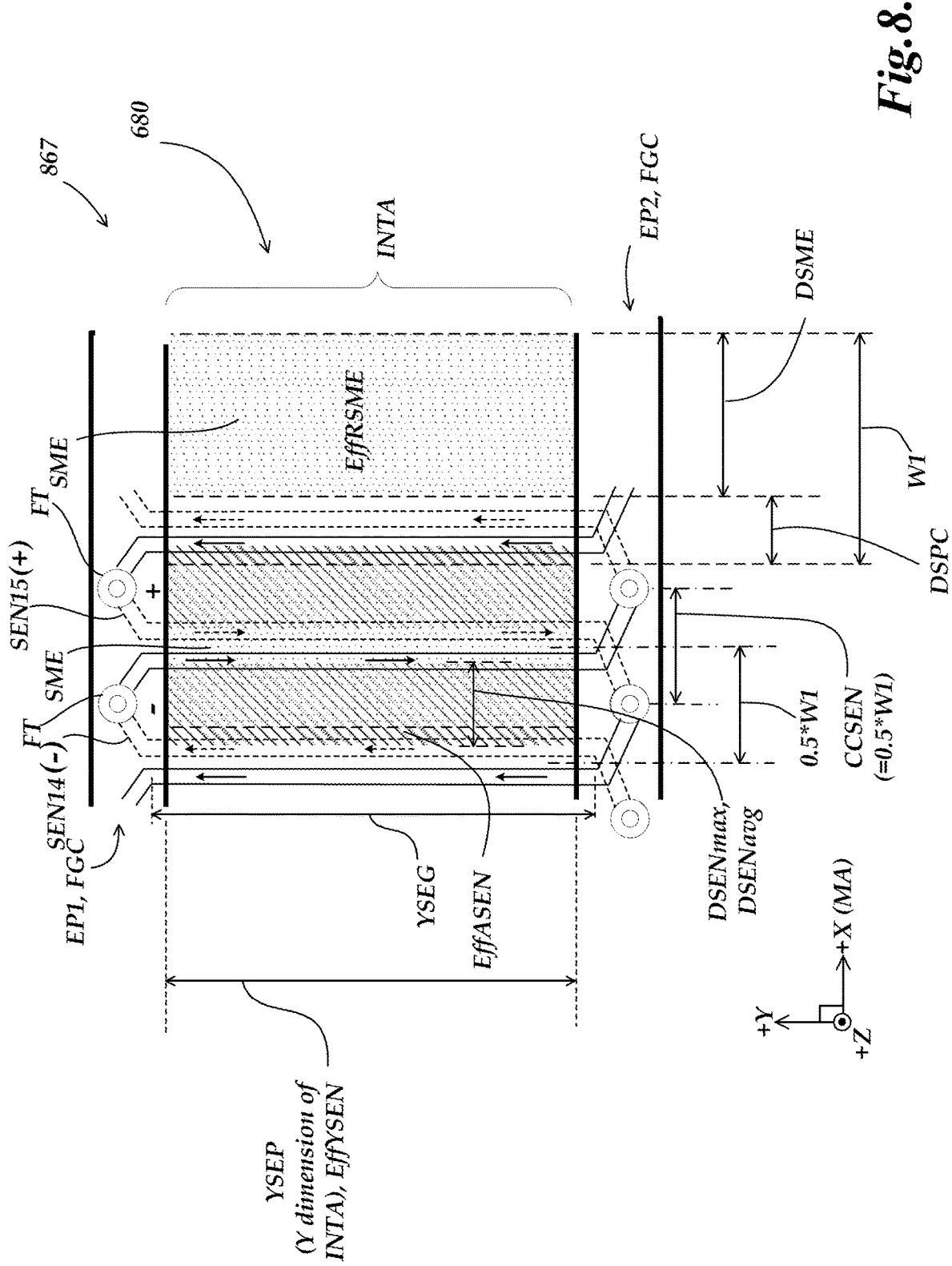

FIGS. 6, 7 and 8 are plan view diagrams illustrating various implementations of sensing elements SEN and scale patterns 680 comprising signal modulating elements SME. The disclosed implementations are compatible with sensing element configuration principles disclosed herein with reference to FIGS. 9-12 or may be used independently. In any case, the disclosed implementations are suitable for use in a detector portion 667 (and/or 767, or 867) and scale pattern 680 in an electronic position encoder such as that shown in FIG. 1. FIGS. 6, 7 and 8 also include examples of various dimensions that may characterize important features of the sensing elements SEN. To assist in understanding the layout of the conductors in the sensing elements SEN, according to a convention used throughout the following figures, their loop polarities are indicated by current flow arrows in their conductor segments, and/or by "+" and/or "−" signs located in the interior of their loops and/or as suffixes (+) or (−) in their labels. It will be appreciated that certain numbered and/or named components in FIGS. 6, 7 and 8 may correspond to and/or operate similarly to similarly numbered or named components of FIGS. 5A and 5B, and may be similarly understood unless otherwise indicated. Therefore, only certain differences in the sensing elements SEN and signal modulating elements SME will be emphasized in the following description.

The implementation shown in FIG. 6 includes signal modulating elements SME analogous to those shown in FIGS. 5A and 5B, having an effective region EffRSME that has an average dimension DSME that is approximately 0.75*W1 (in this particular implementation).

The sensing elements SEN include conductors on a first fabrication layer (shown in solid outline), and conductors on a second fabrication layer (shown in dashed outline) which are connected through feedthroughs FT according to known methods (e.g., as described in the incorporated references). The field generating coil FGC is fabricated on a third fabrication layer in this implementation to insulate it from the feedthroughs FT. As shown in FIG. 6, the conductors of a sensing element SEN include the y-axis direction segments that have the short y-axis dimension YSEG and that are spaced apart along the x-axis direction at DSENmax=0.5*W1, and segments that taper from the y-axis direction segments to the feedthroughs FT. The associated trapezoid shaped effective area EffASEN (indicated by slanted line fill in FIG. 6) has the y-axis dimension EffySEN which is equal to YSEP in this implementation. In various implementations using sensing element shapes and signal modulating elements SME similar to this, it has unexpectedly been determined that it may be advantageous when the sensing element SEN is configured such that DSENavg=EffASEN/EffYSEN is at least at least 0.285*W1 and at most 0.315*W1. In some implementations, it may be particularly desirable if DSENavg is at least 0.29*W1 and at most 0.31*W1. For a given choice of DSENmax, various values of DSENavg may be provided by configuring the dimension YEG and the location of the feedthroughs and the adjoining conductors appropriately. In some such implementations, the y-axis dimension YSEG may be zero. Although DSENmax is nominally 0.5*W1 in the particular implementation that is illustrated, it is possible to configure the conductors of various layers to include overlapping x-axis direction segments in the vicinity of the dimension YSEG and between the adjacent sensing elements SEN, such that DSENmax may be less than 0.5*W1, if desired.

FIG. 7 includes certain numbered and/or named components that may correspond to and/or operate similarly to similarly numbered or named components of FIGS. 6 (and 5A and 5B), and may be similarly understood unless otherwise indicated. Therefore, only certain differences in the sensing elements SEN and signal modulating elements SME will be emphasized in the following description. The implementation shown in FIG. 7 includes signal modulating elements SME analogous to those shown in FIG. 6, having an effective region EffRSME that has an average dimension DSME that is approximately 0.75*W1 (in this particular implementation).

The sensing elements SEN are analogous to those shown in FIG. 6 and include conductors on a first fabrication layer (shown in solid outline), and conductors on a second fabrication layer (shown in dashed outline) which are connected through feedthroughs FT according to known methods (e.g., as described in the incorporated references). However, the feedthroughs FT are located within the interior area INTA. This has the advantage that the field generating coil FGC may be fabricated on the first and/or second fabrication layer in this implementation, which reduces the manufacturing cost of the detector portion 767. It has the disadvantage that the effective area EffASEN of the sensing elements SEN may be smaller than the implementation shown in FIG. 6, which may reduce the signal strength. However, this may be a desirable tradeoff in some applications. The effective area EffASEN in this implementation (indicated by slanted line fill in FIG. 7) has the y-axis dimension EffySEN which is less than YSEP in this implementation. In various implementations, using sensing element shapes and signal modulating elements SME similar to this, it has unexpectedly been determined that it may be advantageous when the sensing element SEN is configured such that DSENavg=EffASEN/EffYSEN is at least 0.285*W1 and at most 0.315*W1. In some implementations, it may be particularly desirable if DSENavg is at least 0.29*W1 and at most 0.31*W1. For a given choice of DSENmax, various values of DESNavg may be provided by configuring the dimension YEG and the location of the feedthroughs and the adjoining conductors appropriately. Although DSENmax is nominally 0.5*W1 in the particular implementation that is illustrated, it is possible to configure the conductors of various layers to include overlapping x-axis direction segments in the vicinity of the dimension YSEG and between the adjacent sensing elements SEN, such that DSENmax may be less than 0.5*W1, if desired. For similarly shaped implementations, when DSENmax is 0.5*W1 or less, the dimension YSEG may need to be at least 0.14*EffYSEN or more, in order that DESNavg is at least 0.285*W1.

FIG. 8 includes certain numbered and/or named components that may correspond to and/or operate similarly to similarly numbered or named components of FIGS. 6 (and 5A and 5B), and may be similarly understood unless otherwise indicated. Therefore, only certain differences in the sensing elements SEN and signal modulating elements SME will be emphasized in the following description. The implementation shown in FIG. 8 includes signal modulating elements SME analogous to those shown in FIG. 6, having an effective region EffRSME that has an average dimension DSME that is approximately 0.75*W1 (in this particular implementation).

The sensing elements SEN are analogous to those shown in FIG. 6 and include conductors on a first fabrication layer (shown in solid outline), and conductors on a second fabrication layer (shown in dashed outline) which are connected through feedthroughs FT according to known methods (e.g., as described in the incorporated references). The field generating coil FGC is fabricated on a third fabrication layer in this implementation to insulate it from the feedthroughs FT. As shown in FIG. 8, the conductors of a sensing element SEN include the y-axis direction segments that have the long y-axis dimension YSEG (longer than and spanning across the dimension YSEP of the interior area INTA) and that are spaced apart along the x-axis direction at DSENmax, and segments that join these segments to the feedthroughs FT.

The associated rectangularly shaped effective area EffASEN (indicated by slanted line fill in FIG. 8) has the y-axis dimension EffySEN which is equal to YSEP in this implementation. In this implementation, DSENavg=DESNmax. In various implementations using sensing element shapes and signal modulating elements SME similar to this, it has unexpectedly been determined that it may be advantageous when, the sensing element SEN is configured such that DSENmax and DSENavg are at least at least 0.285*W1 and at most 0.315*W1. In some implementations, it may be particularly desirable if DSENmax and DSENavg are at least 0.29*W1 and at most 0.31*W1. The implementation shown in FIG. 8 may be less sensitive to unwanted signal changes that might otherwise arise due to various misalignment errors.

Regarding the advantageous range for the dimension DSME of the signal modulating element SME disclosed above, for many practical applications which use the largest practical gap allowed by signal strength considerations, the most advantageous value(s) for DSME may be at least 0.66*W1, or 0.7*W1, or more. For example, in various implementations, a value of 0.75*W1 for DSME has been verified to be particularly advantageous. However, as implied by previous discussion, this may depend to some extent on the particular wavelength W1, and the particular operating gap and operating frequency, and the particular shape and construction of the signal modulating element(s) SME.

Regarding the advantageous range for the dimension DSENavg of the sensing element SEN disclosed above, for many practical applications which use the largest practical gap allowed by signal strength considerations and the most advantageous value(s) for DSME outlined above (e.g., DSME=0.75*W1), the value of DSENavg that combines most advantageously may be within the range 0.29*W1 to 0.31*W1, at least for implementations using sensing element shapes and signal modulating elements SME similar to those outlined above with reference to FIGS. 6-9. In some such implementations, DSENavg=0.30*W1 has been verified to be particularly advantageous. However, as implied by previous discussion, this depends to some extent on the particular wavelength W1, and the particular operating gap, and the particular dimension DSME, and shape and construction of the signal modulating element(s) SME.

It should be appreciated that the $3^{rd}$ spatial harmonic error content in the signal from a set of signal modulating elements SETSEN is extremely sensitive to the selection of dimensions within the ranges disclosed above. For example, it is desirable that the dimension DESNavg be selected such that it rejects the $3^{rd}$ spatial harmonic error content in a signal for practical variations in the fabricated dimensions and/or variations in the operating gap associated with a set of signal modulating elements SETSEN. Surprisingly, when using sensing element shapes and signal modulating elements SME similar to those outlined above, the inventor has discovered that in one implementation configured to provide a value of 0.3*W1 for DSENavg, error components associated with the $3^{rd}$ spatial harmonic error content are uniformly insensitive to variations of the dimension DSME of the signal modulating elements SEN of over a range DSME=0.72*W1 to DSME=0.79*W1. In contrast, if the value DSENavg is changed by as little as 10% from this value (e.g., to 0.27*W1 or 0.33*W1) then error components associated with the $3^{rd}$ spatial harmonic error content increase unacceptably by a factor of 10 or more for variations in the sensing elements SEN of over the range of DSME=0.72*W1 to DSME=0.79*W1.

Regarding why the advantageous range for the dimension DSENavg disclosed is significantly different than the "naively" expected value of 0.33*, one possible explanation is that error components arising from scale-position-dependent impedance variations in the detector are influenced by DSENavg. Such position-dependent impedance variations may be on the order of 1%, and have been unknown or not considered in the prior art. It may be possible that the advantageous range for DSENavg disclosed herein "adjusts" or tunes these impedance variations such that when their signal component contributions are "aliased" to combine with other sources of $3^{rd}$ spatial harmonic error content, the sum of the effects is to negate the $3^{rd}$ spatial harmonic error content. Such subtle effects and associated design characteristics have not been considered in the prior art. It should be appreciated that although particularly advantageous values of DSENavg have been verified and identified above for detector portion and signal modulating element implementations similar to those outlined above with reference to FIGS. 6-8, such values are exemplary only and not limiting. For example, other detector portion and/or signal modulating element implementations, may lead to a different advantageous range of values of DSENavg, for example, possibly due to different error components arising from scale-position-dependent impedance variations in the detector portion, as outlined above. Thus, it should be appreciated that a particular detector portion configured according to the first type or second type of prescribed relationship principles disclosed below with reference to FIGS. 9-17 may benefit from using a particular value of DSENavg that falls outside of the range 0.285*W1 to 0.315*W1. For example, a value of DSENavg somewhere within the larger range of 0.33*W1+/−15% may be useful for sufficiently reducing or suppressing unwanted $3^{rd}$ spatial harmonic detector signal components in various detector portions configured according to the first type or second type of prescribed relationship principles disclosed below. In particular, when such detector portions are configured to sufficiently reduce or suppress unwanted $3^{rd}$ spatial harmonic detector signal components using a value of DSENavg somewhere within the range of 0.33*W1+/−15%, and additionally are configured to reduce or suppress unwanted $5^{th}$ (or $7^{th}$, or $9^{th}$) spatial harmonic detector signal components according to the first type or second type of prescribed relationship principles as outlined below, an unprecedented level of spatial filtering is provided to suppress unwanted spatial harmonics. Furthermore, this unprecedented level of spatial filtering is provided using a layout for the detector portion that is less complicated, higher performing, and more economical to fabricate.

FIGS. 9-13 are partly representational, partly schematic, plan view diagrams illustrating certain aspects of various exemplary configurations of a set of sensing elements SETSEN configured or arranged according to a first type of prescribed relationship principles disclosed herein, such that the sensing elements SETSEN are located to provide spatially filtered signals for use in a detector portion X67 (e.g., 967, 1367, etc.) in an electronic position encoder such as that shown in FIG. 1, along with respective compatible field generating coil configurations FGC and scale patterns X80 (e.g., 980, 1380, etc.), and including various dimensions that may characterize the first type of prescribed relationship principles used for locating their sensing elements SETSEN. According to a convention used herein, an implementation that conforms to the first type of prescribed relationship principles (described in greater detail below) may be referred to as an implementation of the first type, for short.

The principles outlined below with reference to FIGS. 9-13 are advantageous for locating the sensing elements SEN to spatially filter potential $5^{th}$ (or $7^{th}$, or $9^{th}$) harmonic components in the detector signals, and particularly advantageous when used in combination with sensing elements SEN that are shaped to spatially filter potential $3^{rd}$ harmonic components in the detector signals according to principles outlined above. However, it should be appreciated that the principles outlined below with reference to FIGS. 9-13 for locating the sensing elements SEN to spatially filter a potential harmonic error component are not so limited. More generally, these principles may be used in combination with various other sensing elements SEN and signal modulating elements SME (e.g., as known in the prior art) and may still provide significant benefits.

It has been conventional for sensing elements SEN, to be periodically located along the measuring according to the wavelength W1 as previously outlined. In particular, positive polarity loops of the sensing elements SEN are typically uniformly located at a center-to-center spacing of W1, or multiples of W1, and negative polarity loops of the sensing elements SEN are typically uniformly located at the center-to-center spacing of W1, or multiples of W1. Furthermore, the locations of positive polarity loops and the negative polarity loops are generally uniformly offset from one another by (W1)/2 along the measuring axis direction. Such locations and spacing have been considered optimal for signal strength and for spatially filtering potential even spatial harmonics (e.g., $2^{nd}$, $4^{th}$ etc.) in the detector signals. However, the inventor has found that in order to provide spatial filtering to mitigate certain additional error components that may otherwise appear, for the best accuracy in various applications it may be desirable to use different locations and/or spacing for the sensing elements SEN, as described in greater detail below.

Figure 9:
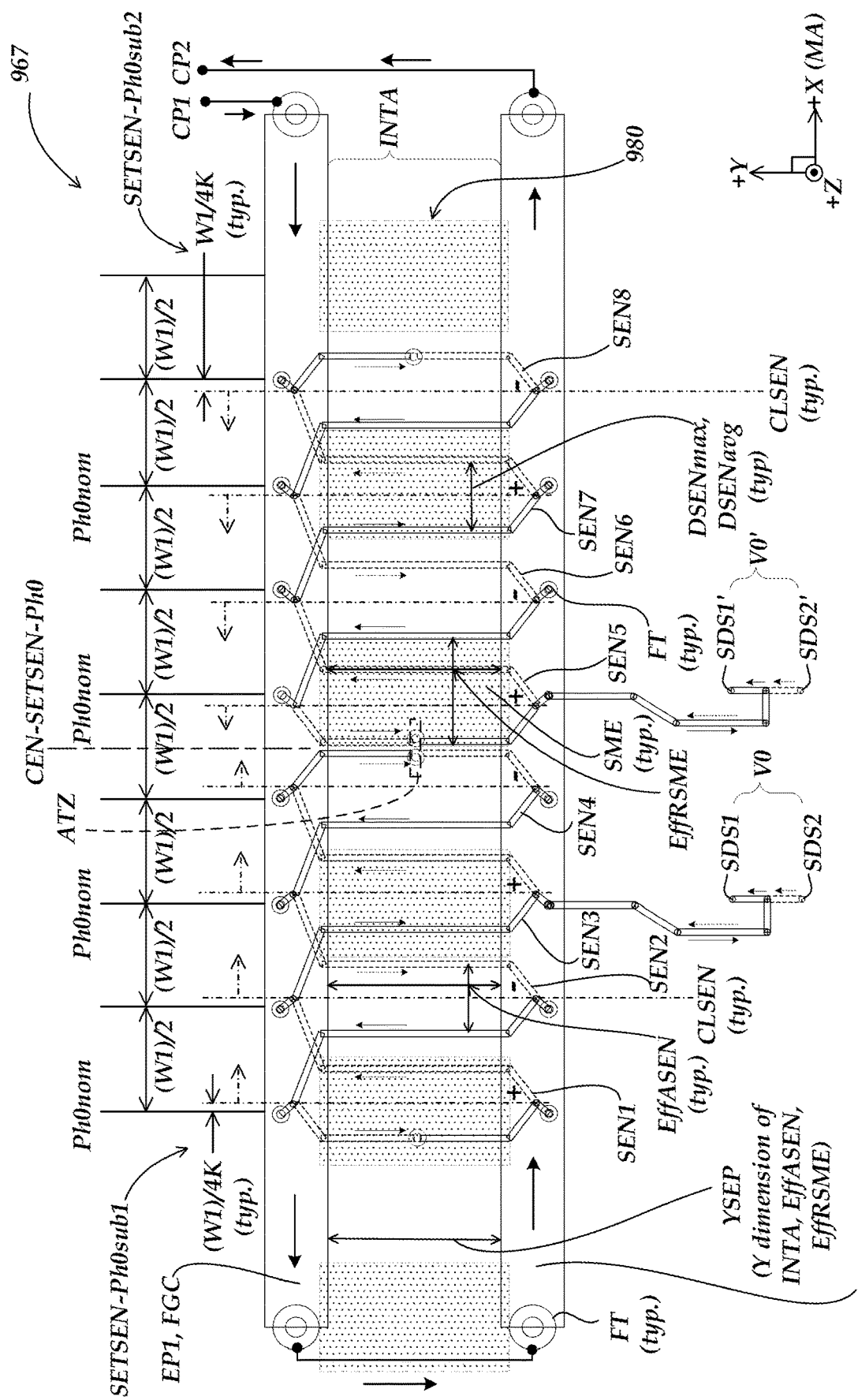
FIG. 9 is a plan view diagram illustrating certain aspects of a first set of sensing elements corresponding to a first spatial phase that is a first exemplary configuration of a set of sensing elements configured according to the first type of prescribed relationship principles disclosed herein to provide spatially filtered signals for use in a detector portion in an electronic position encoder such as that shown in FIG. 1, along with a first compatible field generating coil configuration and scale pattern, and including various dimensions that may characterize the sensing element configuration according to principles disclosed herein.

FIG. 9 is a plan view diagram illustrating certain aspects of a first set of sensing elements SETSEN-Ph0 (also referred to as SETSEN, for short) corresponding to a first spatial phase Ph0 that is a first exemplary configuration of a set of sensing elements configured according to the first type of prescribed relationship principles disclosed herein to provide spatially filtered signals for use in a detector portion in an electronic position encoder such as that shown in FIG. 1, along with a first compatible field generating coil configuration FGC and scale pattern 980, and including various dimensions that may characterize the sensing element configuration according to principles disclosed herein. FIG. 9 includes certain numbered and/or named components that may correspond to and/or operate similarly to similarly numbered or named components of FIGS. 2, 3 and 8, and may be similarly understood unless otherwise indicated. Therefore, only certain differences in the location of the sensing elements SEN of the detector portion 967 will be emphasized in the following description.

Briefly, the sensing elements SEN are analogous to those shown in FIG. 8 in terms of their general shape and their effective area EffASEN, and their dimension DSENavg. In the particular implementation illustrated in FIG. 9, DSENavg is approximately 0.3*W1, however, as previously explained this is exemplary only and not limiting in various implementations of the first type. The sensing elements SEN include conductors on a first fabrication layer (shown in solid outline), and conductors on a second fabrication layer (shown in dashed outline) which are connected through feedthroughs FT (e.g., internal layer feedthroughs that are insulated from the field generating coil configuration FGC) according to known methods (e.g., as described in the incorporated references). In some places in the FIG. 9, "non-loop" portions of the conductors on different layers are aligned with one another and only a single conductor layer is shown. The presence of a hidden "aligned" conductor may be inferred by one of ordinary skill in the art. The field generating coil FGC is fabricated on a third fabrication layer in this implementation to insulate it from the feedthroughs FT and their connected conductors. To assist in understanding the layout of the conductors in the sensing elements SEN, according to a convention used throughout the following figures, their loop polarities are indicated by current flow arrows in their conductor segments, and/or by "+" and/or "−" signs located in the interior of their loops and/or as suffixes (+) or (−) in their labels.

As implied in FIG. 9, the scale extends along the measuring axis direction (MA) and includes a periodic scale pattern 980 comprising the signal modulating elements SME and having a spatial wavelength W1. The detector portion 967 is configured to be mounted proximate to the periodic scale pattern 980 with relative motion therebetween along the measuring axis direction MA. The detector portion 967 includes the field generating coil FGC and at least one respective set of sensing elements SETSEN corresponding to a respective nominal spatial phase. In the particular implementation shown in FIG. 9, the respective set of sensing elements SETSEN comprises two subsets or portions SETSEN-Ph0sub1 and SETSENPh0sub2, and corresponds to the respective nominal spatial phase Ph0, as described in greater detail below. The field generating coil surrounds an interior area INTA that is aligned with an effective region EffRSME of the signal modulating elements SME during operation. The respective set of sensing elements SETSEN is arranged along the measuring axis direction and fixed on the substrate. The members of the set of sensing elements comprise conductive loops or conductive loop portions that define a sensing element effective area EffASEN corresponding to that portion of their sensing element that is aligned with or overlaps the interior area INTA. The set of sensing elements SETSEN is configured to provide detector signals which respond to a local effect on the changing magnetic flux that is provided by adjacent signal modulating elements SME of the scale pattern 980, and which correspond to its respective nominal spatial phase Ph0. The signal processing configuration is operably connected to the detector portion to provide the coil drive signal and to determine the relative position between the detector portion and the scale pattern based on detector signals input from the detector portion, as previously outlined herein.

In the various implementations of the first type that are configured to provide spatially filtered detector signals as disclosed below with reference to FIGS. 9-13, at least a first respective set of sensing elements SETSEN corresponding to a respective nominal spatial phase comprises the combined features A1, B1 and C1, and further combines at least one the features D1 or E1, defined as follows:

A1) A number of positive polarity loops corresponding to a first winding direction or polarity, and the same number of negative polarity loops corresponding to a second winding direction or polarity opposite to the first.

B1) Each of the positive and negative polarity loops have a total sensing element effective area EffASEN that is aligned with or overlaps one or more interior areas and is defined to have an effective y-axis dimension EffYSEN along a y-axis direction that is the sum of the dimensions of the one or more interior areas perpendicular to the measuring axis direction, and least a majority of the positive and negative polarity loops are configured to provide a sensing element average dimension DSENavg=(EffASEN/EffY-SEN) along the measuring axis direction that is within the range 0.33*W1+/−15%.

C1) The positive polarity loops are configured with their sensing element effective areas arranged in a positive polarity loop prescribed relationship (or positive loop prescribed relationship, for short) relative to the respective nominal spatial phase of the respective set of sensing elements, and the negative polarity loops are configured with their sensing element effective areas arranged in a negative polarity loop prescribed relationship (or negative loop prescribed relationship, for short) relative to the respective nominal spatial phase of the respective set of sensing elements. The positive loop prescribed relationship comprises a configuration wherein a shifted proportion up to half of a total sensing element effective area of the number of positive polarity loops is shifted along the measuring axis direction in a first direction by an amount (W1)/4K in relationship to the respective nominal spatial phase, and a nominally the same shifted proportion of the total sensing element effective area of the number of positive polarity loops is shifted along the measuring axis direction in a direction opposite to the first direction by an amount (W1)/4K in relationship to the respective nominal spatial phase, such that the two shifted proportions of the total sensing element effective area of the positive polarity loops area are shifted by (W1)/2K relative to one another, wherein K is one of 3, 5, 7 or 9. The negative loop prescribed relationship comprises a configuration wherein a shifted proportion up to half of a total sensing element effective area of the number of negative polarity loops is shifted along the measuring axis direction in a first direction by an amount (W1)/4K in relationship to the respective nominal spatial phase, and nominally the same shifted proportion of the total sensing element effective area of the number of negative polarity loops is shifted along the measuring axis direction in a direction opposite to the first direction by an amount (W1)/4K in relationship to the respective nominal spatial phase, such that the first two shifted proportions of the total sensing element effective area of the negative polarity loops area are shifted by (W1)/2K relative to one another.

D1) Each of the positive and negative polarity loops comprise a sensing element effective area EffASEN that has a maximum dimension DSENmax along the measuring axis direction that is at most 0.45*W1.

E1) The respective set of sensing elements corresponding to a respective nominal spatial phase (SETSENPh0) is configured in a two-portion configuration comprising: a first separated portion comprising the same number of positive polarity loops and negative polarity loops; and a second separated portion that is nominally aligned along the measuring axis direction with the first portion, and that comprises the same number of positive polarity loops and negative polarity loops as the first separated portion; wherein the first and second separated portions are separated by a gap located along the measuring axis direction between the first portion and the second portion, wherein the gap is at least as wide along the measuring axis direction as one of the positive or negative polarity loops and no positive polarity loop effective area or negative polarity loop effective area of that respective set of sensing elements is located in the gap.

As a result of implementing the combined features A1, B1 and C1, and at least one of the features D1 or E1, as outlined above, the respective set of sensing elements SETSEN corresponding to the respective nominal spatial phase is thereby configured in a practical configuration that provides a spatially filtered detector signal or signals usable to reduce or suppress both a potential unwanted 3rd spatial harmonic detector signal component and a potential unwanted Kth spatial harmonic detector signal component, that may otherwise contribute to error in the determined relative position between the detector portion and the scale pattern. In some implementations of the first type, it may be particularly advantageous when K=5, as described in greater detail below with respect to various figures. In certain implementations of the first type, it may be advantageous when at least a majority of the positive and negative polarity loops SEN are configured to provide a sensing element average dimension DSENavg that is at least 0.29*W1 and at most 0.31*W1, although this range is exemplary only for certain implementations, and is not limiting.

The FIGS. 9-13 (and FIGS. 14-17 further below), each include a "reference grid" indicating the locations of several instances of the respective spatial phase Ph0 (also referred to and/or designated as the nominal spatial phase Ph0nom), which are separated by the wavelength W1, to more clearly illustrate how each set of sensing elements SETSEN is configured according to the principles outlined above. The center location of the effective areas EffASEN of each sensing element SEN are indicated by the locations of dashed centerlines CLSEN, for the same purpose.

Returning to further discussion of the implementation shown in FIG. 9, based on the reference grid and centerline indicators shown in FIG. 9, it will be understood by inspection of FIG. 9 that the set of sensing elements SETSEN shown in FIG. 9 implements the features A1, B1, C1 and D1 outlined above. A brief description follows.

In the implementation shown in FIG. 9, the respective set of sensing elements SETSEN comprises two similar subsets or portions SETSEN– Ph0sub1 and SETSENPh0sub2, corresponding to the respective nominal spatial phase Ph0. The respective set of sensing elements SETSEN includes a number of positive polarity loops (indicated by "+" in the loop interior) corresponding to a first winding direction or polarity, and the same number of negative polarity loops (indicated by "−" in the loop interior) corresponding to a second winding direction or polarity opposite to the first. In the particular implementation shown in FIG. 9, the two subsets or portions SETSEN-Ph0sub1 and SETSENPh0sub2 individually include a same number of positive and negative polarity loops, as well.

A first half of a total sensing element effective area of the positive polarity loops of sensing elements SETSEN (that is, a first half of the sum of their sensing element effective areas EffASEN), which is located in the positive polarity loops SEN2 and SEN4, is shifted along the measuring axis direction MA in a first direction by the amount (W1)/4K in relationship to the nominal spatial phase Ph0, and a second half of the total sensing element effective area EffASEN of the positive polarity loops, which is located in the positive polarity loops SEN5 and SEN7, is shifted along the measuring axis direction MA in a direction opposite to the first direction by an amount (W1)/4K in relationship to the nominal spatial phase Ph0nom. As a result, the first and second halves of the total sensing element effective area of the positive polarity loops area are shifted by (W1)/2K relative to one another along the measuring axis direction.

A first half of a total sensing element effective area EffASEN of the negative polarity loops, which is located in the negative polarity loops SEN1 and SEN3, is shifted along the measuring axis direction MA in a first direction by the amount (W1)/4K in relationship to an offset of (W1)/2 from the nominal spatial phase Ph0nom, and a second half of the total sensing element effective area EffASEN of the negative polarity loops, which is located in the negative polarity loops SEN6 and SEN8, is shifted along the measuring axis direction MA in a direction opposite to the first direction by an amount (W1)/4K in relationship to an offset of (W1)/2 from the nominal spatial phase Ph0nom. As a result, the first and second halves of the total sensing element effective area of the negative polarity loops area are shifted by (W1)/2K relative to one another along the measuring axis direction. In the particular implementation shown in FIG. 9, the illustrated shifts correspond to K=5, which is exemplary only and not limiting as previously indicated in the description of feature C1.

In the particular implementation shown in FIG. 9, the sensing element average dimension DSENavg (=EffASEN/EffYSEN) is illustrated to fall in the range 0.33*W1+/−15%, which conforms to the previous description of the principle or feature B1.

As a result of implementing the features A1, B1 and C1 as outlined above, the respective set of sensing elements SETSEN shown in FIG. 9 corresponding to the respective nominal spatial phase Ph0 is thereby configured to provide a spatially filtered detector signal or signals usable to reduce or suppress a potential unwanted $3^{rd}$ spatial harmonic signal component (based on B1, above) and also to reduce or suppress a potential unwanted Kth spatial harmonic signal component (based on C1, above) that may otherwise contribute to error in the determined relative position between the detector portion and the scale pattern.

With regard to implementation of the feature D1, in the implementation shown in FIG. 9 the sensing element maximum dimension DSENmax is the same as the sensing element average dimension DSENavg, which is approximately 0.33*W1. That is less than the requirement of the feature D1, which is 0.45*W1. One aspect of the utility of the feature D1 in the implementation shown in FIG. 9 is illustrated by the layout of the sensing elements SEN4 and SEN5, which are shifted towards each other by a total amount of (W1 /10) in the illustrated implementation. It will be appreciated that if the sensing elements SEN4 and SEN5 had a wider maximum dimension DESNmax, then the layout of their conductors would overlap and/or interfere between them, requiring layout accommodations and/or sensing area irregularities or distortions (e.g., such as those depicted in the '130 patent) to facilitate the location of feedthroughs and/or to provide insulation between various conductors, and so on. The '130 patent is directed to providing aligned centroids for the purpose of rejecting errors due to "pitch" misalignment (that is, rotation of the detector portion or scale about the Z axis). Its solutions require numerous problematic layout accommodations and sensing area irregularities (e.g., as illustrated in FIG. 8 therein) because it implements its teachings using sensing elements that have a nominal maximum dimension of W/2. Even with careful attention, there typically remains some detrimental effect on fabrication cost, accuracy, and/or misalignment sensitivity due to such layout and sensing area irregularities. In contrast, by implementing the feature D1 in the configuration shown in FIG. 9, none of the sensing elements SEN of the set of sensing elements SETSEN have a sensing element effective area EffASEN that overlaps of interferes with that of any other sensing element SEN, and layout irregularities, sensing element irregularities and their related detrimental effects are avoided, despite shifting the sensing elements SEN according to the principles disclosed herein.

In the particular implementation shown in FIG. 9, the set of sensing elements SETSEN is configured in a two-portion configuration, wherein the set of sensing elements SETSEN comprises a first adjacent portion SETSEN− Ph0sub1 comprising a number (2) of positive polarity loops (SEN1 and SEN3) and the same number of (2) negative polarity loops (SEN2 and SEN4), and a second adjacent portion SETSEN-Ph0sub2 comprising a number (2) positive polarity loops (SEN5 and SEN 7) and the same number (2) negative polarity loops (SEN6 and SEN8). The first and second adjacent portions are located closer to one another along the measuring axis direction than a width of one of the positive or negative polarity loops (which is why they are called "adjacent" portions herein), and the respective loops of the first and second adjacent portions that are closest to one another (that is, SEN 4 and SEN5) have opposite loop polarities. However, such an implementation is exemplary only, and not limiting. Alternative two-portion configurations are disclosed further below. The area centroid CENSETSEN-Ph0 of the set of sensing elements SETSEN is discussed below with reference to FIGS. 10 and 11.

Regarding signal processing related to various two-portion configurations, in various implementations that include first and second portions (e.g., two adjacent portions or two separated portions as outlined further below), the electronic position encoder may be configured according to one of methods M1 or M2, described as follows:

Method M1): the first portion is configured to output a first detector signal (e.g., the voltage signal V0 across detector signal output connections SDS1 and SDS2) and the second portion is configured to output a second detector signal (e.g., the voltage signal V0' across detector signal output connections SDS1' and SDS2'), and the signal processor is configured to determine the relative position between the detector portion and the scale pattern based at least partly on a combination of the first and second signals; or Method M2): the first portion is connected in series with the second portion to form a combined signal, and the series connection is configured such that the respective signal contributions of the first and second portions are additive in the combined signal; and the signal processor is configured to determine the relative position between the detector portion and the scale pattern based at least partly on the combined signal.

One exemplary implementation of a series connection according to M2 may be explained with reference to the aligned trace zone ATZ shown in FIG. 9. In particular the feedthroughs illustrated in the aligned trace zone ATZ may be eliminated and the "solid line" traces of the sensing elements SEN4 and SEN5 that touch the aligned trace zone ATZ may be connected on their shared metal layer by a trace across the aligned trace zone ATZ. Similarly, the "dashed line" traces of the sensing elements SEN4 and SEN5 that touch the aligned trace zone ATZ may be connected on their shared metal layer by a trace across the aligned trace zone ATZ. If the two connecting traces that are in the two layers are aligned with one another, no loop area will be created and they will create any significant signal disturbances. When such a series connection is used, one of the pairs of detector signal output connections SDS1 and SDS2, or SDS1' and SDS2' (e.g., shown in FIG. 9 and/or other figures herein), may be omitted and the associated connection points on its associated sensing element loop may be reconfigured for conductor continuity, in the same manner as other "connectionless" sensing element loops shown in the figures. A series connection of this type is shown in FIG. 16 which shows a series connection between its adjacent portions SETSEN-Ph90sub1 and SETSEN-Ph90sub2 (that is, between their respective sensing elements SEN4 and SEN5). In the case of adjacent portions connected in series, in some implementations the resulting set of sensing elements SETSEN may visually appear as a continuous uninterrupted set of sensing elements (e.g., as illustrated in FIG. 16). In such a case, it should be appreciated that such a set of sensing elements SETSEN may in some contexts be interpreted as a single continuous set, or alternatively in some contexts it may be interpreted as first and second adjacent portions connected to create the appearance of a continuous uninterrupted set of sensing elements. In some implementations, a series connection may be made between an appropriate one of the detector signal output connections SDS1 or SDS2, and an appropriate one of the detector signal output connections SDS1' or SDS2'. Other alternative configurations for serial connections will be apparent to one of ordinary skill in the art. It will be understood that the two-portion signal processing and/or series connection alternatives outlined above are generally applicable to any of the compatible two-portion configurations shown in any of the FIGS. 9-17. It will be understood that if a serial connection were provided in an aligned trace zone ATZ between SEN4 and SEN5 in each of the sets of sensing elements shown in FIG. 10, then they may each visually appear and/or be regarded as continuous uninterrupted sets of sensing elements, as outlined above. In such a case, it will be appreciated that each set of sensing elements in FIG. 10 could be regarded as comprising the features A1, B1, C1 and D1, and not the feature E1.

Figure 10:
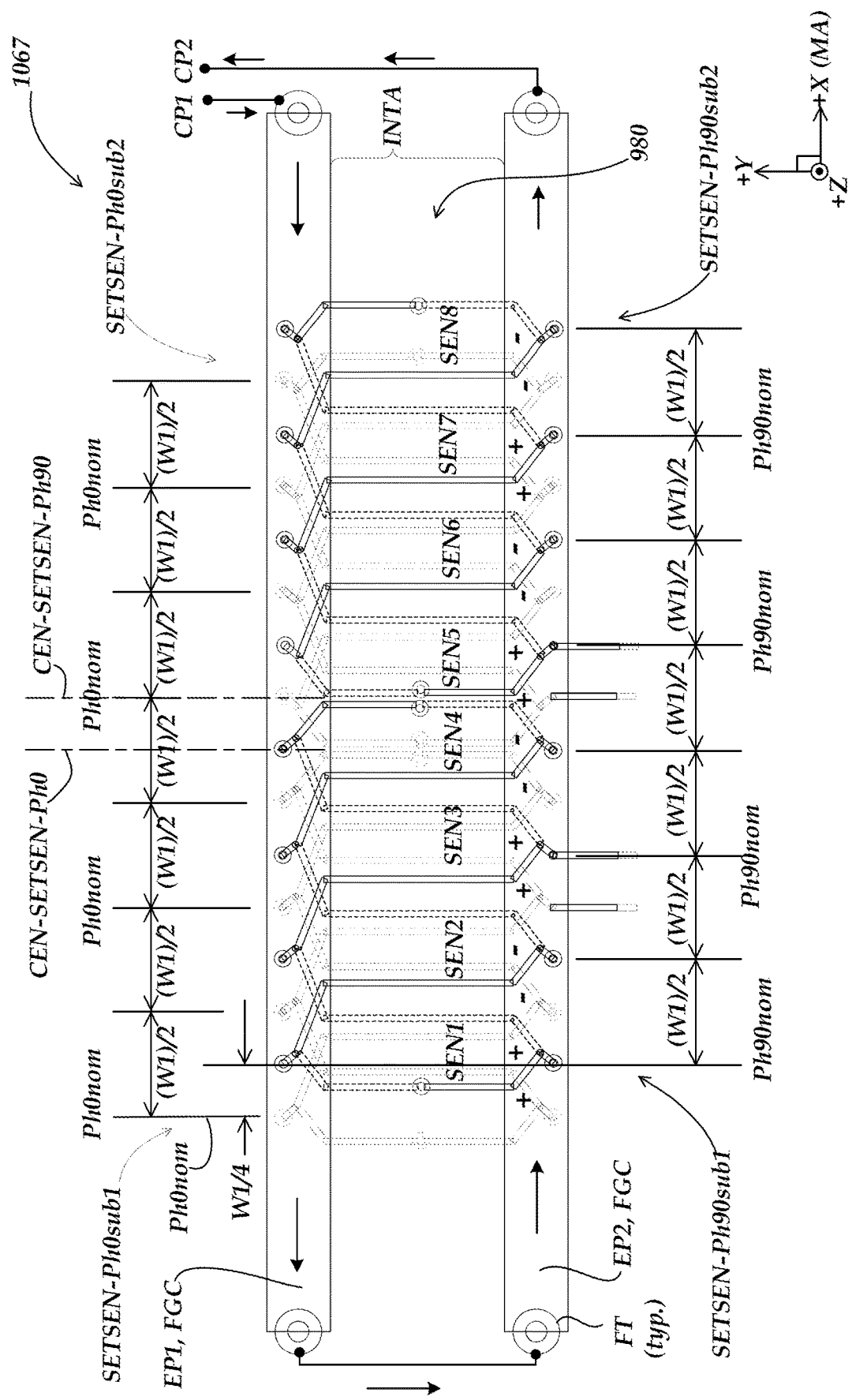
FIG. 10 is a plan view diagram illustrating certain aspects of a second set of sensing elements corresponding to a second spatial phase configured similarly to the first set of sensing elements shown in FIG. 9, superimposed on a ghosted representation of the first set of sensing elements illustrated in FIG. 9, to illustrate an operational quadrature configuration wherein the spatial phases of the first and second sets of sensing elements differ by 90 degrees.

FIG. 10 is a plan view diagram illustrating certain aspects of a second set of sensing elements SETSEN-Ph90 (referred to as SETSEN, for short in some contexts below) corresponding to a second spatial phase Ph90 (designated Ph90nom in FIG. 10). It is configured similarly or identically to the first set of sensing elements SETSEN-Ph0 shown in FIG. 9 (except for its spatial phase), and therefore it is not described in detail here. The sensing element SEN labels shown in FIG. 10 are centered on the sensing elements of the second set of sensing elements SETSEN-Ph90. It is shown superimposed on a deemphasized representation of the first set of sensing elements SETSEN-Ph0 corresponding to the first spatial phase Ph0 illustrated in FIG. 9, to illustrate an operational quadrature configuration wherein the spatial phases of the first and second sets of sensing elements SETSEN-Ph0 and SETSEN-Ph90 differ by 90 degrees. FIG. 10 includes certain numbered and/or named components that may correspond to and/or operate similarly or identically to similarly numbered or named components of FIG. 9, and may be similarly understood unless otherwise indicated. Therefore, only certain relationships between the first and second sets of sensing elements SETSEN-Ph0 and SETSEN-Ph90 will be emphasized in the following description.

As shown in FIG. 10, the second set of sensing elements SETSEN-Ph90 has a corresponding spatial phase that is 90 degrees different (that is, shifted to the right by 90 degrees) relative to the spatial phase of the first set of sensing elements SETSEN-Ph0. It will be understood that the first and second sets of sensing elements SETSEN-Ph0 and SETSEN-Ph90 each include detector signal output connections SDS1 and SDS2, and SDS1' and SDS2,' analogous to those shown in FIG. 9, although they are omitted in FIG. 10 and other following figures, to avoid visual clutter. Operating together, the first and second sets of sensing elements SETSEN-Ph0 and SETSEN-Ph90 output quadrature signals that include a high degree of spatial filtering according to principles outlined above, in order to provide very high accuracy position measurements. Both first and second sets of sensing elements SETSEN-Ph0 and SETSEN-Ph90 comprise the features A1, B, C1 and D1, and therefore provide the various advantages outlined above with reference to FIG. 9. It will be appreciated by inspection of FIG. 10 that the layout and performance advantages associated with the implementation of those features extends to the superimposed "quadrature layout" of first and second sets of sensing elements SETSEN-Ph0 and SETSEN-Ph90. That is, it will be appreciated that the first and second sets of sensing elements SETSEN-Ph0 and SETSEN-Ph90 are easily laid out in the desired phase relationship without any of their conductors interfering with one another, and without the need for any irregularities or differences in the shape of the sensing elements SEN. Therefore, the previously outlined layout and performance advantages are provided in a fully operational quadrature encoder layout as shown in FIG. 10.

There is one aspect of the implementation shown in FIG. 10 which may not be ideal in some applications. In particular, as shown in FIG. 10, because the first and second sets of sensing elements SETSEN-Ph0 and SETSEN-Ph90 are substantially similar or identical, and neither of the first or second sets of sensing elements SETSEN-Ph0 and SETSEN-Ph90 comprise the feature E1, the area centroid CEN-SETSEN-Ph90 of the second set of sensing elements SETSEN-Ph90 is misaligned by 90 degrees of spatial phase shift (that is, by W1 /4) relative to the area centroid CEN-SETSEN-Ph0 of the first set of sensing elements SETSEN-Ph0. As taught in the '130 patent, when the area centroids of two different sets of sensing elements corresponding to two different spatial phases are misaligned, then pitch misalignment of their associated detector (e.g., the detector portion 967) or scale (e.g., the scale patter 980) will result in a difference in their respective operating gaps and signal strength. Such pitch misalignment may be static, or dynamic, in various applications. In any case, static or dynamic differences in signal strength between two quadrature signals (or three three-phase signals) either necessitates more complex signal processing (e.g., undesirably expensive and/or slow signal processing) or contributes to undesirable measurement errors. The implementation shown in FIG. 11A addresses these potential concerns.

Figure 11A:
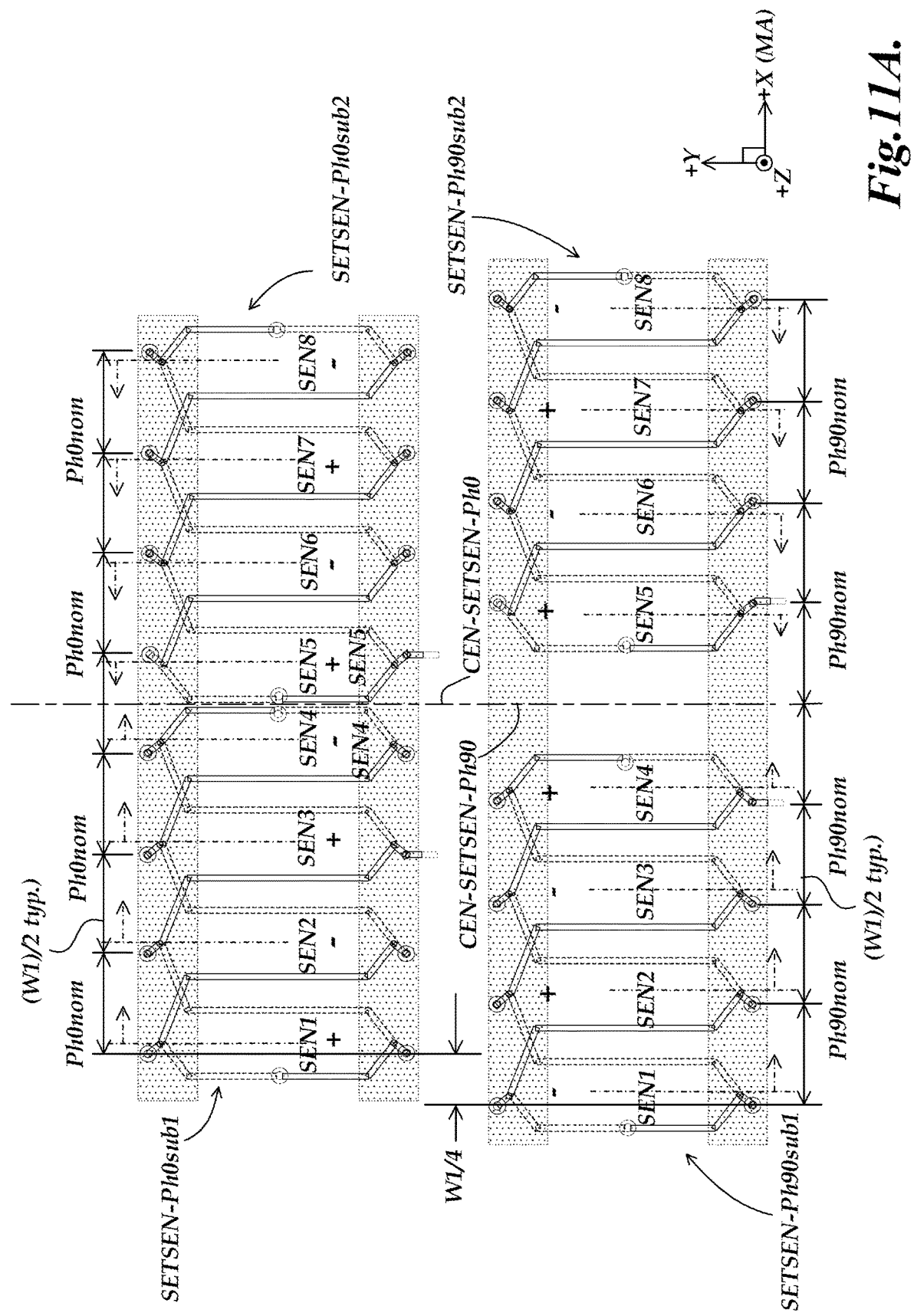
FIG. 11A is a plan view diagram illustrating certain aspects of a second set of sensing elements corresponding to a second spatial phase that is a second exemplary configuration of a set of sensing elements configured according to the first type of prescribed relationship principles disclosed herein, along with the first set of sensing elements illustrated in FIG. 9. The first and second sets are offset from one another along the vertical direction in FIG. 11A for purposes of illustration, to better show their individual characteristics and alignment along the measuring axis direction relative to one another in an operational quadrature configuration, wherein the spatial phases of the first and second sets of sensing elements differ by 90 degrees.

FIG. 11A is a plan view diagram illustrating certain aspects of a second set of sensing elements SETSEN-Ph90 (referred to as SETSEN, for short in some contexts below) corresponding to a second spatial phase Ph90 (designated Ph90nom in FIG. 11A). It is a second exemplary configuration of a set of sensing elements configured according to the first type of prescribed relationship principles disclosed herein. It is shown in FIG. 11A along with the first set of sensing elements SETSEN-Ph0 corresponding to the first spatial phase Ph0 illustrated in FIG. 9. The first and second sets of sensing elements SETSEN-Ph0 and SETSEN-Ph90 are offset from one another vertically in FIG. 11A for purposes of illustration, to better show their individual characteristics and alignment along the measuring axis direction relative to one another. They are shown arranged along the measuring axis direction in an operational quadrature configuration, wherein the spatial phases of the first and second sets of sensing elements SETSEN-Ph0 and SETSEN-Ph90 differ by 90 degrees. It will be understood that they are not offset from one another along the "Y axis" direction in an actual encoder. Rather, they are superimposed on one another, similarly to the first and second sets of sensing elements shown in FIG. 10.

FIG. 11A includes certain numbered and/or named components that may correspond to and/or operate similarly or identically to similarly numbered or named components of FIGS. 9 and/or 10, and may be similarly understood unless otherwise indicated. Therefore, only certain differences in the configuration of the second sets of sensing elements SETSEN-Ph90 will be emphasized in the following description of FIG. 11A.

The differences between the implementation of the second set of sensing elements SETSEN-Ph90 shown in FIG. 11A and the implementation shown in FIG. 10 may be briefly described as follows. The first set of sensing elements SETSEN-Ph0 may be regarded as unchanged relative to its description in FIGS. 9 and 10. The sensing elements SEN5-SEN8 of the second portion SETSEN-Ph90sub2 may be regarded as unchanged relative to their description in FIG. 10. The sensing elements SEN1-SEN4 of the first portion SETSEN-Ph90sub1 are changed relative to their description in FIG. 10. In particular, relative to their location in FIG. 10, their layout has been moved to the left by (W1)/2 in the implementation shown in FIG. 11A, and the output signal connections are now provided at the right-most sensing element SEN4, so that they remain associated with the traces of positive polarity loop, for conceptual continuity between FIGS. 10 and 11. According to the foregoing description, in terms of signal output vs. position there is no difference between the operation of the first portions SETSEN-Ph90sub1 as shown in FIGS. 10 and 11. Furthermore, the first and second sets of sensing elements SETSEN-Ph0 and SETSEN-Ph90 shown in FIG. 11A comprise the features A1, B, C1 and D1, and therefore provide the various advantages outlined above with reference to FIG. 10.

Importantly, there is one aspect of the implementation shown in FIG. 11A which is more ideal than the implementation shown in FIG. 10 for applications that may include pitch misalignment. In particular, as shown in FIG. 11A, because the first portion SETSEN-Ph90sub1 is shifted to the left by (W1)/2, relative to its position in FIG. 10, the overall area centroid CEN-SETSEN-Ph90 of the second set of sensing elements SETSEN-Ph90 is shifted left by (W1)/4, such that it aligns with the area centroid CEN-SETSEN-Ph0 of the first set of sensing elements SETSEN-Ph0. As taught in the '130 patent, when the area centroids of two different sets of sensing elements corresponding to two different spatial phases are aligned, then their respective operating gaps and signal strength will be affected similarly by any static or dynamic pitch misalignment, which eliminates the majority of error contributions that may otherwise arise due to pitch misalignment.

The implementation of the first and second sets of sensing elements SETSEN-Ph0 and SETSEN-Ph90 shown in FIG. 11A, may be described comprehensively without reference to FIG. 10, as follows. The first set of sensing elements SETSEN-Ph0 corresponds to the first spatial phase Ph0 and comprises the features A1, B1, C1 and D1 (and not E1). It is configured in a two-portion configuration, wherein it comprises a first adjacent portion SETSEN-Ph0sub1 comprising a number (2) of positive polarity loops (SEN1 and SEN3) and the same number of (2) negative polarity loops (SEN2 and SEN4), and a second adjacent portion SETSEN-Ph0sub2 comprising a number (2) positive polarity loops (SEN5 and SEN 7) and the same number (2) negative polarity loops (SEN6 and SEN8). The first and second adjacent portions are located closer to one another along the measuring axis direction than a width of one of the positive or negative polarity loops (which is why they are called "adjacent" portions herein), and the respective loops of the first and second adjacent portions that are closest to one another (that is, SEN 4 and SEN5) have opposite loop polarities. The second set of sensing elements SETSEN-Ph90 corresponds to the second nominal spatial phase Ph90 and comprises the features A1, B1, C1, D1 and E1. It is configured to comprise the feature E1, as follows: it is a two-portion configuration comprising: a first separated portion SETSEN-Ph90sub1 comprising the same number (2) of positive polarity loops (SEN2 and SEN4) and negative polarity loops (SEN1 and SEN3); and a second separated portion SETSEN-Ph90sub2 that is nominally aligned along the measuring axis direction with the first portion SETSEN-Ph90sub1, and that comprises the same number (2) of positive polarity loops (SEN5 and SEN7) and negative polarity loops (SEN6 and SEN8) as the first separated portion SETSEN-Ph90sub1. The first and second separated portions SETSEN-Ph90sub1 and SETSEN-Ph90sub2 are separated by a gap located along the measuring axis direction between the first portion and the second portion, wherein the gap is at least as wide along the measuring axis direction as one of the positive or negative polarity loops SEN. No positive polarity loop effective area EffASEN or negative polarity loop effective area EffASEN of the second set of sensing elements SETSEN-Ph90 is located in the gap.

The first and second sets of sensing elements SETSEN-Ph0 and SETSEN-Ph90 may be further described as follows. The second set of sensing elements SETSEN-Ph90 corresponds to the nominal spatial phase Ph90, which is 90 degrees different than the nominal spatial phase Ph0 of the first respective set of sensing elements SETSEN-Ph0. The second set of sensing elements SETSEN-Ph90 is configured such that the respective loops of its first and second separated portions SETSEN-Ph90sub1 and SETSEN-Ph90sub2 that are closest to one another (e.g., SEN4 and SEN5) have the same loop polarities. The first set of sensing elements SETSEN-Ph0 has a first area centroid CEN-SETSEN-Ph0 of its total sensing element effective area located along the measuring axis between its first and second adjacent portions SETSEN-Ph0sub1 and SETSEN-Ph0sub2. The second respective set of sensing elements SETSEN-Ph90 has a second area centroid CEN-SETSEN-Ph90 of its total sensing element effective area located along the measuring axis between its first and second separated portions SETSEN-Ph90sub1 and SETSEN-Ph90sub2. The first and second sets of sensing elements are arranged with their respective first and second area centroids CEN-SETSEN-Ph0 and CEN-SETSEN-Ph90 aligned at the same location along the measuring axis direction.

As previously outlined, when the area centroids of two different sets of sensing elements corresponding to two different spatial phases are aligned, then their respective operating gaps and signal strength will be affected similarly by any static or dynamic pitch misalignment, which eliminates the majority of error contributions that may otherwise arise due to pitch misalignment. According to one useful perspective, it should be appreciated that because the second set of sensing elements SETSEN-Ph90 comprises the feature E1, it includes a gap (that is, the gap illustrated between SEN4 and SEN5) which facilitates (or is a by-product of) rearranging and/or relocating certain loops or sensing elements SEN, in order to relocate the area centroid of a set of sensing elements SETSEN in a desired relationship relative to their nominal spatial phase, so that the area centroids of a plurality of sets of sensing elements SETSEN may be aligned in an operational configuration.

It will be appreciated by inspection of FIG. 11A that, in contrast to the area centroid alignment techniques disclosed in the '130 patent, the first and second sets of sensing elements SETSEN-Ph0 and SETSEN-Ph90 shown in FIG.

11A are easily laid out in the desired phase relationship and with their area centroids aligned, without any of their conductors interfering with one another, and without the need for any irregularities or differences in the shape of any of their sensing elements SEN. Therefore, by using the combination of features A1, B1, C1, D1 and E1 as shown and disclosed with reference to FIG. 11A, the layout and performance advantages previously outlined with reference to FIGS. 9 and 10 are provided in a fully operational quadrature encoder layout that additionally provides the benefits associated with aligned area centroids.

It will be appreciated that in the implementations shown in FIG. 11A, each respective positive or negative polarity loop (e.g., each sensing elements SEN) included in one of the first or second respective set of sensing elements SETSEN-Ph0 or SETSEN-Ph90 is configured to provide a respective sensing element effective area EffASEN that does not overlap a sensing element effective area EffASEN of any other respective positive or negative polarity loop included in that same one of the first or second respective set of sensing elements. It will be appreciated that the implementations of the first type outlined above with reference to FIGS. 9, 10 and 11A can provide an unprecedented level of spatial filtering to suppress multiple unwanted spatial harmonic signal components using a layout for the detector portion that is less complicated, higher performing, and more economical to fabricate than prior art spatial filtering detectors (e.g., such as those disclosed in the '130 patent).

Figure 11B:
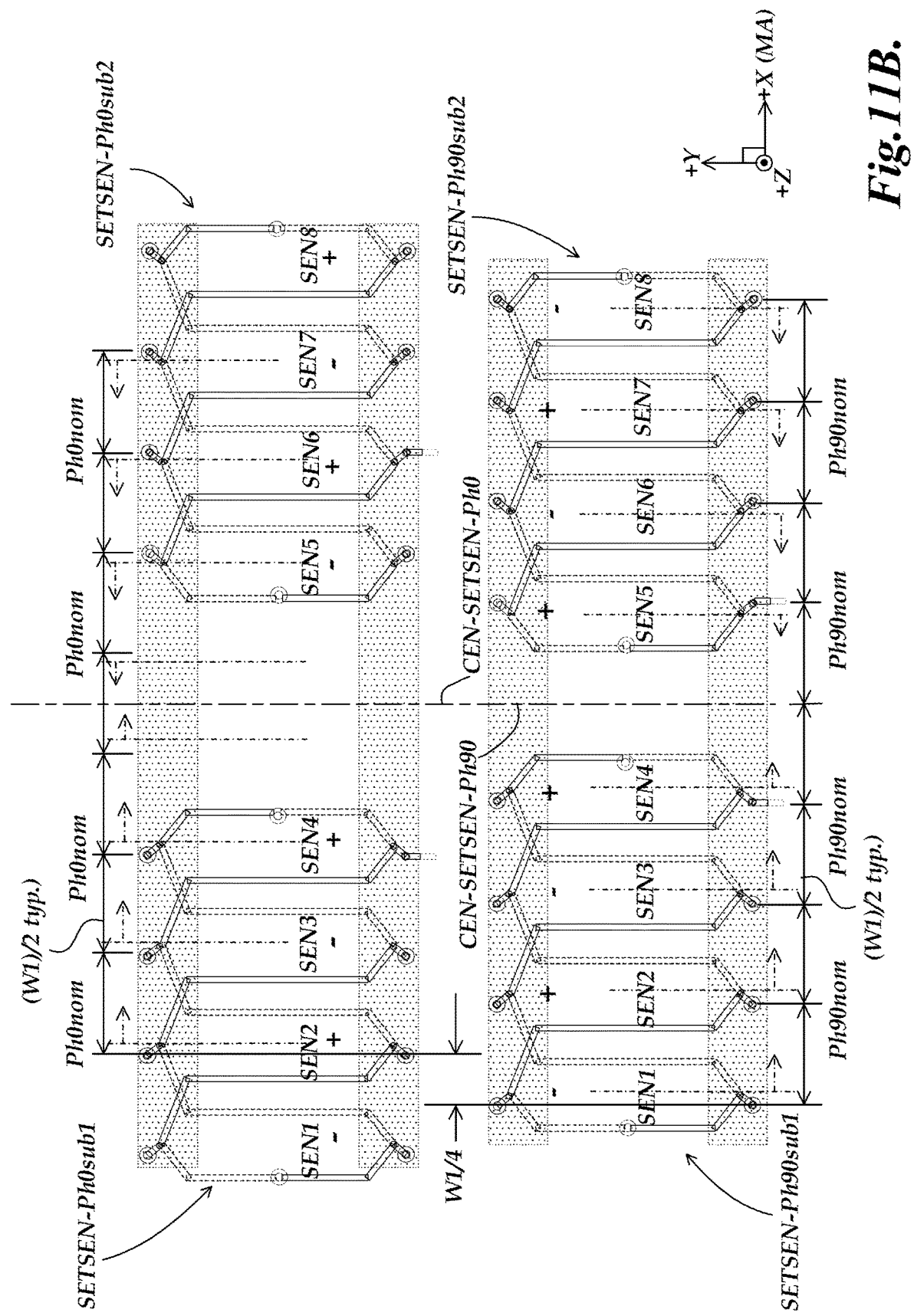
FIG. 11B is a plan view diagram illustrating certain aspects of a first set of sensing elements corresponding to a first spatial phase that is a third exemplary configuration of a set of sensing elements configured according to the first type of prescribed relationship principles disclosed herein, along with the second set of sensing elements illustrated in FIG. 11A. The first and second sets are offset from one another along the vertical direction in FIG. 11B for purposes of illustration, to better show their individual characteristics and alignment along the measuring axis direction relative to one another in an operational quadrature configuration, wherein the spatial phases of the first and second sets of sensing elements differ by 90 degrees.

FIG. 11B is a plan view diagram illustrating certain aspects of a first set of sensing elements SETSEN-Ph0 (referred to as SETSEN, for short in some contexts below) corresponding to a first spatial phase Ph0 (designated Ph0nom in FIG. 11B). It is a third exemplary configuration of a set of sensing elements configured according to the first type of prescribed relationship principles disclosed herein. It is shown in FIG. 11B along with the second set of sensing elements SETSEN-Ph90 corresponding to the second spatial phase Ph90 illustrated in FIG. 11A. The first and second sets of sensing elements SETSEN-Ph0 and SETSEN-Ph90 are offset from one another vertically in FIG. 11B for purposes of illustration, to better show their individual characteristics and alignment along the measuring axis direction relative to one another. They are shown arranged along the measuring axis direction in an operational quadrature configuration, wherein the spatial phases of the first and second sets of sensing elements SETSEN-Ph0 and SETSEN-Ph90 differ by 90 degrees. It will be understood that they are not offset from one another along the "Y axis" direction in an actual encoder. Rather, they are superimposed on one another, similarly to the first and second sets of sensing elements shown in FIG. 10. FIG. 11B includes numbered and/or named components that may correspond to and/or operate similarly or identically to similarly numbered or named components of FIG. 11A, and may be similarly understood unless otherwise indicated. The second set of sensing elements SETSEN-Ph90 in FIG. 11B may be regarded as unchanged relative to its description in FIG. 11A. Therefore, only certain differences in the configuration of the first set of sensing elements SETSEN-Ph0 will be emphasized in the following description of FIG. 11B.

The differences between the implementation of the first set of sensing elements SETSEN-Ph0 shown in FIG. 11B and the implementation shown in FIG. 11B may be briefly described as follows: Relative to their location in FIG. 11A, the first portion SETSEN-Ph0sub1 has been moved to the left by (W1)/2, and the second portion SETSEN-Ph0sub2 has been moved to the right by (W1)/2 in the implementation shown in FIG. 11B. The output signal connections are now provided at sensing elements SEN4 and SEN6, so that they remain associated with the traces of a positive polarity loop, for conceptual continuity with FIG. 11A. Based on the foregoing description, in terms of signal output vs. position there is no difference between the first sets of sensing elements SETSEN-Ph0 as shown in FIGS. 11B and 11A.

The implementation of the first and second sets of sensing elements SETSEN-Ph0 and SETSEN-Ph90 shown in FIG. 11B, may be described comprehensively as follows. The second set of sensing elements SETSEN-Ph90 corresponds to the second spatial phase Ph90 and comprises the features A1, B1, C1 D1, and E1, and the loops of its first and second separated portions SETSEN-Ph90sub1 and SETSEN-Ph90sub2 that are closest to one another (e.g., SEN4 and SEN5) have the same loop polarities. All of this is unchanged relative to its description in FIG. 11A. In contrast, the first set of sensing elements SETSEN-Ph0 which corresponds to the first nominal spatial phase Ph0 now comprises the feature E1, in addition to the features A1, B1, C1, D1 it included in FIG. 11A. It is evident that it comprises the feature E1, because it comprised the first and second separated portions SETSEN-Ph90sub1 and SETSEN-Ph90sub2 that are separated by a gap that is at least as wide as one of the positive or negative polarity loops SEN. No positive polarity loop effective area EffASEN or negative polarity loop effective area EffASEN of the second set of sensing elements SETSEN-Ph90 is located in the gap.

The first and second sets of sensing elements SETSEN-Ph0 and SETSEN-Ph90 may be further described as follows: the second set of sensing elements SETSEN-Ph90 corresponds to the nominal spatial phase Ph90, which is 90 degrees different than the nominal spatial phase Ph0 of the first respective set of sensing elements SETSEN-Ph0. The first set of sensing elements SETSEN-Ph0 is configured such that the respective loops of its first and second separated portions SETSEN-Ph0sub1 and SETSEN-Ph0sub2 that are closest to one another (e.g., SEN4 and SEN5) have opposite loop polarities. The first set of sensing elements SETSEN-Ph0 has a first area centroid CEN-SETSEN-Ph0 of its total sensing element effective area located along the measuring axis between its first and second adjacent portions SETSEN-Ph0sub1 and SETSEN-Ph0sub2. The second respective set of sensing elements SETSEN-Ph90 has a second area centroid CEN-SETSEN-Ph90 of its total sensing element effective area located along the measuring axis between its first and second separated portions SETSEN-Ph90sub1 and SETSEN-Ph90sub2. The first and second sets of sensing elements are arranged with their respective first and second area centroids CEN-SETSEN-Ph0 and CEN-SETSEN-Ph90 aligned at the same location along the measuring axis direction.

The foregoing description demonstrates that the alignment of area centroids for two respective sets of sensing elements is facilitated by including the feature E1 in one (as in FIG. 11A), or both (as in FIG. 11B), of the two respective sets of sensing elements. It will be appreciated based on the foregoing description that the implementation shown in FIG. 11B provides all the various advantages outlined above with reference to FIG. 11A.

Figure 12:
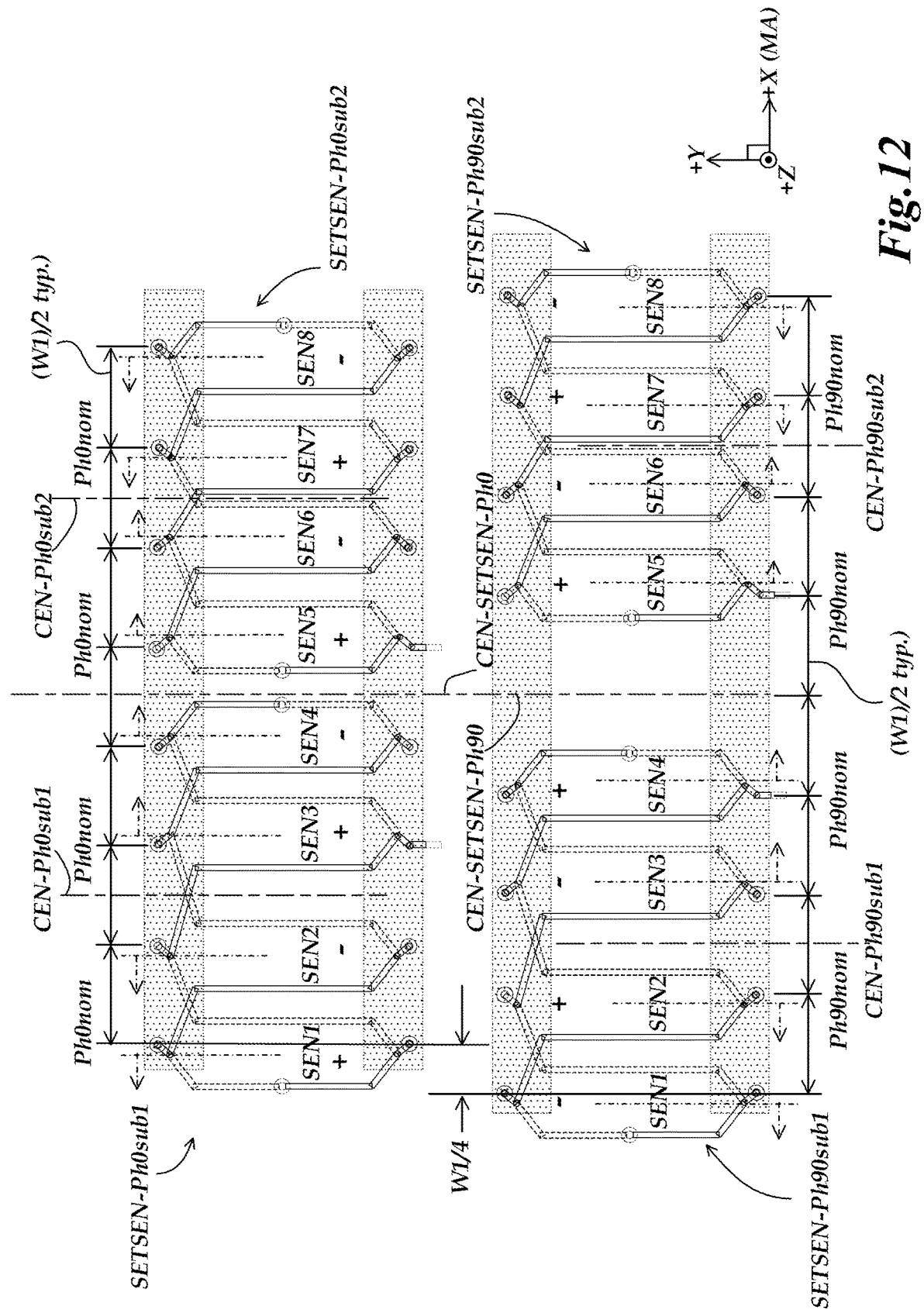
FIG. 12 is a plan view diagram illustrating certain aspects of first and second sets of sensing elements corresponding to respective spatial phases that are fourth and fifth exemplary configurations of a set of sensing elements configured according to the first type of prescribed relationship principles disclosed herein. The first and second sets are offset from one another along the vertical direction in FIG. 12 for purposes of illustration, to better show their individual characteristics and alignment along the measuring axis direction relative to one another in an operational quadrature configuration, wherein the spatial phases of the first and second sets of sensing elements differ by 90 degrees.

FIG. 12 is a plan view diagram illustrating certain aspects of first and second sets of sensing elements SETSEN-Ph0 and SETSEN-Ph90 corresponding to first and second spatial phases Ph0 and Ph90 that are fourth and fifth exemplary configurations of a set of sensing elements configured according to the first type of prescribed relationship principles disclosed herein. The first and second sets SETSEN- Ph0 and SETSEN-Ph90 are offset from one another along the vertical direction in FIG. 12 for purposes of illustration, to better show their individual characteristics and alignment along the measuring axis direction relative to one another in an operational quadrature configuration, wherein the spatial phases Ph0 and Ph90 of the first and second sets of sensing elements differ by 90 degrees. It will be understood that they are not offset from one another along the "Y axis" direction in an actual encoder. Rather, they are superimposed on one another, similarly to the first and second sets of sensing elements shown in FIG. 10. FIG. 12 includes certain numbered and/or named components that may correspond to and/or operate similarly or identically to similarly numbered or named components of FIG. 11A, and may be similarly understood unless otherwise indicated. Therefore, only certain differences in the configuration of the first and second sets SETSEN-Ph0 and SETSEN-Ph90 will be emphasized in the following description of FIG. 12.

The differences between the implementation of the first and second set of sensing elements SETSEN-Ph0 and SETSEN-Ph90 shown in FIG. 12 and the implementation shown in FIG. 11A may be briefly described as follows. In each set of sensing elements shown in FIG. 12, the pair of sensing elements SEN1 and SEN2 of their first portions SETSEN-Ph0sub1 and SETSEN-Ph90sub1 have been shifted by (W1)/4K to the left relative to their nominal spatial phase, rather than to the right as in FIG. 11A. Conversely, in each set of sensing elements shown in FIG. 12, the pair of sensing elements SEN5 and SEN6 of their second portions SETSEN-Ph0sub2 and SETSEN-Ph90sub2 have been shifted by (W1)/4K to the right relative to their nominal spatial phase, rather than to the left as in FIG. 11A.

The implementation of the "shifted pairs" of sensing elements SEN, as outlined above and shown in FIG. 11B in either of the first or second sets of sensing elements SETSEN-Ph0 and SETSEN-Ph90, may be described comprehensively in either set of sensing elements as follows. According to a first aspect of the implementation, the first (second) set of sensing elements SETSEN-Ph0 (SETSEN-Ph90) corresponding to the respective nominal spatial phase Ph0 (Ph90) comprises the features A1, B1, C1, and D1, and is configured according to the feature C1 wherein it is configured with a number of pairs of adjacent positive polarity loop and negative polarity loop sensing element effective areas shifted along the measuring axis direction in the first direction by the amount (W1)/4K, and the same number of pairs of adjacent positive polarity loop and negative polarity loop sensing element effective areas shifted along the measuring axis in the direction opposite to the first direction by the amount (W1)/4K.

Either of the first or second sets of sensing elements SETSEN-Ph0 and SETSEN-Ph90 may be further described as follows. According to a second aspect of the implementation, the two respective pairs of adjacent loops (e.g., the pair SEN1 and SEN2, and the pair SEN7 and SEN8) that are at opposite ends of the first respective set of sensing elements have positive polarity loop and negative polarity loop sensing element effective areas that are shifted along the measuring axis in the same direction in those two respective pairs.

In addition, the second set of sensing elements SETSEN-Ph90 shown in FIG. 12 comprises the feature E1, in addition to the feature A1, B, C1 and D1, and the area centroids CEN-SETSEN-Ph0 and CEN-SETSEN-Ph90 are aligned.

It will be appreciated based on the foregoing description that the implementation shown in FIG. 12 provides all the various advantages outlined above with reference to FIG. 11A. It may provide an additional advantage as follows. As previously indicated the aligned area centroids of the implementation shown in FIG. 11A provide the advantage that the respective operating gaps and signal strength of the first and second sets of sensing elements will be affected similarly by any static or dynamic pitch misalignment, which eliminates the majority of error contributions that may otherwise arise due to pitch misalignment. However, it may be appreciated that all of the sensing elements SEN on the left half of the implementation are shifted in a respective first direction by a spatial phase shift of (W1)/4K, and all of the sensing elements SEN on the right half of the implementation are shifted in the respective opposite direction by a spatial phase shift of (W1)/4K. The signal contributions from the right and left half will become unbalanced by a static or dynamic pitch misalignment. As a result, the signal contributions from the opposing spatial phase shifts in the right and left half will become unbalanced to some extent, resulting in a small position error sensitivity to pitch misalignment. In contrast, in the implementation shown in FIG. 12, pairs of sensing elements SEN are shifted in both directions in both the right and left halves of the implementation, such that spatial phase errors due static or dynamic pitch misalignment are reduced or eliminated. As one instructive example, it will be understood that because the sensing elements SEN1 and SEN8, at opposite ends of the right and left halves, are shifted in the same direction by (W1)/4K in the implementation shown in FIG. 12, that both the amplitude and spatial phase of their summed signal contributions is nominally unchanged by pitch misalignment.

It should be appreciated that first aspect outlined above may provide some advantage as outlined above in certain implementations, even if the second aspect is not used. However, in various implementations, it may be most advantageous to use the first and second aspects in conjunction, as shown in FIG. 12.

Figure 13:
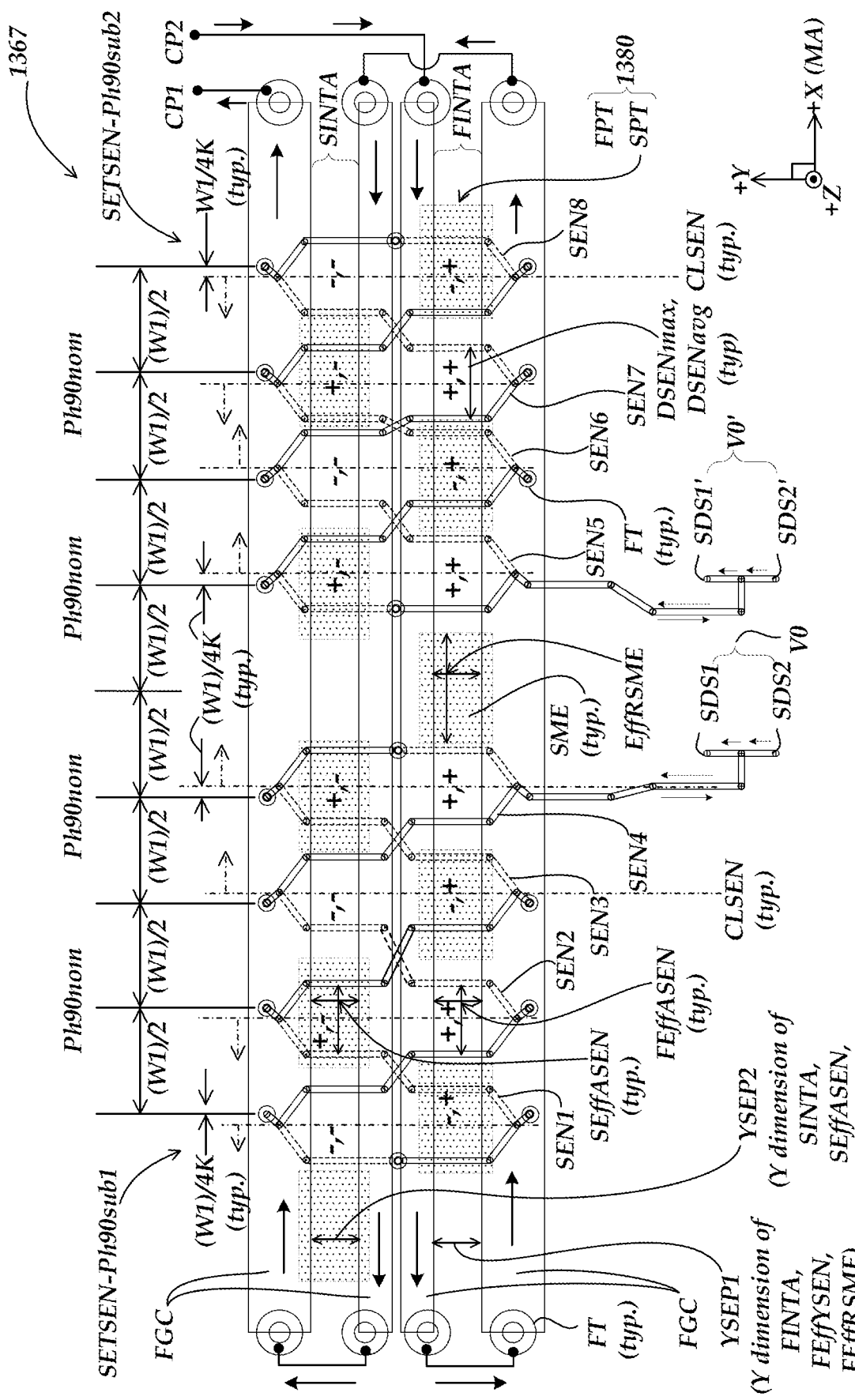
FIG. 13 is a plan view diagram illustrating certain aspects of a first set of sensing elements corresponding to a first spatial phase that is a sixth exemplary configuration of a set of sensing elements configured according to the first type of prescribed relationship principles disclosed herein, to provide spatially filtered signals for use in a detector portion in an electronic position encoder such as that shown in FIG. 1, along with a second compatible field generating coil configuration and scale pattern, and including various dimensions that may characterize the sensing element configuration according to principles disclosed herein.

FIG. 13 is a plan view diagram illustrating certain aspects of a respective set of sensing elements SETSEN-Ph90 corresponding to a respective spatial phase Ph90 that is a sixth exemplary configuration of a set of sensing elements configured according to the first type of prescribed relationship principles disclosed herein, to provide spatially filtered signals for use in a detector portion in an electronic position encoder such as that shown in FIG. 1, along with a second compatible field generating coil configuration FGC and scale pattern 1380, and including various dimensions that may characterize the sensing element configuration according to principles disclosed herein. FIG. 13 includes certain numbered and/or named components that may correspond to and/or operate similarly to similarly numbered or named components of FIGS. 9 and 12, and may be similarly understood unless otherwise indicated. In particular, the configuration of the sets of sensing elements SETSEN-Ph90 shown in FIG. 13 and FIG. 12 is similar in that both implement the features A1, B1, C1, D1 and E1 in a similar manner, and both implement the first and second aspects of the "shifted pair" configuration outlined above with reference to FIG. 12 in a similar manner. Therefore, only certain differences in the set of sensing elements SETSEN-Ph90 related to their adaptation to operate in the detector portion 1367 in conjunction with the "two track" field generating coil FGC, and scale pattern 1380, will be emphasized in the following description.

The detector portion 1367 is arranged in a "two track" configuration which may be understood based on the brief description below, and also understood based on a similar implementation disclosed in U.S. Pat. No. 10,775,199, (the '199 patent) which is hereby incorporated by reference in its entirety. Briefly, the scale pattern 1380 comprises signal modulating elements SME arranged in first and second tracks FPT and SPT, respectively, that extend along the measuring axis direction MA, as shown. The field generating coil FGC is configured to have a first portion that surrounds a first interior area portion FINTA aligned with the first track FPT, and a second portion that surrounds a second interior area SINTA aligned with the second track SPT. The connections and current flow between the portions of the field generating coil FGC will be understood based on the example current flow arrows shown therein in FIG. 13.

In this implementation, the first set of sensing elements SETSEN-Ph0 includes two separated portions SETSEN-Ph90sub1 and SETSEN-Ph90sub2, according to previously disclosed principles. Their layout includes minor adaptations for better compatibility with a two track implementation, as will be understood by one of ordinary skill in the art. The first set of sensing elements SETSEN-Ph0 corresponding to the nominal spatial phase Ph0nom comprises sensing elements SEN comprising conductive loops that each extend transverse to the measuring axis direction MA across the first and second interior area portions FINTA and SINTA to define first and second sensing element effective area portions FEffASEN and SEffASEN corresponding to those portions of the sensing element SEN that are aligned with or overlap the first and second interior area portions FINTA and SINTA, respectively. Accordingly, a detector signal contribution arising in each conductive loop combines the respective detector signal contributions from its first and second sensing element effective area portions FEffASEN and SEffASEN. In comparison to the previous description of FIG. 9, the sum of first and second sensing element effective area portions FEffASEN and SEffASEN of a sensing element SEN may be interpreted as the sensing element effective area EffASen.

In the implementation shown in FIG. 13, the scale pattern 1380 comprises signal modulating elements SME (or signal modulating element portions SME) periodically arranged in the first track FPT according to the wavelength W1, and signal modulating elements SME (or signal modulating element portions SME) periodically arranged in the second track SPT according to the wavelength W1, wherein the periodic arrangements in the first and second tracks FPT and SPT are offset relative to one another by (W1)/2. In addition, the field generating coil FGC is configured to generate a first polarity of changing magnetic flux in the first interior area portion FINTA and an opposite second polarity of changing magnetic flux in in the second interior area SINTA.

The nature of the combined detector signal contributions is clarified by the paired signs "+,+" or "+,−" or "−,−" or "−,+" in the interior of each sensing element SEN in FIG. 13, taken in combination with any overlapping signal modulating element SME. The first sign in a pair indicates the loop polarity of a sensing element, and the second sign in a pair indicates the generated flux polarity in the corresponding interior area portion. As one example, in the sensing element SEN2, the signal contribution from the first sensing element effective area portion FEffASEN is a nominal positive polarity contribution which is not reduced by an overlapping signal modulating element SME. The signal contribution from the second sensing element effective area portion FEffASEN would be a nominal negative polarity contribution (due to the negative polarity flux), however, this contribution is reduced or substantially eliminated by the overlapping signal modulating element SME. As a result, the net signal contribution of the sensing element SEN2 for the scale position that is illustrated is a net positive signal contribution. The signal contributions of other sensing elements SEN, and/or for other scale positions, may be understood by analogy with the foregoing explanation, and/or as detailed in the '199 patent.

As previously indicated, the sum of the first and second sensing element effective area portions FEffASEN and SEffASEN of a sensing element SEN may be interpreted as its sensing element effective area EffASen, with regard to a two track implementation. This interpretation is appropriately applied in determining the sensing element average dimension DSENavg outlined in the principle or feature B1, for a two track configuration.

With regard to an additional aspect of the interpretation the sensing element average dimension DSENavg outlined in the principle or feature B1, for a two track configuration, for each sensing element their sensing element effective area EffASEN that is aligned with or overlaps two interior areas (e.g., FINTA and SINTA), it may be defined to have an effective y-axis dimension EffYSEN along a y-axis direction that is the sum of the dimensions of the one or more interior areas (e.g., FINTA and SINTA) perpendicular to the measuring axis direction MA. In the particular implementation shown in FIG. 13, the sensing element average dimension DSENavg (=EffASEN/EffYSEN) according to the interpretation above is illustrated to fall in the range 0.33*W1+/−15%, which conforms to the previous description of the principle or feature B1.

Figure 17:
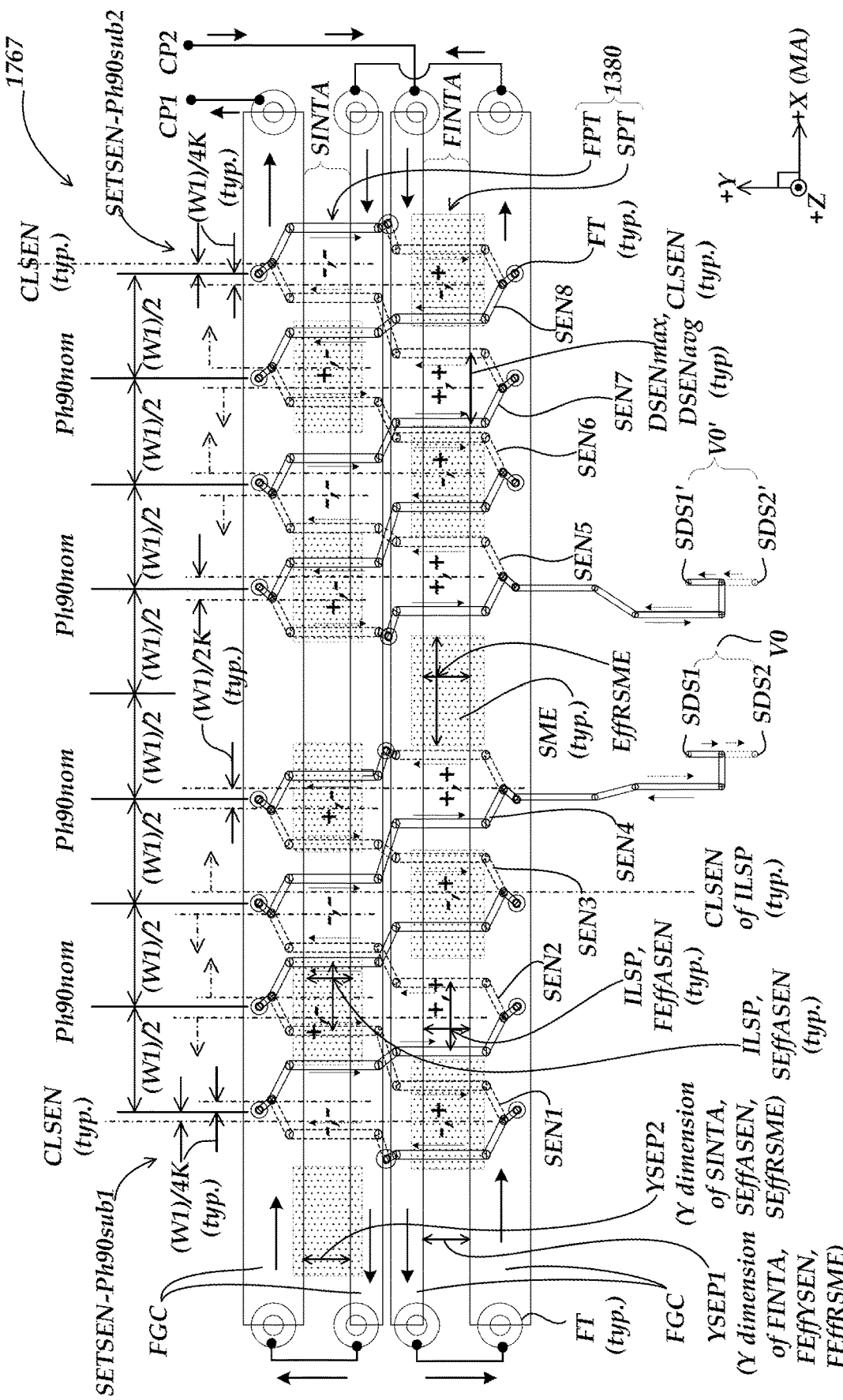
FIG. 17 is a plan view diagram illustrating certain aspects of a first set of sensing elements corresponding to a first spatial phase that is a fourth exemplary configuration of a set of sensing elements configured according to the second type of prescribed relationship principles disclosed herein, to provide spatially filtered signals for use in a detector portion in an electronic position encoder such as that shown in FIG. 1, along with the second compatible field generating coil configuration and scale pattern shown in FIG. 13, and including various dimensions that may characterize the sensing element configuration according to principles disclosed herein.

It will be appreciated that the implementations of the first type or second type disclosed herein with reference to the two track configuration shown in FIG. 13, and further below in FIG. 17 are exemplary only, and not limiting. More generally, having the benefit of this disclosure and the teachings herein, one of ordinary skill in the art may adapt various spatial filtering configurations according to the first type or second type of prescribed relationship principles or features disclosed and claimed herein for use in various other two track implementations, such as those disclosed in the '199 patent.

It will be appreciated that the sets of sensing elements SETSEN disclosed in the various implementations of the first type illustrated and described above with reference to FIGS. 9 through 13, are exemplary only, and not limiting. For example, any of the sets sensing elements SETSEN could be altered to include additional sensing elements SEN (or fewer, in certain disclosed implementations), provided that they are shaped and located such that the resulting sets of sensing elements SETSEN comprise the prescribed relationship features A1, B1, C1, and at least one of the features D1 and E1, as outlined above.

Furthermore, although the feature D1 has been included in each of the implementations shown in FIGS. 9-13, it is not required in all implementations, provided that the feature E1 is included in at least one respective set of sensing elements. As one particular example with reference to FIG. 11A, if the shift directions of all the sensing elements SEN in the set of sensing elements SETSEN-Ph0 is reversed, and all of the sensing elements SEN shown in FIG. 11A are replaced by the sensing elements SEN shown in FIG. 6 (which have a maximum dimension DSENmax of approximately 0.5*W1), then the resulting encoder may be described as follows: comprising a plurality of respective sets of sensing elements (e.g., SETSEN-Ph0 and SETSEN-Ph90) corresponding to a plurality of respective spatial phases (e.g., Ph0 and Ph90), wherein each comprises the features A1, B1, C1, (e.g., SETSEN-Ph0 would comprise neither feature D1 nor E1) and at least one of the plurality of respective sets of sensing elements further comprises at least the feature E1 (e.g., SETSEN-Ph90), and the electronic position encoder is thereby configured to provide a plurality of spatially filtered detector signals usable to reduce or suppress potential unwanted 3rd spatial harmonic detector signal components and potential unwanted Kth (5th) spatial harmonic detector signal components that may otherwise contribute to error in the determined relative position between the detector portion and the scale pattern. The resulting encoder may be further described as follows: each of the plurality of respective sets of sensing elements (e.g., SETSEN-Ph0 and SETSEN-Ph90) has an area centroid of its total sensing element effective area located within its span along the measuring axis; and the plurality of respective sets of sensing elements are configured with their respective area centroids located at nominally the same location along the measuring axis direction. In addition, the resulting encoder may be configured such that each respective positive or negative polarity loop included in any one of the plurality of respective set of sensing elements is configured to provide a respective sensing element effective area EffASEN that does not overlap a sensing element effective area EffASEN of any other respective positive or negative polarity loop included in that same one of the plurality of respective set of sensing elements.

It is also possible to configure an analogous three phase encoder to include three sets of sensing elements that comprise the features A1, B1, C1, wherein at least two of the sets of sensing elements comprise the feature E1, if desired.

Thus, while preferred implementations of the first type have been illustrated and described, numerous variations in the illustrated and described arrangements of features will be apparent to one skilled in the art based on this disclosure.

FIGS. 14-17 are partly representational, partly schematic, plan view diagrams illustrating certain aspects of various exemplary configurations of a set of sensing elements SETSEN configured or arranged according to a second type of prescribed relationship principles disclosed herein, such that the sensing elements SEN are shaped to provide spatially filtered signals for use in a detector portion (e.g., 1467, 1567, 1767) in an electronic position encoder such as that shown in FIG. 1. Compatible field generating coil configurations FGC and scale patterns (e.g., 980, 1380) are illustrated as well as. According to a convention used herein, an implementation that conforms to the second type of prescribed relationship principles (described in greater detail below) may be referred to as an implementation of the second type, for short.

The principles outlined below with reference to FIGS. 14-17 are advantageous for shaping and arranging the sensing elements SEN to spatially filter potential $3^{rd}$, $5^{th}$, $7^{th}$, or $9^{th}$ spatial harmonic components in the detector signals in various alternative implementations, and particularly advantageous for shaping the sensing elements SEN to spatially filter potential $5^{th}$ spatial harmonic components when used in combination with sizing the sensing elements SEN according to principles outlined above, such that their dimension DSENavg is configured to spatially filter potential $3^{rd}$ harmonic components in the detector signals. However, their application is not limited to the implementations disclosed below. More generally, these principles may be used in combination with various other configurations of sets of sensing elements SETSEN and signal modulating elements SME in addition to those disclosed herein (e.g., as known in the prior art) and may still provide significant benefits.

Figure 14:
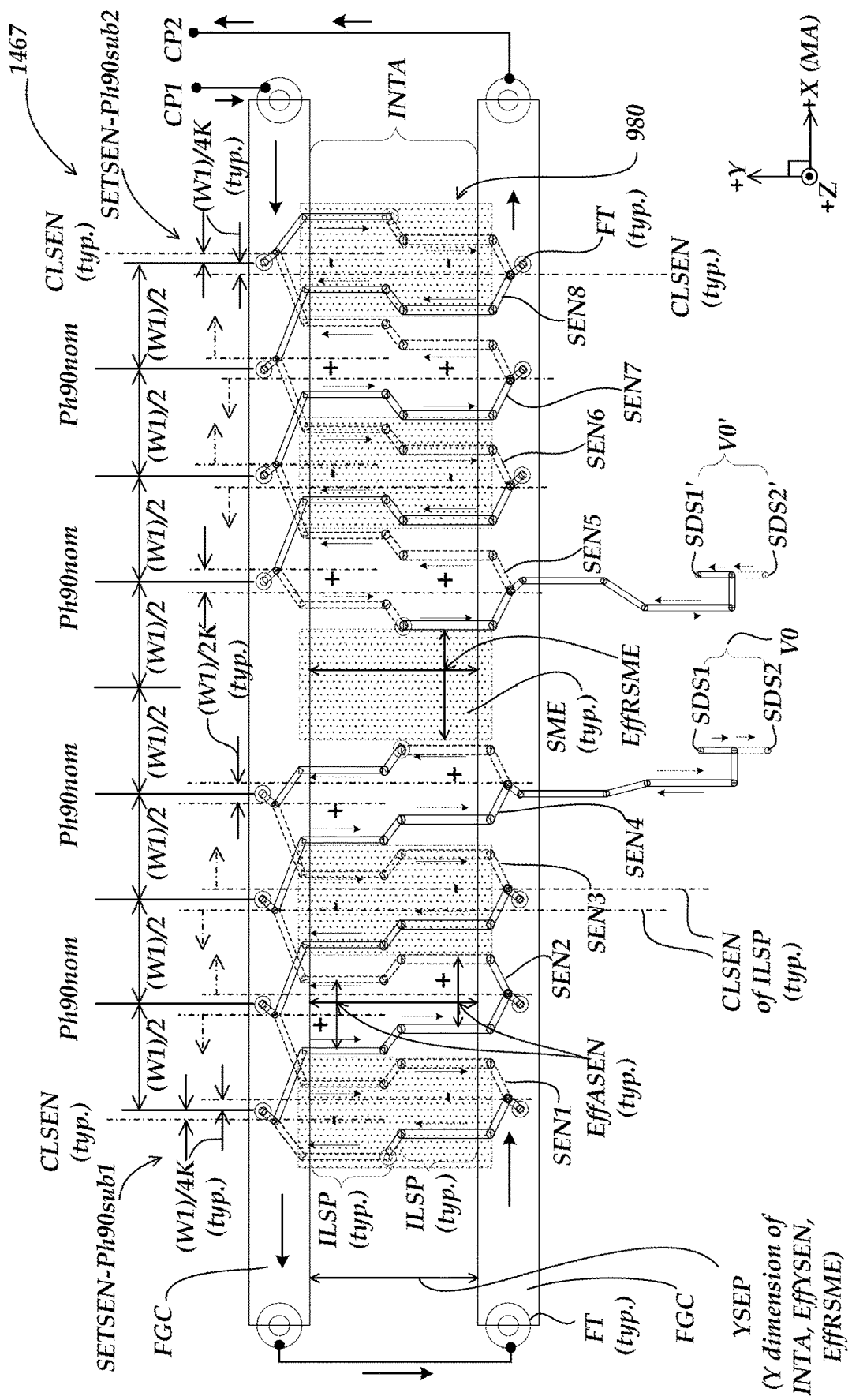
FIG. 14 is a plan view diagram illustrating certain aspects of a first set of sensing elements corresponding to a first spatial phase that is a first exemplary configuration of a set of sensing elements configured according to the second type of prescribed relationship principles disclosed herein, to provide spatially filtered signals for use in a detector portion in an electronic position encoder such as that shown in FIG. 1, along with the first compatible field generating coil configuration and scale pattern shown in FIG. 9, and including various dimensions that may characterize the sensing element configuration according to principles disclosed herein.

FIG. 14 is a plan view diagram illustrating certain aspects of a first set of sensing elements SETSEN-Ph90 (referred to as SETSEN, for short in some contexts below) corresponding to a first spatial phase Ph90 that is a first exemplary configuration of a set of sensing elements configured according to the second type of prescribed relationship principles disclosed herein, to provide spatially filtered signals for use in a detector portion in an electronic position encoder such as that shown in FIG. 1, along with the first compatible field generating coil configuration FGC and scale pattern 980 shown in FIG. 9, and including various dimensions that may characterize the sensing element configuration according to principles disclosed herein. FIG. 14 includes certain numbered and/or named components that may correspond to and/or operate similarly or identically to similarly numbered or named components of previous figures, and particularly FIGS. 9 and/or 11A, and may be similarly understood unless otherwise indicated. Briefly, the overall operation of the implementation shown in FIG. 13 and the various elements therein may be understood by analogy with the description of FIGS. 9 and 11A (and others, as applicable) above. The most significant difference between the sets of sensing elements SETSEN-Ph90 shown in FIG. 14 and FIG. 11A is that the shape of each of the sensing elements SEN shown in FIG. 14 includes two "intra-loop" shifted proportions, which are shifted in opposite directions by a prescribed amount for the purpose of providing a desired spatial filtering within each sensing element SEN. When this feature is implemented in implementations of the second type, desirable spatial filtering is achieved without the need to implement the principle or feature C1 that was required in implementations of the first type. Because the overall sensing operations of the sets of sensing elements SETSEN-Ph90 shown in FIG. 14 and FIG. 11A are otherwise analogous, only certain aspects of the configuration of the set of sensing elements SETSEN-Ph90 shown in FIG. 14 and FIG. 11A that are related to the shape of the sensing elements SEN and their included intra-loop shifted proportions will be emphasized in the following description.

In various implementations of the second type that are configured to provide spatially filtered detector signals as disclosed below with reference to FIGS. 14-17, at least a first respective set of sensing elements corresponding to a respective nominal spatial phase comprises the features A2 and B2, defined as follows.

A2) A number of positive polarity loops corresponding to a first winding direction or polarity, and the same number of negative polarity loops corresponding to a second winding direction or polarity opposite to the first winding direction or polarity.

B2) At least a majority of the positive polarity loops and at least a majority of the negative polarity loops are configured with their sensing element effective areas arranged in a prescribed intra-loop shift relationship relative to the respective nominal spatial phase of the respective set of sensing elements, wherein:

the intra-loop shift relationship comprises a configuration wherein within each such loop an intra-loop shifted proportion of up to half of their sensing element effective area is shifted along the measuring axis direction in a first direction by an amount (W1)/4K in relationship to the respective nominal spatial phase, and nominally the same intra-loop shifted proportion of their sensing element effective area is shifted along the measuring axis direction in a direction opposite to the first direction by an amount (W1)/4K in relationship to the respective nominal spatial phase, whereby the two intra-loop shifted proportions are shifted by (W1)/2K relative to one another, wherein K is one of 3, 5, 7 or 9;

whereby the respective set of sensing elements corresponding to the respective nominal spatial phase (SETSENPh0) is thereby configured in a practical configuration that provides a spatially filtered detector signal or signals usable to reduce or suppress a potential unwanted Kth spatial harmonic detector signal component that may otherwise contribute to error in the determined relative position between the detector portion and the scale pattern.

As a result of implementing the features A2 and B2 as outlined above, a respective set of sensing elements SETSEN corresponding to a respective nominal spatial phase is thereby configured in a practical configuration that provides a spatially filtered detector signal or signals usable to reduce or suppress a potential unwanted Kth spatial harmonic detector signal component that may otherwise contribute to error in the determined relative position between the detector portion and the scale pattern.

The FIGS. 14-17 each include a "reference grid" as previously described herein, The center location of the first-track effective areas FEffASEN and the second-track effective areas SEffASEN of each sensing element SEN are indicated by the locations of dashed centerlines CLSEN, to illustrate how each sensing element SEN is configured according to the feature B2, as described in greater detail below.

Returning to further discussion of the implementation shown in FIG. 14, based on the reference grid and centerline indicators shown in FIG. 14, it will be understood that the set of sensing elements SETSEN shown in FIG. 14 fulfills the configuration principles or features A2 and B2 outlined above, as follows. In the implementation shown in FIG. 14, the respective set of sensing elements SETSEN-Ph90 corresponding to the respective nominal spatial phase Ph90 comprises a number of positive polarity loops (indicated by "+" in the loop interior) corresponding to a first winding direction or polarity, and the same number of negative polarity loops (indicated by "−" in the loop interior) corresponding to a second winding direction or polarity opposite to the first. In the implementation shown in FIG. 14, all of the positive polarity loops and all of the negative polarity loops are configured with their sensing element effective areas EffASEN arranged in a prescribed intra-loop shift relationship relative to the respective nominal spatial phase Ph90nom of the respective set of sensing elements SETSEN-Ph90. The intra-loop shift relationship comprises a configuration wherein within each such loop SEN an intra-loop shifted proportion ILSP of up to half of their sensing element effective area is shifted along the measuring axis direction MA in a first direction by an amount (W1)/4K in relationship to the respective nominal spatial phase Ph90nom, and nominally the same intra-loop shifted proportion ILSP of their sensing element effective area (e.g., SEffASEN) is shifted along the measuring axis direction in a direction opposite to the first direction by an amount (W1)/4K in relationship to the respective nominal spatial phase Ph90nom, whereby the two intra-loop shifted proportion ILSPs (e.g., FEffASEN and SEffASEN) are shifted by (W1)/2K relative to one another, wherein K is one of 3, 5, 7 or 9. Such sensing elements SEN are each configured to combine two spatially filtered detector signal components for the Kth spatial harmonic that are 180 degrees out of phase to one another (e.g., arising from the two intra-loop shifted proportions ILSP (that is, FEffASEN and SEffA-SEN), nominally cancelling or suppressing such Kth spatial harmonic signal components in their combined signal contributions.

In the particular implementation shown in FIG. 14, the intra-loop shifted proportion ILSP (e.g., FEffASEN and/or SEffASEN) of the sensing elements SEN) is nominally half of their sensing element effective area EffASEN, which may provide the best spatial filtering. However, as implied in the definition of the feature B2 its provided spatial filtering may still be sufficient in some implementations wherein the intra-loop shifted proportion ILSP is less than half the sensing element effective area EffASEN.

In the particular implementation shown in FIG. 14, all of the positive polarity loops SEN and negative polarity loops SEN are configured with their sensing element effective areas (e.g., EffASEN=FEffASEN+SEffASEN) arranged in the prescribed intra-loop shift relationship, which may provide the best spatial filtering. However, as implied in the definition of the feature B2 its provided spatial filtering may still be sufficient in some implementations wherein only a majority of the positive and negative polarity loops are configured with their sensing element effective areas arranged in the prescribed intra-loop shift relationship.

The total sensing element effective area EffASEN for a sensing element SEN shown in FIG. 14 is defined as previously outlined herein. It refers to the area of within a sensing element SEN that is aligned with or overlaps one or more interior areas (e.g., INTA in FIG. 14), and it may be defined to have an effective y-axis dimension EffYSEN along a y-axis direction that is the sum of the dimensions of the one or more interior areas (e.g., INTA in FIG. 14) perpendicular to the measuring axis direction MA. In the particular implementation of the second type shown in FIG. 14, K=5 and the sensing elements SEN are configured to provide a sensing element average dimension DSENavg along the measuring axis direction that is within the range 0.33*W1+/−15%, whereby the respective set of sensing elements corresponding to the respective nominal spatial phase (SETSENPh0) is thereby configured to provide a spatially filtered detector signal or signals usable to reduce a potential unwanted 3$^{rd}$ spatial harmonic detector signal component and a potential unwanted 5th spatial harmonic detector signal component. However, as previously indicated, this implementation is exemplary only, and not limiting. In various other implementations, K may be 5, 7 or 9. In such implementations, the respective set of sensing elements configured to comprise the features A2 and B2 is thereby configured to provide a spatially filtered detector signal or signals usable to reduce a potential unwanted 3$^{rd}$ spatial harmonic detector signal component and a potential unwanted Kth spatial harmonic detector signal component that may otherwise contribute to error in the determined relative position between the detector portion and the scale pattern.

In the particular implementation shown in FIG. 14, the set of sensing elements SETSEN-Ph90 comprises two similar subsets or portions SETSEN-Ph0sub1 and SETSENPh0sub2 arranged with mirror symmetry relative to one another. One advantage of this configuration, in comparison to using one of the portions SETSEN-Ph0sub1 and SETSENPh0sub2 alone, is that it may reduce or eliminate a position error sensitivity to lateral offset misalignments (that is, misalignment of the detector portion 1667 and or the scale patter 980 by translation along the Y axis direction). However, such a two-portion configuration is exemplary only and not limiting. For example, either of the portions SETSEN-Ph 0sub1 or SETSENPh0sub2 individually comprise the features A2 and B2 and could be used alone (e.g., as is, or by replicating the pattern of their sensing elements SEN, to increase their length), and the spatial filtering advantages outlined above will still be obtained in various implementations.

Figure 15:
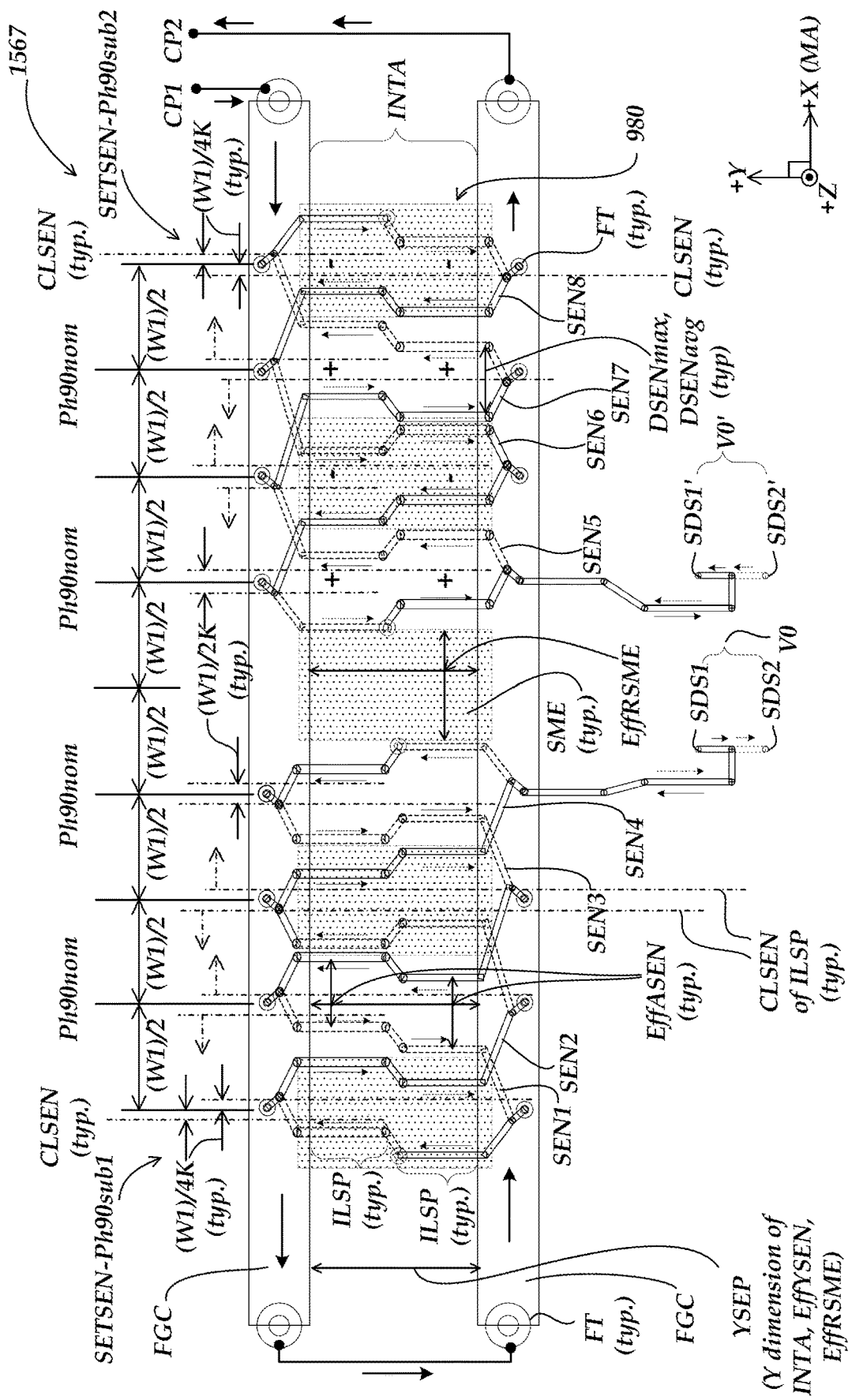
FIG. 15 is a plan view diagram illustrating certain aspects of a first set of sensing elements corresponding to a first spatial phase that is a second exemplary configuration of a set of sensing elements configured according to the second type of prescribed relationship principles disclosed herein, to provide spatially filtered signals for use in a detector portion in an electronic position encoder such as that shown in FIG. 1, along with the first compatible field generating coil configuration and scale pattern shown in FIGS. 9 and 14, including various dimensions that may characterize the sensing element configuration according to principles disclosed herein.
Figure 16:
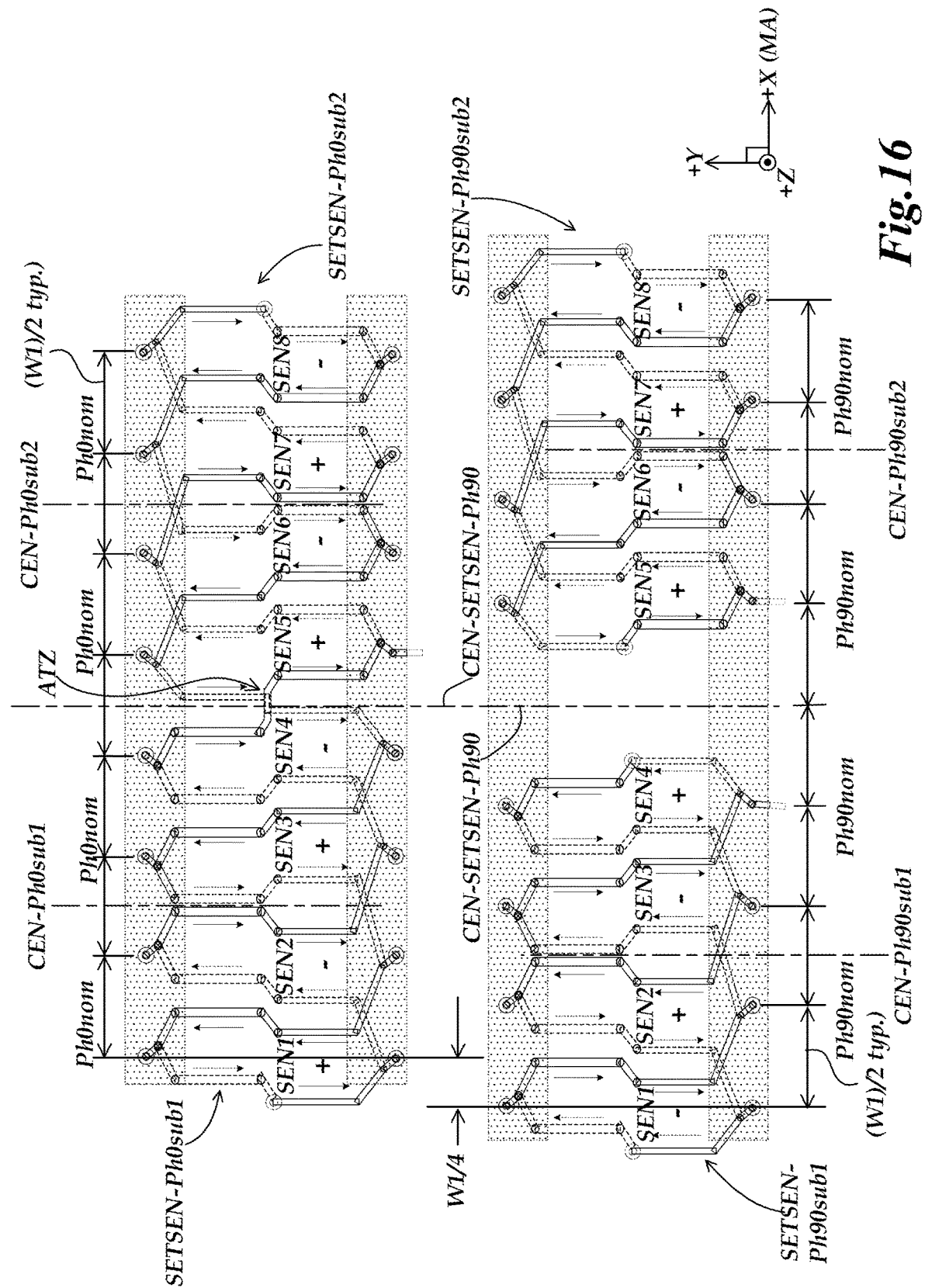
FIG. 16 is a plan view diagram illustrating certain aspects of a second set of sensing elements corresponding to a second spatial phase that is a third exemplary configuration of a set of sensing elements configured according to the second type of prescribed relationship principles disclosed herein, along with the first set of sensing elements illustrated in FIG. 15. The first and second sets are offset from one another along the vertical direction in FIG. 16 for purposes of illustration, to better show their individual characteristics and alignment along the measuring axis direction relative to one another in an operational quadrature configuration, wherein the spatial phases of the first and second sets of sensing elements differ by 90 degrees.

FIG. 15 is a plan view diagram illustrating certain aspects of a first set of sensing elements SETSEN-Ph90 (referred to as SETSEN, for short in some contexts below) corresponding to a first spatial phase Ph90 that is a second exemplary configuration of a set of sensing elements configured according to the second type of prescribed relationship principles disclosed herein, to provide spatially filtered signals for use in a detector portion in an electronic position encoder such as that shown in FIG. 1, along with the first compatible field generating coil configuration FGC and scale pattern 980 shown in FIG. 14. FIG. 15 includes certain numbered and/or named components that may correspond to and/or operate similarly or identically to similarly numbered or named components of FIG. 14, and may be similarly understood unless otherwise indicated. Therefore, only certain differences in the configurations shown in FIGS. 15 and 14 will be emphasized in the following description.

Briefly, the overall operation of the implementation shown in FIG. 15 and the various elements therein may be understood by analogy with the description of FIG. 14 (and others, as applicable) above. The only significant difference between the sets of sensing elements SETSEN-Ph90 shown in FIG. 15 and FIG. 14 is that the orientation of some of the sensing elements SEN shown in FIG. 15 is reversed or "flipped" compared to their orientation as shown in FIG. 14. In particular, the pair of sensing elements SEN1 and SEN2, and the pair of sensing elements SEN5 and SEN6 are reversed or flipped compared to their orientation as shown in FIG. 14.

The implementation of the set of sensing elements SETSEN-Ph90 shown in FIG. 15, may be described comprehensively without reference to FIG. 14, as follows. A first respective set of sensing elements SETSEN-Ph90 is configured according to the features A2 and B2 wherein it comprises at least a first pair of positive and negative polarity loops (e.g., the pair SEN1-SEN2, or the pair SEN 7-SEN8) which are configured to have nominally congruent shapes for their sensing element effective areas EffASEN, and at least a second pair of positive and negative polarity loops (e.g., the pair SEN3-SEN4, or the pair SEN 5-SEN6) which are configured to have nominally congruent shapes for their sensing element effective areas, wherein the congruent shapes of the first and second pairs are nominally mirror images of one another, and the first and second pair of positive and negative polarity loops are located adjacent to one another (e.g., the pairs SEN1-SEN2 and SEN3-SEN4, of the pairs SEN5-SEN6 and SEN7-SEN8).

Such a configuration comprising "mirror imaged pairs" may provide improved accuracy and/or robustness against certain misalignments and/or combinations of misalignments, in comparison to the configuration shown in FIG. 14. For example, it may have reduced position error sensing to pitch misalignment in combination with lateral offset, or in pitch misalignment in combination with yaw misalignment (that is, rotation of the detector 1767 or the scale pattern 980 about the Z axis).

The implementation of the set of sensing elements SETSEN-Ph90 shown in FIG. 15 may be further described as follows. The first respective set of sensing elements SETSEN-Ph90 comprise a first end pair of positive and negative polarity loops (e.g., the pair SEN1-SEN2) which are configured to have nominally congruent shapes for their sensing element effective areas EffASEN within the first end pair, and at least a second end pair of positive and negative polarity loops (e.g., the pair SEN7-SEN8) which are configured to have nominally congruent shapes for their sensing element effective areas EffASEN within the second end pair, and the congruent shapes of the first and second end pairs are also nominally congruent between the first and second end pair. It will be understood that the first and second end pairs are located at first and second ends of the first respective set of sensing elements SETSEN-Ph90.

The advantages of a configuration comprising "mirror imaged pairs" may be enhanced in some implementations, when it further comprises congruent end pairs as outlined above and illustrated in FIG. 15. However, it should be appreciated that a configuration comprising "mirror imaged pairs" the does not include congruent end pairs (e.g., with and additional sensing elements and more mirror imaged pairs than illustrated in FIG. 15) may still provide significant advantages as outlined above.

FIG. 16 is a plan view diagram illustrating certain aspects of a second set of sensing elements SETSEN-Ph0 corresponding to a second spatial phase Ph0 (designated Ph0nom in FIG. 16). It is a third exemplary configuration of a set of sensing elements configured according to the second type of prescribed relationship principles disclosed herein. It is shown in FIG. 16 along with the first set of sensing elements SETSEN-Ph90 corresponding to the second spatial phase Ph90 illustrated in FIG. 15. The first and second sets of sensing elements SETSEN-Ph90 and SETSEN-Ph0 are offset from one another vertically in FIG. 16 for purposes of illustration. They are shown arranged along the measuring axis direction in an operational quadrature relationship, wherein the spatial phases of the first and second sets of sensing elements SETSEN-Ph0 and SETSEN-Ph90 differ by 90 degrees. It will be understood that they are not offset from one another along the "Y axis" direction in an actual encoder. Rather, they are superimposed on one another, similarly to the first and second sets of sensing elements shown in FIG. 10. FIG. 16 includes numbered and/or named components that may correspond to and/or operate similarly or identically to similarly numbered or named components of FIG. 15, and may be similarly understood unless otherwise indicated. The first set of sensing elements SETSEN-Ph90 in FIG. 16 may be regarded as unchanged relative to its description in FIG. 15. Therefore, only certain aspects of the configuration of the second set of sensing elements SETSEN-Ph0 in will be emphasized in the following description of FIG. 16.

The differences between the implementation of the second set of sensing elements SETSEN-Ph0 and the first set of sensing elements SETSEN-Ph90 shown in FIG. 16 may be briefly described is as follows: the first portion SETSEN-Ph0sub1 has been moved to the right by (W1)/4 compared to the first portion SETSEN-Ph90sub1, and the second portion SETSEN-Ph0sub2 has been moved to the left by (W1)/4 4 compared to the first portion SETSEN-Ph90sub1. The resulting effective loop polarities of their sensing elements SEN are then as shown in FIG. 16. The output signal connection are provided on the sensing element SEN5, so that it remains associated with the traces of a positive polarity loop, for conceptual continuity with FIG. 15. Only one output signal connection location is required because in the particular implementation shown in FIG. 16, the first portion SETSEN-Ph0sub1, and the second portion SETSEN-Ph0sub2 are connected by a series connection in the aligned trace zone ATZ, in a manner previously outlined with reference to FIG. 9.

The implementation of the first and second sets of sensing elements SETSEN-Ph0 and SETSEN-Ph90 shown in FIG. 16, may be described comprehensively as follows. The first set of sensing elements SETSEN-Ph90 corresponding to the nominal spatial phase Ph90 is configured according to the features A2 and B2, wherein it comprises a two-portion configuration comprising: a first separated portion SETSEN-Ph90sub1 comprising the same number of positive polarity loops and negative polarity loops; and a second separated portion SETSEN-Ph90sub2 that is nominally aligned along the measuring axis direction with the first portion SETSEN-Ph90sub1 and that comprises the same number of positive polarity loops and negative polarity loops as the first separated portion. The first and second separated portions SETSEN-Ph90sub1 and SETSEN-Ph90sub2 are separated by a gap located along the measuring axis direction therebetween, and the gap is at least as wide along the measuring axis direction MA as one of the positive or negative polarity loops and no positive polarity loop effective area EffASEN or negative polarity loop effective area EffASEN of the first respective set of sensing elements SETSEN-Ph90 is located in the gap. The first respective set of sensing elements SETSEN-Ph90 is configured such that the respective loops of its first and second separated portions that are closest to one (that is, SEN4 and SEN5) another have the same loop polarity.

The implementation shown in FIG. 16 further comprises the second set of sensing elements SETSEN-Ph0, corresponding to the nominal spatial phase Ph0, which is 90 degrees different than the nominal spatial phase Ph90. The second set of sensing elements SETSEN-Ph0 is configured according to the features A2 and B2, wherein it is also configured in a two-portion configuration. That two-portion configuration comprises a first adjacent portion SETSEN-Ph0sub1 comprising the same number of positive polarity loops and negative polarity loops; and a second adjacent portion SETSEN-Ph0sub2 that is nominally aligned along the measuring axis direction with the first adjacent portion SETSEN-Ph0sub1, and that comprises the same number of positive polarity loops and negative polarity loops as the first adjacent portion SETSEN-Ph0sub1. The first and second adjacent portions SETSEN-Ph0sub1 and SETSEN-Ph0sub2 are located closer to one another along the measuring axis direction MA than a width of one of the positive or negative polarity loops. The respective loops of the first and second adjacent portions that are closest to one another (that is, SEN4 and SEN5) have opposite loop polarities.

As shown in FIG. 16, the first set of sensing elements SETSEN-Ph90 has a first area centroid CEN-SETSEN-Ph90 of its total sensing element effective area located along the measuring axis MA between its first and second separated portions SETSEN-Ph90sub1 and SETSEN-Ph90sub2, and the second set of sensing elements SETSEN-Ph0 has a second area centroid CEN-SETSEN-Ph0 of its total sensing element effective area located along the measuring axis MA between its first and second adjacent portions SETSEN-Ph0sub1 and SETSEN-Ph0sub2. The first and second sets of sensing elements SETSEN-Ph90 and SETSEN-Ph0 are arranged with their respective first and second area centroids CEN-SETSEN-Ph90 and CEN-SETSEN-Ph0 aligned at the same location along the measuring axis direction, as shown in FIG. 16.

It will be understood based on the previous description that the implementation shown in FIG. 16 is configured to provide spatially filtered detector signal or signals usable to reduce a potential unwanted $3^{rd}$ spatial harmonic detector signal component and a potential unwanted Kth spatial harmonic detector signal component that may otherwise contribute to error in the determined relative position between the detector portion and the scale pattern. Furthermore, it includes aligned area centroids and other features that provide rejection of positions measurement errors related to various types of misalignment. Furthermore, each respective positive or negative polarity loop (e.g., each sensing elements SEN) included in one of the first or second respective set of sensing elements SETSEN-Ph90 or SETSEN-Ph9 is configured to provide a respective sensing element effective area EffASEN that does not overlap a sensing element effective area EffASEN of any other respective positive or negative polarity loop included in that same one of the first or second respective set of sensing elements.

Generally speaking, it will be understood that the implementations of the second type outlined above with reference to FIGS. 14, 15 and 16 can provide an unprecedented level of spatial filtering to suppress multiple unwanted spatial harmonic signal components using a layout for the detector portion that is less complicated, higher performing, and more economical to fabricate than prior art spatial filtering detectors.

FIG. 17 is a plan view diagram illustrating certain aspects of a first set of sensing elements SETSEN-Ph90 corresponding to a respective spatial phase Ph90 that is a fourth exemplary configuration of a set of sensing elements configured according to the second type of prescribed relationship principles disclosed herein, to provide spatially filtered signals for use in a detector portion in an electronic position encoder such as that shown in FIG. 1, along with the second compatible field generating coil configuration FGC and scale pattern 1380 shown in FIG. 13. FIG. 17 is a "two track" configuration that includes certain numbered and/or named components that may correspond to and/or operate similarly to similarly numbered or named components of the two track configuration shown n FIG. 13, may be similarly understood unless otherwise indicated. The configuration of the set of sensing elements SETSEN-Ph90 shown in FIG. 17 is analogous to the set of sensing elements SETSEN-Ph90 illustrated and described with reference to FIGS. 15 and 16, in that both implement the features A2 and B2, and arrange the sensing elements SETSEN in a similar manner. The layout of the conductors of the sensing element SEN in FIG. 17 have been adapted for cooperation with the two track field generating coil configuration FGC and scale pattern 1380, as may be understood by analogy with the description of FIG. 13, above.

Based on the foregoing description of similarities to previous figures, the implementation shown in FIG. 17, as well as its various advantages, may be understood by analogy with the previous descriptions of the FIGS. 13, 14, 15, and 16. Therefore, it need not be described in further detail here.

It will be appreciated that the sets of sensing elements SETSEN in the various implementations of the second type illustrated and described above with reference to FIGS. 13-17, are exemplary only, and not limiting. For example, any of the sets or subsets or portions of the sensing elements SETSEN could be expanded to include additional sensing elements SEN, provided that they are shaped and configured such that the resulting sets of sensing elements SETSEN conform to the prescribed relationship features A2 and B2, as outlined above.

Furthermore, although the various implementations disclosed above comprise sensing elements that comprise sensing element effective areas do not overlap any other sensing element effective area of any other conductive loop or conductive loop portion included in that their respective set of sensing elements, such implementations are exemplary only, and not limiting. Generally speaking the features A2 and B2 may be implemented in any desired arrangement of sensing elements, including overlapping arrangements commonly used in the prior art. In such implementations, sensing elements comprising the features A2 and B2 may provide additional spatial filtering of the Kth spatial harmonic as outlined above, to enhance such implementations.

As one example, although the various implementations disclosed above are illustrated corresponding to K=5, and comprise sensing elements that comprise sensing element average dimension DSENavg within the range 0.33*W1+/−15%, such combinations are exemplary only, and not limiting, as will be apparent to one of ordinary skill in the art.

As another example, the set of sensing elements SETSEN-Ph0 shown in FIG. 16 may have the gap between its portions modified in a manner analogous that described with reference to the set of sensing elements SETSEN-Ph0 shown in FIG. 16, such that they comprise two "separate" portions that provide a quadrature encoder configuration. Thus, the general configuration of the first and second sets of sensing elements SETSEN-Ph0 and SETSEN-Ph90 shown in FIG. 16 are exemplary only, and not limiting.

As another example, it is possible to configure each of the set of sensing elements in a 3-phase encoder in a manner analogous to any of the various implementations of the second type outlined above. In such implementations each of the plurality of respective sets of sensing elements corresponding to the plurality of respective spatial phases is thereby configured to comprise the features A2) and B2), and is thereby configured to provide spatially filtered detector signals usable to reduce or suppress a potential unwanted Kth spatial harmonic detector signal component that may otherwise contribute to error in the determined relative position between the detector portion and the scale pattern.

While preferred implementations of the second type have been illustrated and described, numerous variations in the illustrated and described arrangements of features will be apparent to one skilled in the art based on this disclosure. Various alternative forms may be used to implement the prescribed relationship features A2 and B2 disclosed herein.

It will be appreciated that the principles disclosed and claimed herein may be readily and desirably combined with various features disclosed in the incorporated references, as well as with various features disclosed in commonly assigned copending U.S. patent application Ser. No. 16/826,842 entitled "TRANSMITTER AND RECEIVER CONFIGURATION FOR AN INDUCTIVE POSITION ENCODER" filed Mar. 23, 2020, the disclosure which is hereby incorporated by reference in its entirety. The various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. An electronic position encoder usable to measure a relative position between two elements along a measuring axis direction, the electronic position encoder comprising:
  a scale extending along the measuring axis direction which includes a periodic scale pattern comprising at least a first type of signal modulating elements that include an effective region that is aligned with or overlaps an interior area of a field generating coil, wherein the periodic scale pattern has a spatial wavelength W1 and signal modulating elements of the first type comprising similar conductive plates or similar conductive loops that are located along the measuring axis direction corresponding to the spatial wavelength W1 ;
  a detector portion configured to be mounted proximate to the periodic scale pattern and to move along the measuring axis direction relative to the periodic scale pattern, the detector portion comprising:
    a field generating coil fixed on a substrate, the field generating coil surrounding an interior area that is aligned with the effective region of the periodic scale pattern of signal modulating elements during operation, the field generating coil generating a changing magnetic flux in the interior area in response to a coil drive signal; and
    at least one respective set of sensing elements corresponding to a respective nominal spatial phase, arranged along the measuring axis direction and fixed on the substrate, members of that set of sensing elements comprising conductive loops or conductive loop portions that define a sensing element effective area EffASEN corresponding to that portion of the sensing element that is aligned with or overlaps the interior area, wherein that set of sensing elements are configured to provide respective detector signals which respond to a local effect on the changing magnetic flux provided by adjacent signal modulating elements of the scale pattern and which correspond to the respective nominal spatial phase; and
  a signal processing configuration that is operably connected to the detector portion to provide the coil drive signal and that determines a relative position between the detector portion and the scale pattern based on detector signals input from the detector portion,
  wherein:
  at least a first respective set of sensing elements corresponding to a respective nominal spatial phase comprises the features A2 and B2, defined as follows:
  A2) a number of positive polarity loops corresponding to a first winding direction or polarity and the same number of negative polarity loops corresponding to a second winding direction or polarity opposite to the first winding direction or polarity; and
  B2) at least a majority of the positive polarity loops and at least a majority of the negative polarity loops are configured with their sensing element effective areas arranged in a prescribed intra-loop shift relationship relative to the respective nominal spatial phase of the respective set of sensing elements, wherein:
    the intra-loop shift relationship comprises a configuration wherein within each such loop an intra-loop shifted proportion of up to half of their sensing element effective area is shifted along the measuring axis direction in a first direction by an amount (W1)/4K in relationship to the respective nominal spatial phase, and nominally the same intra-loop shifted proportion of their sensing element effective area is shifted along the measuring axis direction in a direction opposite to the first direction by an amount (W1)/4K in relationship to the respective nominal spatial phase, whereby the two intra-loop shifted proportions are shifted by (W1)/2K relative to one another, wherein K is one of 3, 5, 7 or 9;

whereby the respective set of sensing elements corresponding to the respective nominal spatial phase is thereby configured in a practical configuration that provides a spatially filtered detector signal or signals usable to reduce or suppress a potential unwanted Kth spatial harmonic detector signal component that may otherwise contribute to error in the determined relative position between the detector portion and the scale pattern.

2. The electronic position encoder of claim 1, wherein in B2 the positive and negative polarity loops that are configured with their sensing element effective areas arranged in the prescribed intra-loop shift relationship, the intra-loop shifted proportion is nominally half of their sensing element effective area.

3. The electronic position encoder of claim 1, wherein in B2 all of the positive polarity loops and negative polarity loops are configured with their sensing element effective areas arranged in the prescribed intra-loop shift relationship.

4. The electronic position encoder of claim 1, wherein at least a first respective set of sensing elements is configured according to the features A2 and B2, wherein it comprises at least a first pair of positive and negative polarity loops which are configured to have nominally congruent shapes for their sensing element effective areas, and at least a second pair of positive and negative polarity loops which are configured to have nominally congruent shapes for their sensing element effective areas, wherein the congruent shapes of the first and second pairs are nominally mirror images of one another, and the first and second pair of positive and negative polarity loops are located adjacent to one another.

5. The electronic position encoder of claim 4, wherein the first respective set of sensing elements is further configured to comprise at least a first end pair of positive and negative polarity loops which are configured to have nominally congruent shapes for their sensing element effective areas within the first end pair, and at least a second end pair of positive and negative polarity loops which are configured to have nominally congruent shapes for their sensing element effective areas within the second end pair, and the congruent shapes of the first and second end pairs are also nominally congruent between the first and second end pair, and the first and second end pairs are located at first and second ends of the respective set of sensing elements.

6. The electronic position encoder of claim 1, wherein K=5.

7. The electronic position encoder of claim 6, wherein each sensing element included in a respective set of sensing elements that is configured to comprise the features A2 and B2 has a total sensing element effective area EffASEN that is aligned with or overlaps one or more interior areas and is defined to have an effective y-axis dimension EffYSEN along a y-axis direction that is the sum of the dimensions of the one or more interior areas perpendicular to the measuring axis direction, and at least a majority of the sensing elements included in that respective set of sensing elements are configured to provide a sensing element average dimension DSENavg=(EffASEN/EffYSEN) along the measuring axis direction that is within the range 0.33*W1+/−15%, whereby that respective set of sensing elements is thereby configured to provide a spatially filtered detector signal or signals usable to reduce a potential unwanted $3^{rd}$ spatial harmonic detector signal component and a potential unwanted 5th spatial harmonic detector signal component that may otherwise contribute to error in the determined relative position between the detector portion and the scale pattern.

8. The electronic position encoder of claim 7, wherein each respective positive or negative polarity loop included in the respective set of sensing elements that is configured to comprise the features A2 and B2 is configured to provide a respective sensing element effective area EffASEN that does not overlap a sensing element effective area EffASEN of any other respective positive or negative polarity loop included in that first respective set of sensing elements.

9. The electronic position encoder of claim 1, wherein at least a first respective set of sensing elements corresponding to a respective nominal spatial phase is configured according to the features A2 and B2, wherein it comprises a two-portion configuration comprising:

a first separated portion comprising the same number of positive polarity loops and negative polarity loops; and a second separated portion that is nominally aligned along the measuring axis direction with the first portion, and that comprises the same number of positive polarity loops and negative polarity loops as the first separated portion;

wherein the first and second separated portions are separated by a gap located along the measuring axis direction between the first portion and the second portion, and the gap is at least as wide along the measuring axis direction as one of the positive or negative polarity loops and no positive polarity loop effective area or negative polarity loop effective area of that first respective set of sensing elements is located in the gap.

10. The electronic position encoder of claim 9, configured to comprise one of M1 or M2, wherein:

M1) the first separated portion of the first respective set of sensing elements is configured to output a first detector signal and the second separated portion first respective set of sensing elements is configured to output a second detector signal, and the signal processing configuration is configured to determine the relative position between the detector portion and the scale pattern based at least partly on a combination of the first and second signals; or M2) the first separated portion of the first respective set of sensing elements is connected in series with the second separated portion of the first respective set of sensing elements to form a combined signal and the series connection is configured such that the respective signal contributions of the first and second separated portions are additive in the combined signal; and the signal processing configuration is configured to determine the relative position between the detector portion and the scale pattern based at least partly on the combined signal.

11. The electronic position encoder of claim 9, wherein:

the first respective set of sensing elements is configured such that the respective loops of its first and second separated portions that are closest to one another have the same loop polarity; and the electronic position encoder further comprises at least a second respective set of sensing elements corresponding to a respective nominal spatial phase that is 90 degrees different than the nominal spatial phase of the first respective set of sensing elements, and the second respective set of sensing elements is configured to comprise the features A2 and B2, wherein it is configured in a two-portion configuration comprising:
a first adjacent portion comprising the same number of positive polarity loops and negative polarity loops; and
a second adjacent portion that is nominally aligned along the measuring axis direction with the first adjacent portion, and that comprises the same number of positive polarity loops and negative polarity loops as the first adjacent portion;
wherein the first and second adjacent portions are located closer to one another along the measuring axis direction than a width of one of the positive or negative polarity loops, and the respective loops of the first and second adjacent portions that are closest to one another have opposite loop polarities;
the first respective set of sensing elements has a first area centroid of its total sensing element effective area located along the measuring axis between its first and second separated portions;
the second respective set of sensing elements has a second area centroid of its total sensing element effective area located along the measuring axis between its first and second adjacent portions;
and the first and second respective sets of sensing elements are arranged with their respective first and second area centroids located at the same location along the measuring axis direction.

12. The electronic position encoder of claim 11, wherein each respective positive or negative polarity loop included in one of the first or second respective set of sensing elements is configured to provide a respective sensing element effective area EffASEN that does not overlap a sensing element effective area EffASEN of any other respective positive or negative polarity loop included in that same one of the first or second respective set of sensing elements.

13. The electronic position encoder of claim 9, wherein:
the first respective set of sensing elements is configured such that the respective loops of its first and second separated portions that are closest to one another have the same loop polarities; and
the electronic position encoder further comprises at least a second respective set of sensing elements corresponding to a respective nominal spatial phase that is 90 degrees different than the nominal spatial phase of the each first respective set of sensing elements, and the second respective set of sensing elements is configured according to the features A2 and B2, wherein it is configured in a two-portion configuration comprising:
a first separated portion comprising the same number of positive polarity loops and negative polarity loops; and
a second separated portion that is nominally aligned along the measuring axis direction with the first separated portion, and that comprises the same number of positive polarity loops and negative polarity loops as the first separated portion;
wherein the first and second separated portions are located farther from one another along the measuring axis direction than a width of one of the positive or negative polarity loops, and the respective loops of the first and second adjacent portions that are closest to one another have opposite loop polarities;
the first respective set of sensing elements has a first area centroid of its total sensing element effective area located along the measuring axis between its first and second separated portions;
the second respective set of sensing elements has a second area centroid of its total sensing element effective area located along the measuring axis between its first and second separated portions;
and the first and second respective sets of sensing elements are arranged with their respective first and second area centroids located at the same location along the measuring axis direction.

14. The electronic position encoder of claim 1, wherein:
the scale pattern comprises signal modulating elements arranged in first and second tracks that extend along the measuring axis direction;
the field generating coil is configured to surround a first interior area portion that is aligned with the first track, and a second interior area that is aligned with the second track;
at least one respective set of sensing elements corresponding to a respective nominal spatial phase comprises the features A2 and B2 and comprises sensing elements comprising conductive loops that each extend transverse to the measuring axis direction across the first and second interior area portions to define first and second sensing element effective area portions corresponding to those portions of the sensing element that are aligned with or overlap the first and second interior area portions, respectively, wherein a detector signal contribution arising in each conductive loop combines the respective detector signal contributions from its first and second sensing element effective area portions.

15. The electronic position encoder of claim 14, wherein:
the scale pattern comprises signal modulating elements or signal modulating element portions periodically arranged in the first track according to the wavelength W1, and signal modulating elements or signal modulating element portions periodically arranged in the second track according to the wavelength W1, wherein the periodic arrangements in the first and second tracks are offset relative to one another by (W1)/2; and
the field generating coil is configured to generate a first polarity of changing magnetic flux in the first interior area portion and an opposite second polarity of changing magnetic flux in in the second interior area.

16. The electronic position encoder of claim 1, wherein:
a plurality of respective sets of sensing elements corresponding to a plurality of respective spatial phases each comprises the features A2 and B2, and the electronic position encoder is thereby configured to provide a plurality of spatially filtered detector signals usable to reduce or suppress potential unwanted Kth spatial harmonic detector signal components that may otherwise contribute to error in the determined relative position between the detector portion and the scale pattern.

17. The electronic position encoder of claim 16, wherein:
each of the plurality of respective sets of sensing elements has an area centroid of its total sensing element effective area located within its span along the measuring axis;
the plurality of respective sets of sensing elements are configured with their respective area centroids located at the same location along the measuring axis direction.

18. The electronic position encoder of claim 17, wherein:
each respective positive or negative polarity loop included in any one of the plurality of respective set of sensing elements is configured to provide a respective sensing element effective area EffASEN that does not overlap a sensing element effective area EffASEN of any other respective positive or negative polarity loop included in that same one of the plurality of respective set of sensing elements.

19. The electronic position encoder of claim 18, wherein: each sensing element included in the plurality of respective sets of sensing elements has a total sensing element effective area EffASEN that is aligned with or overlaps one or more interior areas and is defined to have an effective y-axis dimension EffYSEN along a y-axis direction that is the sum of the dimensions of the one or more interior areas perpendicular to the measuring axis direction, and at least a majority of the sensing elements included in the plurality of respective sets of sensing elements are configured to provide a sensing element average dimension DSENavg=(EffASEN/EffYSEN) along the measuring axis direction that is within the range 0.33*W1+/−15%, whereby the electronic position encoder is thereby configured to provide a plurality of spatially filtered detector signals usable to reduce or suppress potential unwanted $3^{rd}$ spatial harmonic detector signal components and potential unwanted Kth spatial harmonic detector signal components that may otherwise contribute to error in the determined relative position between the detector portion and the scale pattern.

20. An electronic position encoder usable to measure a relative position between two elements along a measuring axis direction, the electronic position encoder comprising:
a scale extending along the measuring axis direction which includes a periodic scale pattern comprising at least a first type of signal modulating elements that include an effective region that is aligned with or overlaps an interior area of a field generating coil, wherein the periodic scale pattern has a spatial wavelength W1 and signal modulating elements of the first type comprising similar conductive plates or similar conductive loops that are located along the measuring axis direction corresponding to the spatial wavelength W1 and for which there is a dimension DSPC between each of the signal modulating elements of the first type;
a detector portion configured to be mounted proximate to the periodic scale pattern and to move along the measuring axis direction relative to the periodic scale pattern, the detector portion comprising:
  a field generating coil fixed on a substrate, the field generating coil surrounding an interior area that is aligned with the effective region of the periodic scale pattern of signal modulating elements during operation, the field generating coil generating a changing magnetic flux in the interior area in response to a coil drive signal; and
  at least one respective set of sensing elements corresponding to a respective nominal spatial phase, arranged along the measuring axis direction and fixed on the substrate, members of that set of sensing elements comprising conductive loops or conductive loop portions that define a sensing element effective area EffASEN corresponding to that portion of the sensing element that is aligned with or overlaps the interior area, wherein that set of sensing elements are configured to provide respective detector signals which respond to a local effect on the changing magnetic flux provided by adjacent signal modulating elements of the scale pattern and which correspond to the respective nominal spatial phase; and
a signal processing configuration that is operably connected to the detector portion to provide the coil drive signal and that determines a relative position between the detector portion and the scale pattern based on detector signals input from the detector portion,
wherein at least one respective set of sensing elements corresponding to a respective nominal spatial phase comprises the features A1 and C1, defined as follows:
  A1) a number of positive polarity loops corresponding to a first winding direction or polarity and the same number of negative polarity loops corresponding to a second winding direction or polarity opposite to the first winding direction or polarity; and
  C1) the negative polarity loops are configured with their sensing element effective areas arranged in a negative polarity loop prescribed relationship relative to the respective nominal spatial phase of the respective set of sensing elements, wherein:
    a positive polarity loop prescribed relationship comprises a configuration wherein a shifted proportion of up to half of a total sensing element effective area of the number of positive polarity loops is shifted along the measuring axis direction in a first direction by an amount (W1)/4K in relationship to the respective nominal spatial phase, and nominally the same shifted proportion of the total sensing element effective area of the number of positive polarity loops is shifted along the measuring axis direction in a direction opposite to the first direction by an amount (W1)/4K in relationship to the respective nominal spatial phase, such that the two shifted proportions of the total sensing element effective area of the number of positive polarity loops area are shifted by (W1)/2K relative to one another, wherein K is one of 3, 5, 7 or 9; and
  whereby the respective set of sensing elements corresponding to the respective nominal spatial phase (SETSENPh0) is configured in a practical configuration that provides a spatially filtered detector signal or signals usable to reduce or suppress both a potential unwanted $3^{rd}$ spatial harmonic detector signal component and a potential unwanted Kth spatial harmonic detector signal component, that may otherwise contribute to error in the determined relative position between the detector portion and the scale pattern.

21. The electronic position encoder of claim 20, wherein:
as part of the feature C1, the positive polarity loops are configured with their sensing element effective areas arranged in the positive polarity loop prescribed relationship relative to the respective nominal spatial phase of the respective set of sensing elements;
the at least one respective set of sensing elements corresponding to a respective nominal spatial phase further comprises the feature B1, defined as follows:
  B1) each of the positive and negative polarity loops have a total sensing element effective area EffASEN that is aligned with or overlaps one or more interior areas and is defined to have an effective y-axis dimension EffYSEN along a y-axis direction that is the sum of the dimensions of the one or more interior areas perpendicular to the measuring axis direction, and least a majority of the positive and negative polarity loops are configured to provide a sensing element average dimension DSENavg=(EffASEN/EffYSEN) along the measuring axis direction that is within the range 0.33*W1+/−15%;
the negative polarity loop prescribed relationship comprises a configuration wherein a shifted proportion up to half of a total sensing element effective area of the number of negative polarity loops is shifted along the measuring axis direction in a first direction by an amount (W1)/4K in relationship to the respective nominal spatial phase, and nominally the same shifted proportion of the total sensing element effective area of the number of negative polarity loops is shifted along the measuring axis direction in a direction opposite to the first direction by an amount (W1)/4K in relationship to the respective nominal spatial phase, such that the two shifted proportions of the total sensing element effective area of the number of negative polarity loops area are shifted by (W1)/2K relative to one another;

the at least one respective set of sensing elements corresponding to a respective nominal spatial phase further comprises at least one the features D1 or E1, defined as follows:

D1) each of the positive and negative polarity loops comprise a sensing element effective area EffASEN that has a maximum dimension DSENmax along the measuring axis direction that is at most 0.45*W1; and E1) the respective set of sensing elements corresponding to the respective nominal spatial phase (SETSENPh0) is configured in a two-portion configuration comprising:

a first separated portion comprising the same number of positive polarity loops and negative polarity loops; and a second separated portion that is nominally aligned along the measuring axis direction with the first portion, and that comprises the same number of positive polarity loops and negative polarity loops as the first separated portion, wherein the first and second separated portions are separated by a gap located along the measuring axis direction between the first portion and the second portion, wherein the gap is at least as wide along the measuring axis direction as one of the positive or negative polarity loops and no positive polarity loop effective area or negative polarity loop effective area of that respective set of sensing elements is located in the gap.

22. The electronic position encoder of claim 20, wherein K=5.

* * * * *